United States Patent [19]

Chung et al.

[11] Patent Number: 5,390,350

[45] Date of Patent: Feb. 14, 1995

[54] INTEGRATED CIRCUIT CHIP CORE LOGIC SYSTEM CONTROLLER WITH POWER SAVING FEATURES FOR A MICROCOMPUTER SYSTEM

[75] Inventors: Randall M. Chung, Laguna Nigel; Shaun Astarabadi, Irvine, both of Calif.

[73] Assignee: Western Digital Corporation, Irvine, Calif.

[21] Appl. No.: 689,358

[22] Filed: Apr. 22, 1991

[51] Int. Cl.6 ............................................... G06F 1/32
[52] U.S. Cl. ...................................... 395/150; 364/707; 364/273.1; 364/273.2; 364/238.3; 364/247; 364/DIG. 1
[58] Field of Search ............... 395/750, 275; 364/707; 365/226, 227; 307/446, 496, 66; 377/16

[56] References Cited

U.S. PATENT DOCUMENTS

| | | | |
|---|---|---|---|
| 3,736,569 | 5/1973 | Bouricius et al. | 395/750 |
| 3,941,989 | 3/1976 | McLaughlin et al. | 235/156 |
| 4,151,611 | 4/1979 | Sugawara et al. | 365/227 |
| 4,203,153 | 5/1980 | Boyd | 395/750 |
| 4,279,020 | 7/1981 | Christian et al. | 395/750 |
| 4,371,789 | 2/1983 | Chen et al. | 307/38 |
| 4,381,552 | 4/1983 | Nocilini et al. | 364/900 |
| 4,409,665 | 10/1983 | Tubbs | 364/707 |
| 4,463,440 | 7/1984 | Nishiura et al. | 364/900 |
| 4,573,117 | 2/1986 | Boney | 395/750 |
| 4,590,553 | 5/1986 | Noda | 364/200 |
| 4,669,059 | 5/1987 | Little et al. | 395/750 |
| 4,698,748 | 10/1987 | Juzswik et al. | 395/750 |
| 4,812,677 | 3/1989 | Perry | 307/296.1 |
| 4,841,440 | 6/1989 | Yonezu et al. | 364/200 |
| 4,870,570 | 9/1989 | Satoh et al. | 364/200 |
| 4,878,196 | 10/1989 | Rose | 395/750 |
| 4,907,150 | 3/1990 | Arroyo et al. | 395/575 |
| 4,961,008 | 10/1990 | Fujiwara et al. | 307/296.3 |
| 5,013,938 | 5/1991 | Estrada | 307/455 |
| 5,059,829 | 10/1991 | Flannagan et al. | 307/475 |
| 5,083,266 | 1/1992 | Watanabe | 395/275 |
| 5,129,091 | 7/1992 | Yorimoto et al. | 395/750 |
| 5,155,840 | 10/1992 | Niijima | 395/550 |
| 5,167,024 | 11/1992 | Smith et al. | 395/375 |

OTHER PUBLICATIONS

Publication by Western Digital Corporation entitled Western Digital Advanced Information on FE3600B Chip Set, 1988.

Publication by Intel entitled Intel 82347 Power Management PC Peripheral, May, 1990.

Primary Examiner—Gopal C. Ray
Attorney, Agent, or Firm—Christie, Parker & Hale

[57] ABSTRACT

A system controller manages communication of data between a microprocessor, a memory and input/output controllers in a computer. A power management controller is operative upon occurrence of microprocessor inactivity indications to disable power to the microprocessor without disabling power to the input/output controllers. Operations of the power management controller is sequenced by a plurality of programmable registers, which are programmed by signals received either from a main data bus connected to the system controller, and other units, such as input/output controllers, a keyboard controller and from a memory, or a local data bus connected between at least one of the units and the system controller.

33 Claims, 23 Drawing Sheets

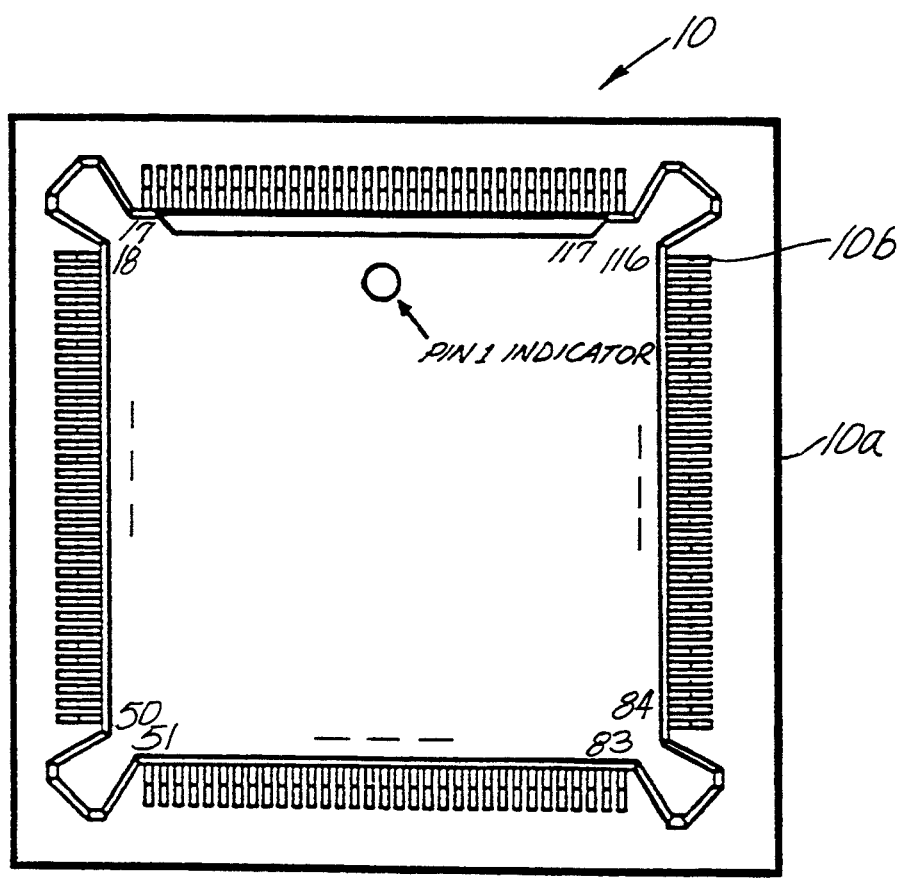

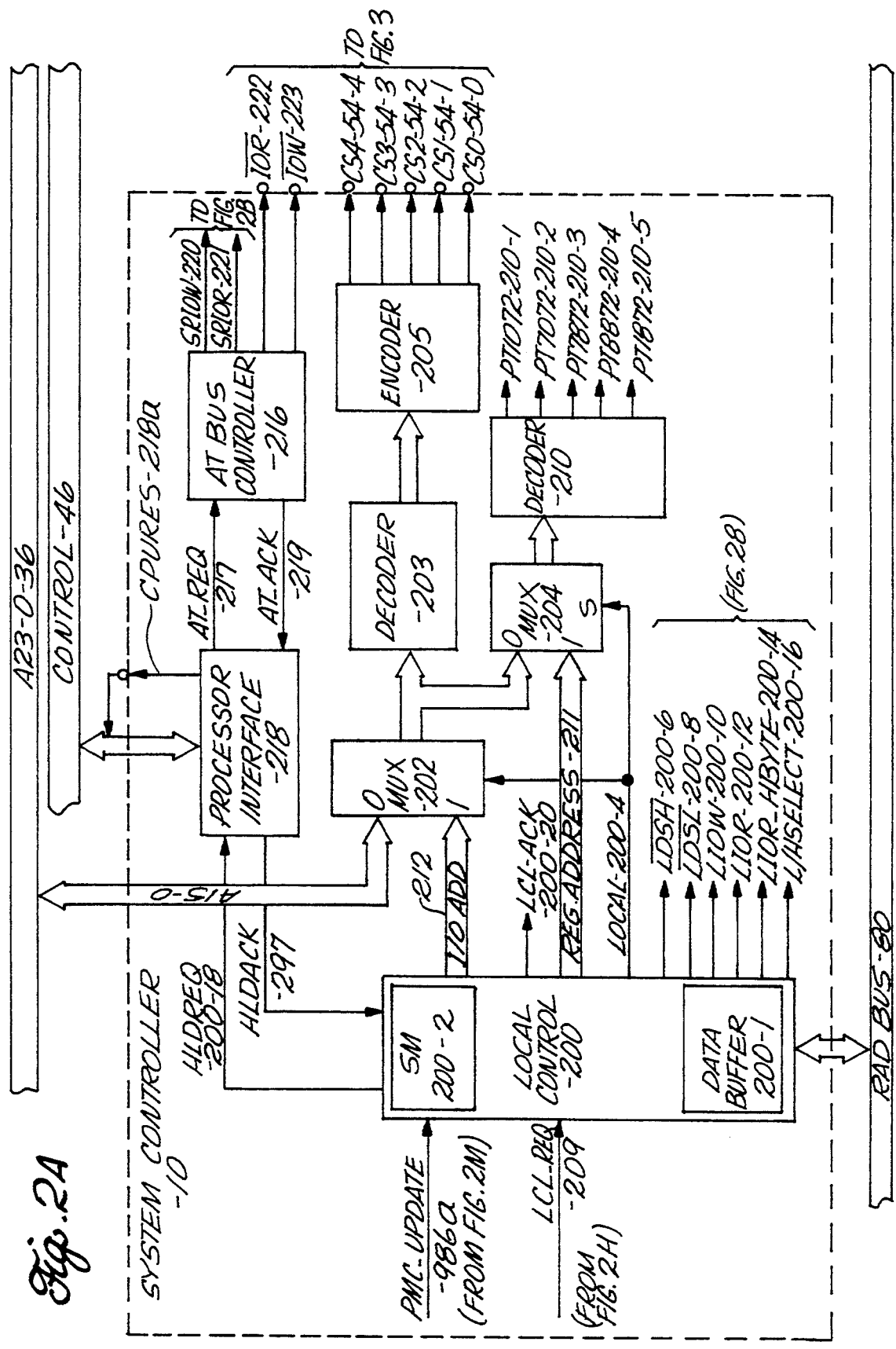

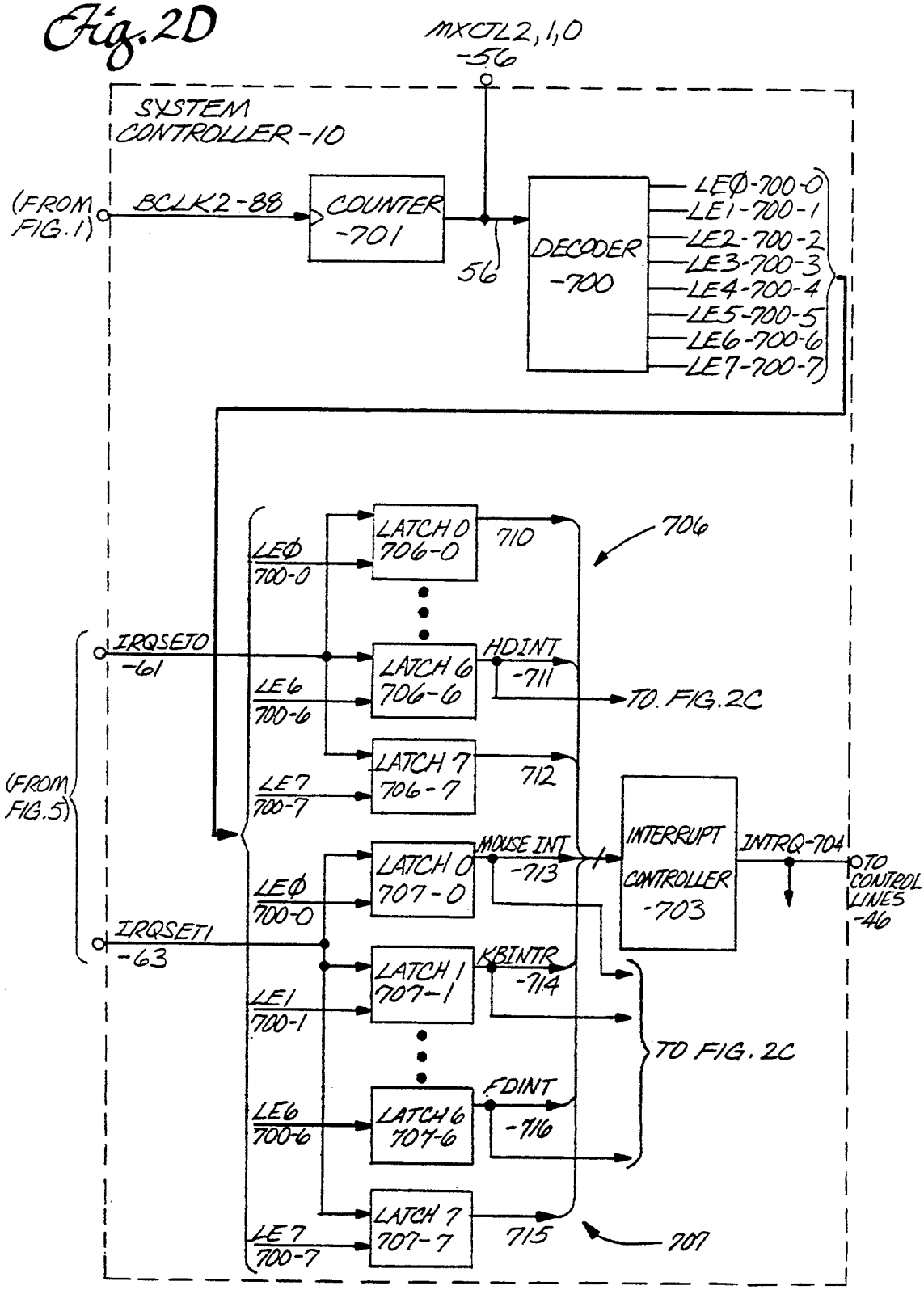

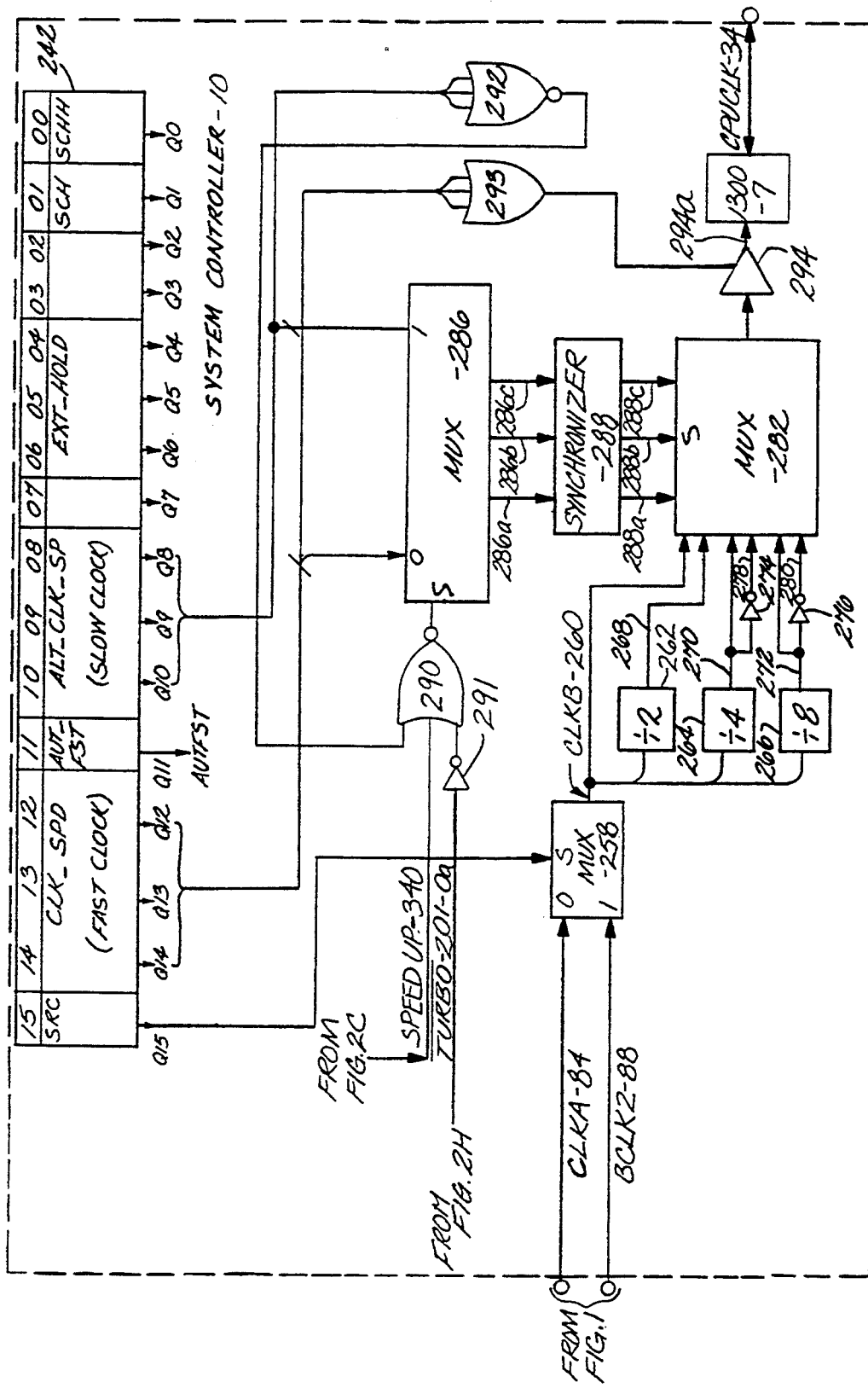

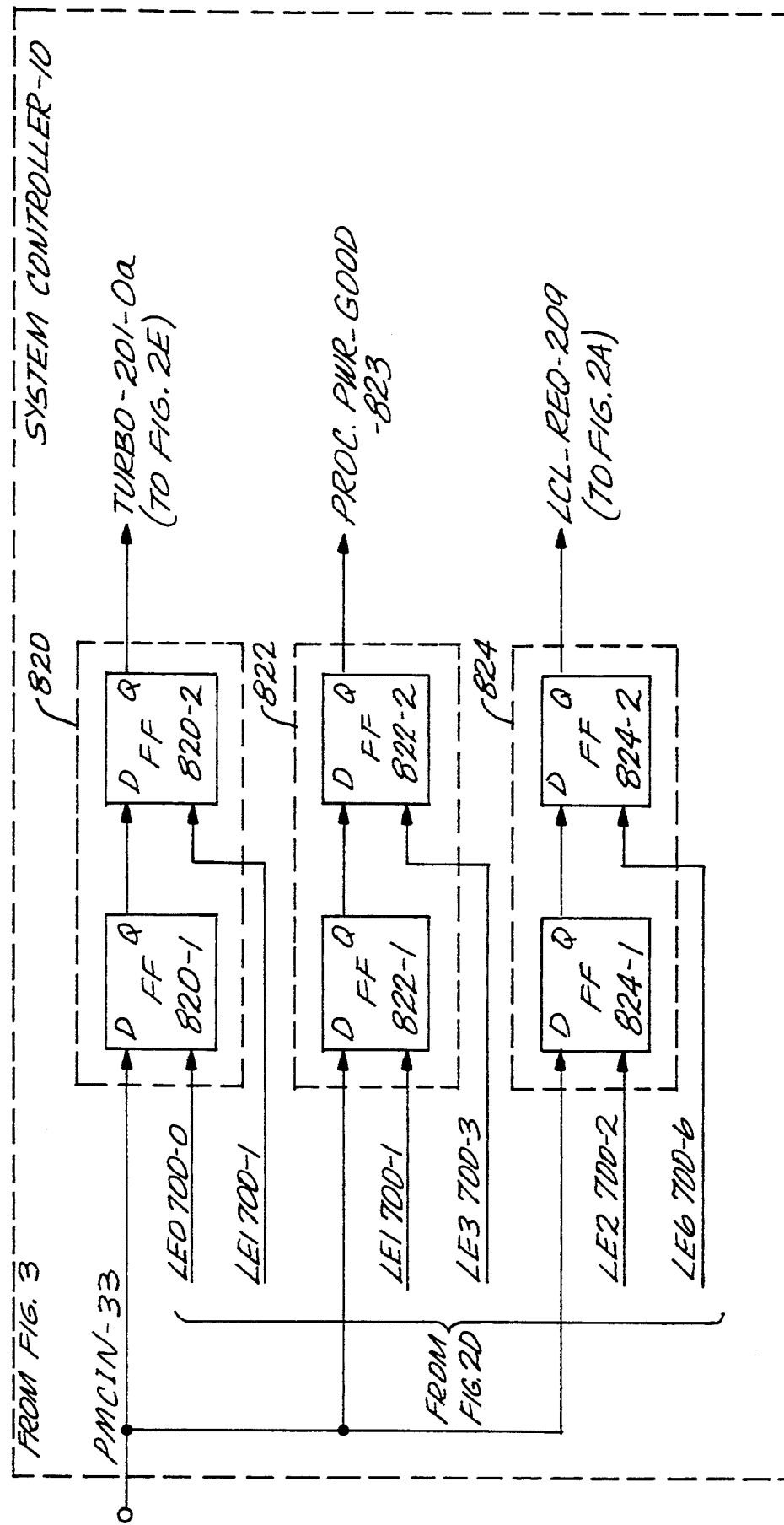

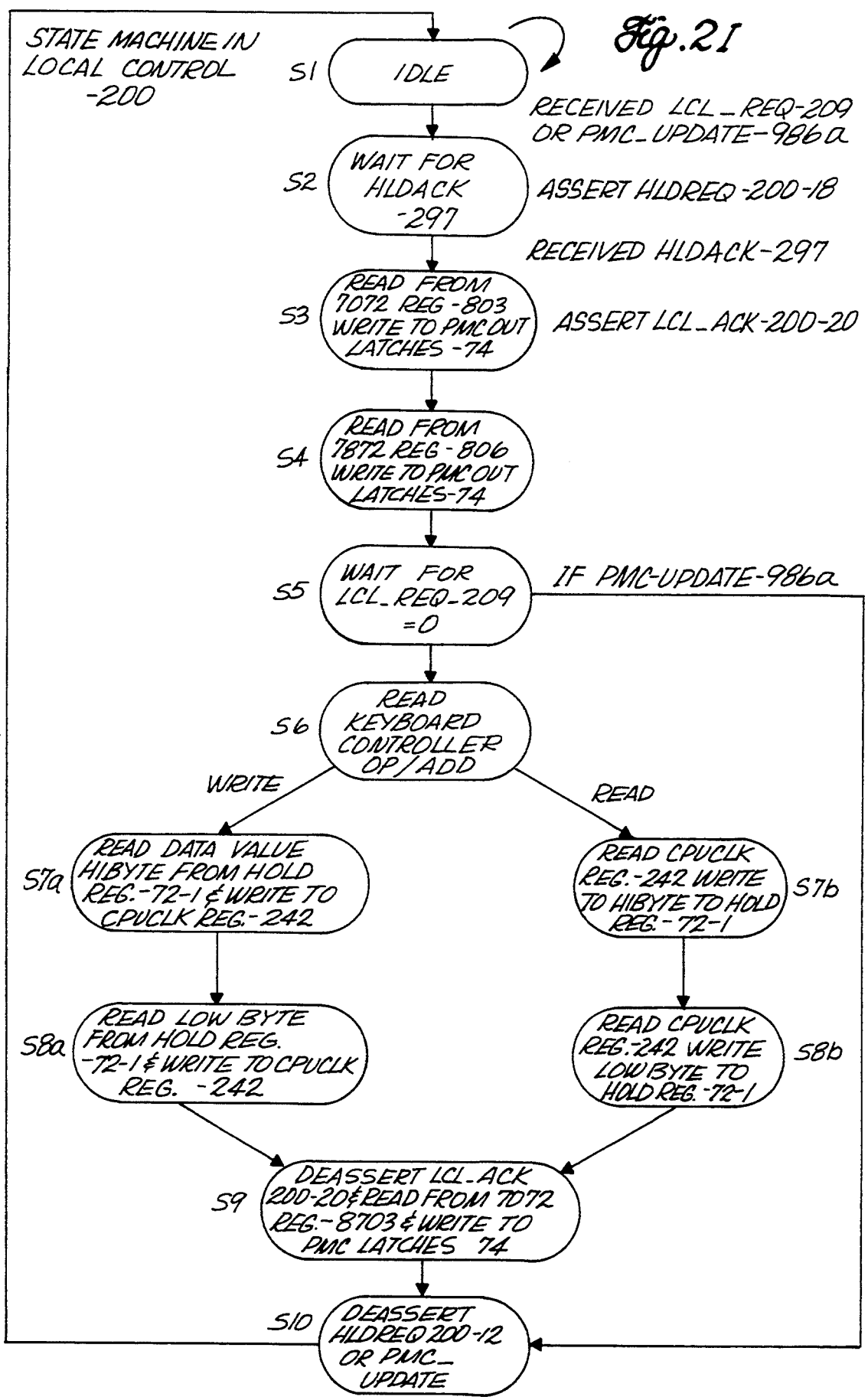

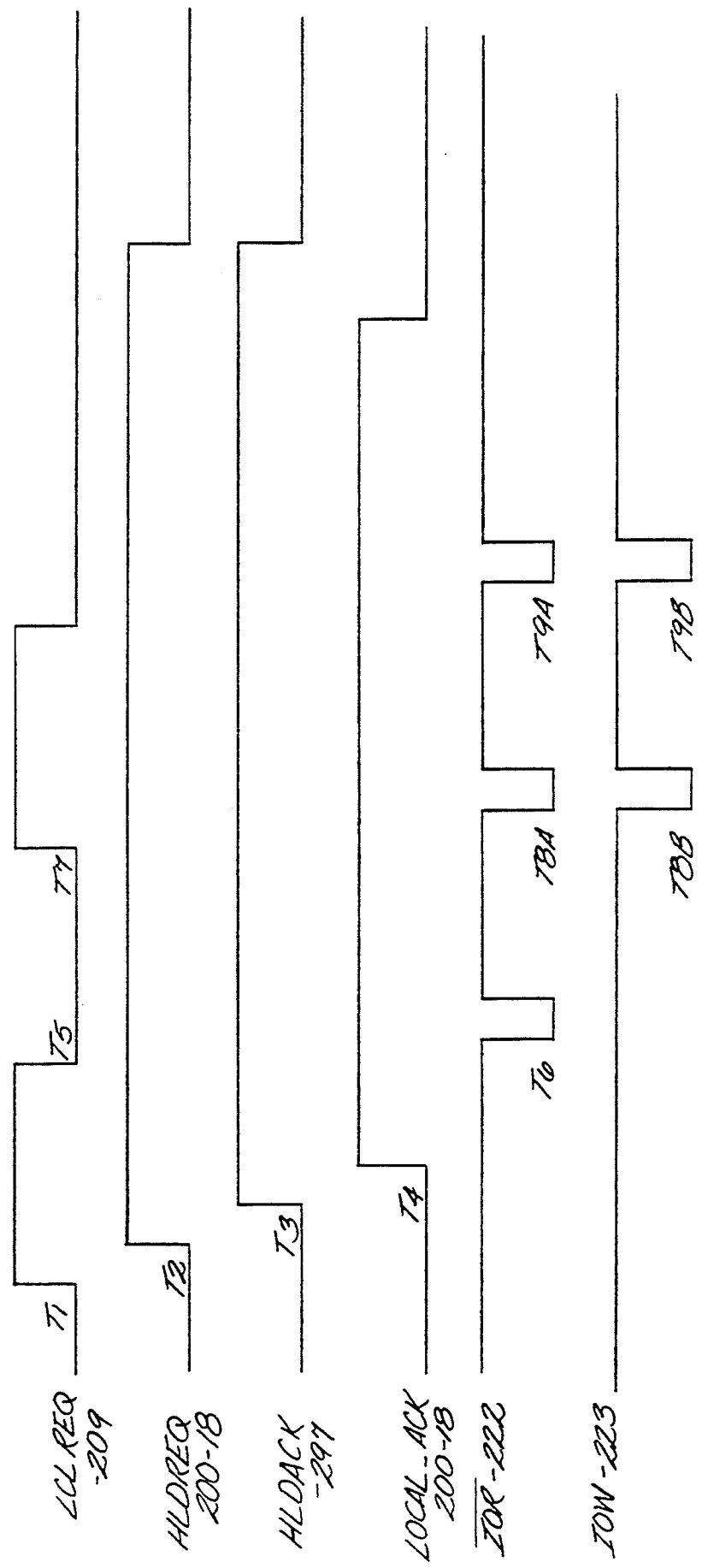

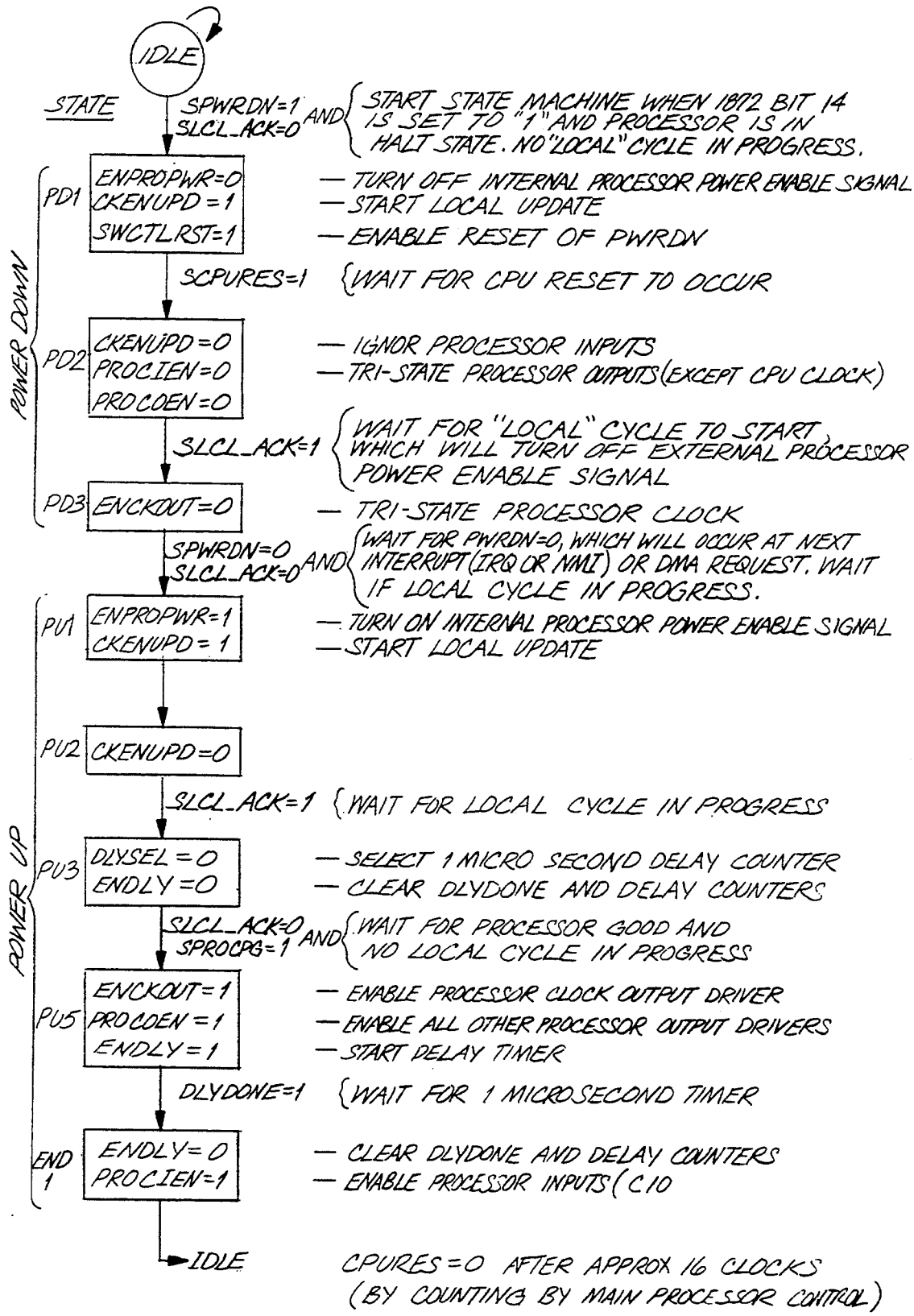

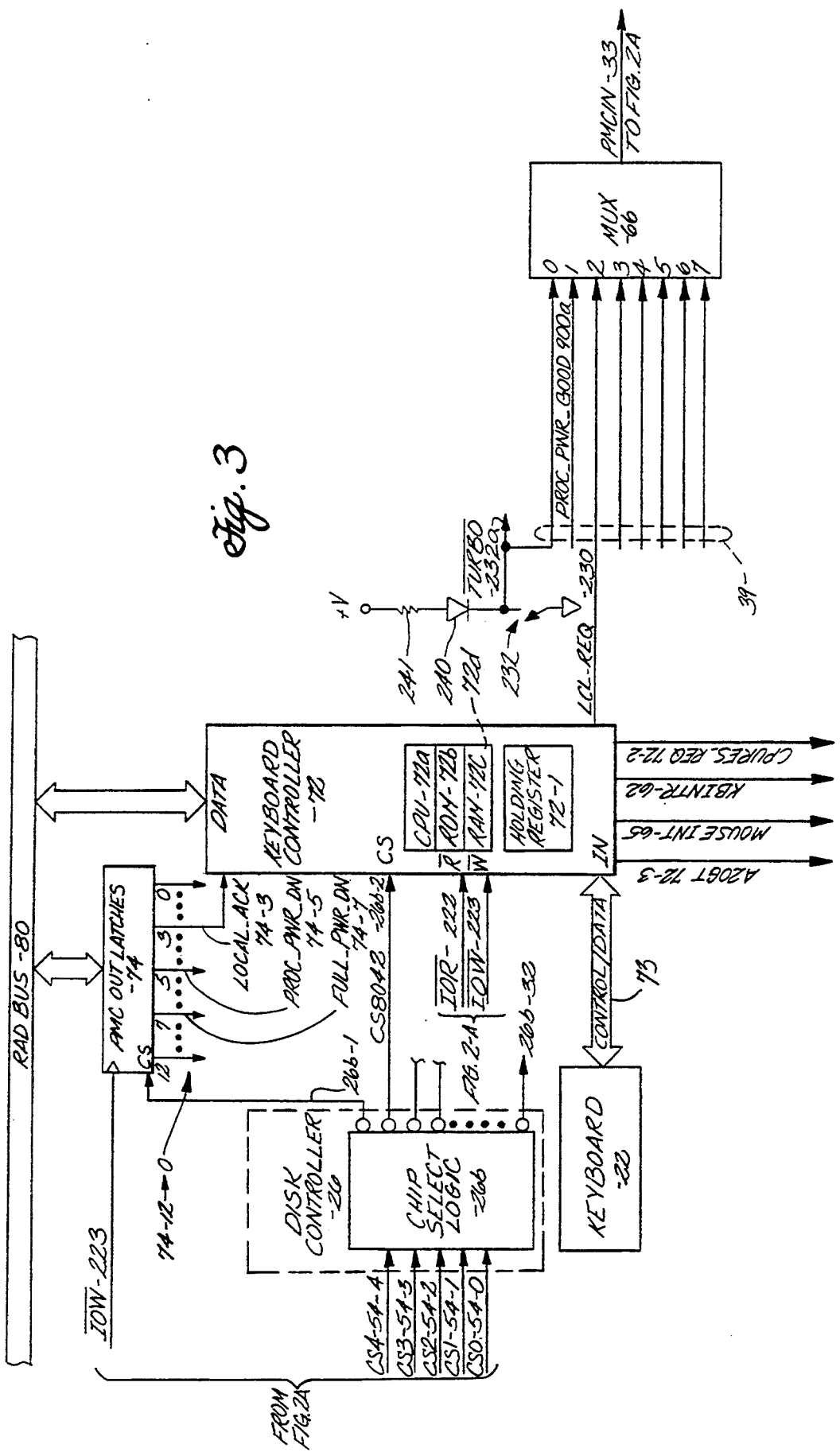

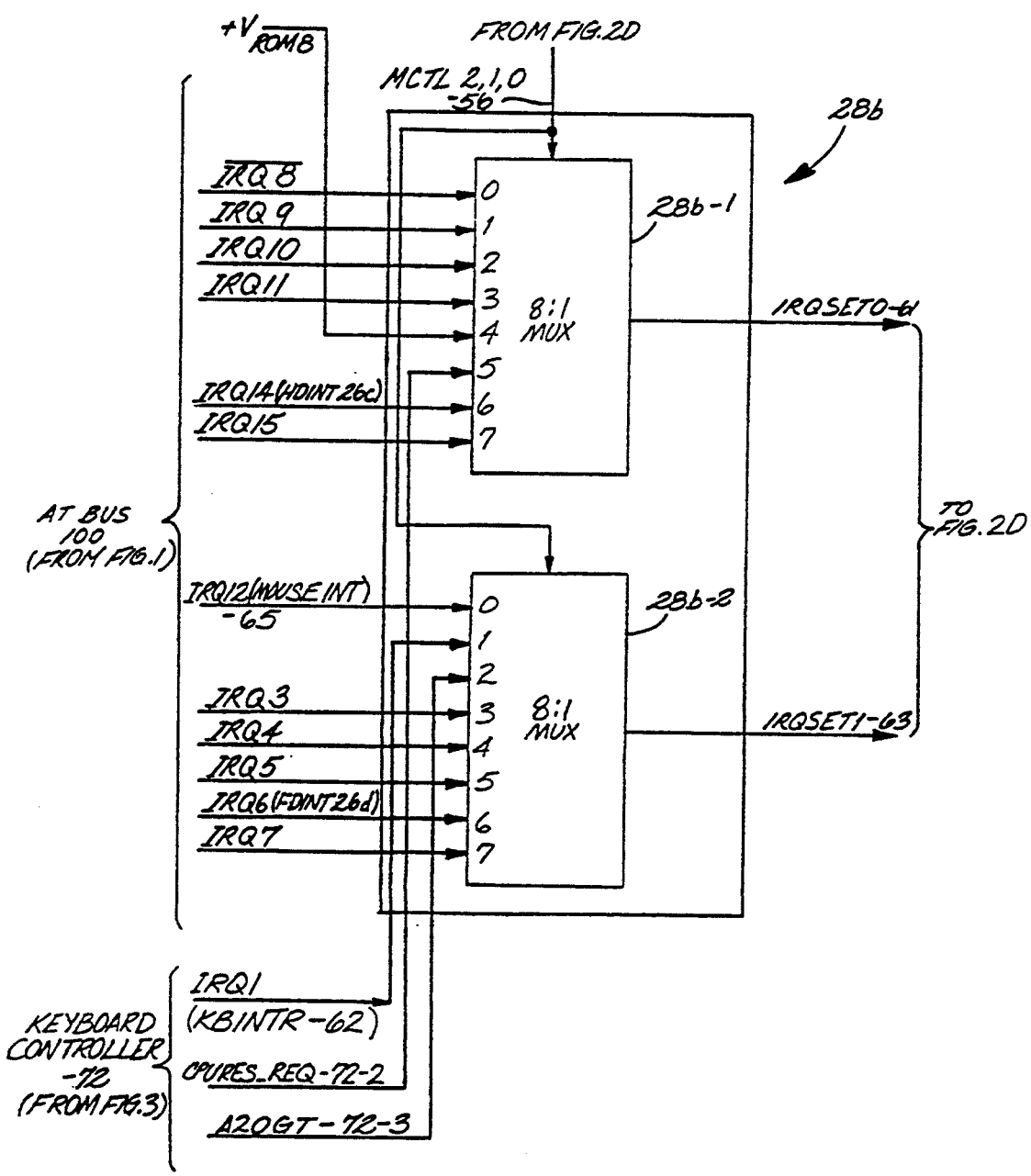

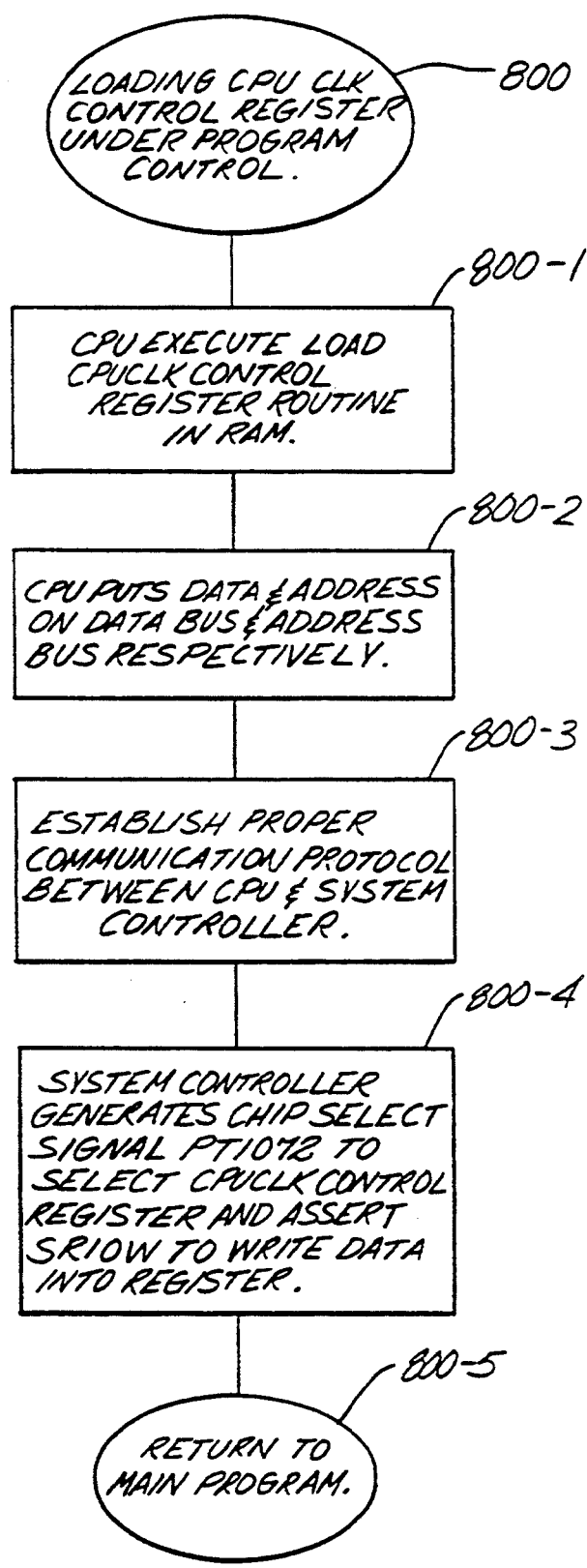

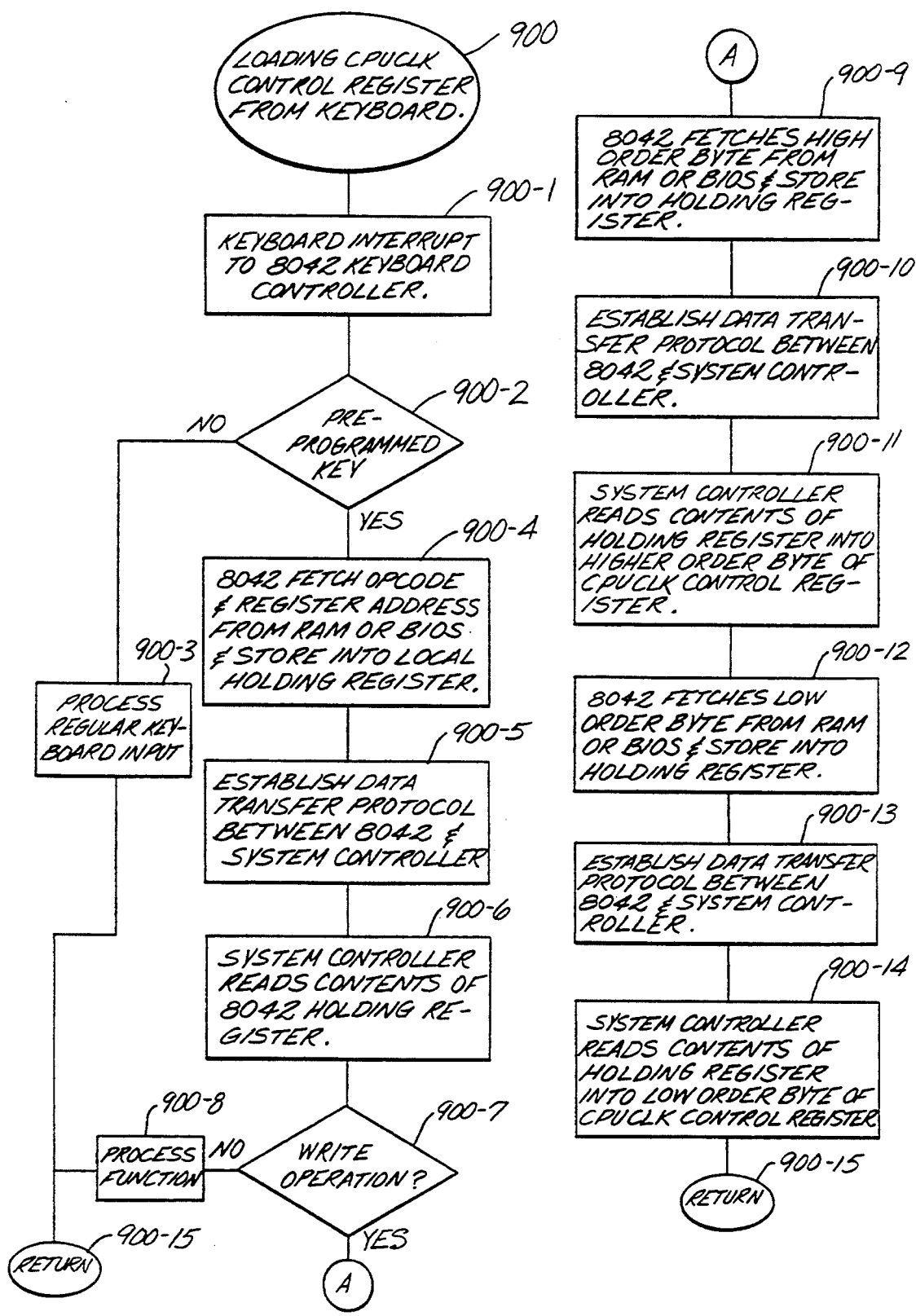

INTEGRATED CIRCUIT CHIP CORE LOGIC SYSTEM CONTROLLER WITH POWER SAVING FEATURES FOR A MICROCOMPUTER SYSTEM

BACKGROUND OF THE INVENTION

1. Field of the Invention

This invention relates to controllers for microcomputers and, more particularly, to integrated circuit chip core logic system controllers for minimizing power consumption by a microprocessor in a laptop computer.

2. Prior Art

With the advent of smaller computer systems, such as lap top computers, it has become increasingly important to minimize power consumed by each component of the system.

One area in a lap top computer where power is consumed is in the central processing unit (CPU). Even microprocessor CPUs on integrated circuit chips, such as the Intel 286 and 386 microprocessors, consume appreciable amounts of power. Each time a clock pulse occurs, logic in the CPU consumes power and power consumption is roughly proportional to the frequency of the CPU clock.

CPUs spend a large percentage of the time in idle loops waiting for input/output (I/O) operations to complete and for operator inputs. Therefore, reducing CPU clock speed during periods of CPU inactivity or of low activity, and during I/O operations which do not require high clock frequencies, can result in substantial reduction in power consumption.

The magnitude of clock duty cycle, or the length of time the clock pulse is present, also effects power consumption. During a clock pulse, power is consumed and therefore in some applications, it is desirable to minimize the magnitude of clock pulse duty cycle for minimizing power consumption.

Although it is desirable to minimize frequency and, in some situations, magnitude of clock pulse duty cycle, there are constraints in the system which must be met. For example, when data is being communicated between I/O devices and other parts of the system, it is desirable to operate the CPU at high frequency so that the user does not wait an undesirable length of time for the operation to be completed. However, some types of CPUs cannot operate with as high a clock frequency as other CPUs, and some circuits require larger clock pulse duty cycle for reliable operation.

Also standard system controllers are used which control a variety of CPUs and I/O devices. Therefore, there is a need for an improved clock pulse generating system in a microcomputer system which allows the system designer, or possibly the system user, to select optimum clock frequency and optimum duty cycle. Also, it is desired that the clock pulse generating system be incorporated in a standard system controller useful with a variety of CPUs and I/O devices.

Prior art computer systems are known and have been proposed for reducing clock frequency and for altering clock duty cycle. By way of example, calculators are known where during arithmetic mode, the calculator is clocked at a high frequency, but during display mode, frequency of the clock is reduced to minimize power consumption. In other calculators, power is reduced by using a high frequency (or full speed) clock during execute mode, a lower frequency during display mode, and an even lower frequency during a display inhibit mode.

It is also known to vary the clock pulse duty cycle with changes in clock frequency. That is, there is a different duty cycle for each frequency of clock. Thus, duty cycle is fixed for a given frequency.

Microprocessor systems are also known where the CPU clock is normally at a low frequency or speed, but momentarily speeds up to a higher frequency in response to an interrupt or other condition in the system. In this manner, the clock to the CPU is at a low frequency during periods of inactivity or low activity in the system, but momentarily switches to a high frequency and therefore a higher speed during periods of high activity. By way of example, momentary speedup occurs responsive to interrupts from such input/output devices as hard disks, floppy disks, mouse input devices, keyboards or video controllers. Systems are also known where the speedup is timed so that the momentary speedup terminates after a time interval corresponding to the type of interrupt that initiates the speedup.

Other computer systems are known which inhibit clock signals or reduce the frequency of the clock signals during periods of inactivity or low activity in the system, and then resume normal clock frequency response to interrupts generated in the system.

Microcomputer systems are also known which vary the frequency of the clock to the CPU responsive to the actuation of a switch from a system panel or under control of a computer program or system hardware.

However, a need exists for further reducing the amount of power consumed by the CPU in a microcomputer system, and at the same time providing flexibility to the system designer or user in selecting clock frequency and clock duty cycles, and incorporating these features into a standard system controller chip.

Systems are also known which conserve power in a microcomputer system by shutting off power simultaneously to the CPU and the rest of the system, leaving only those portions of the system which detect power-resume demands active. However, when the entire system is powered down, it takes a long time for the system to resume, causing delays in response which is undesirable to the user. In addition, there are periods of time when the I/O portion of the system is active when the CPU is inactive. By way of example, the I/O portion of the system may be transferring data to a printer or to a display unit, or information may be in the process of being transferred between hard or floppy disk drives and RAM memory. Because of the advent of smart controllers which handle these operations independently of the CPU, the transfer of data may be going on independently of the CPU. As a result, the CPU may be idle a substantial portion of the time. An example of where this may occur is during a word processing operation where a keyboard operator can only input a character at the rate of fractions of a second, whereas the CPU operates in microseconds. The CPU may be waiting a substantial portion of the time for the operator to enter data while nothing is going on in the CPU, and therefore power is being consumed by the CPU needlessly while it is waiting for the next entry from the keyboard. Thus, recognizing the fact that the CPU is a major source of power consumption and yet, because of the speed at which the CPU operates, there are substantial periods of time during which the CPU is actually idling, there is a need to power down the CPU alone and to do so transparently to the user.

As part of the manufacturing process of CMOS circuitry, such as that employed in the above-referenced Intel CPUs and the controller chips 10, 26, and 28 of FIG. 1, a diode circuit is connected to each of the input and output pins for preventing damage to the circuitry from static charge due to handling during the manufacturing process. These diode circuits remain in the circuits when installed in the system.

A problem created by powering down the CPU while the rest of the system is operational is that after power-down, the diodes may cause the CPU to continue to draw power due to signals from the other circuits in the system even though power to the CPU itself has been shut down.

Additionally, such signals may cause the diodes in the diode circuits to be driven into a saturation and latch-up condition such that the inputs to the CPU may be latched up which prevents the CPU from operating even after power is resupplied. In order to unlatch the inputs, it will be necessary to shut off power and then turn power back on to the entire system, which is not desirable.

A further problem is encountered when the CPU is in the process of being powered down while the rest of the system is operational. When power to the CPU is in the process of being shut down, signals may be provided from the CPU to the system controller and I/O controllers which will be erroneously interpreted as valid signals, causing undesirable effects.

One type of microprocessor, by way of example the Intel 80C 286, can be disabled to reduce power consumption by shutting off the clock. This type of microprocessor will retain the states of its registers even though the clock has been disabled. Other types of microprocessors, such as the Intel 80286 and 80386SX, cannot be disabled by shutting off their clocks. To power down this latter type of microprocessor, it is necessary to store the contents of the registers in RAM 30, then shut off power to the microprocessor so that when power is restored, the content of the registers can be restored from the RAM to CPU, enabling the CPU to continue on from the point where power down occurred. Programs for storing the contents of the registers from the microprocessor to RAM and for restoring the content of the registers after power up are well known in the art.

These and other problems and disadvantages of existing systems are overcome with the present invention.

SUMMARY OF THE INVENTION

Briefly, an embodiment of the present invention is a system controller for use in a computer system. The computer system has input/output devices for communication of digital signals in the system. A clock pulse string sequenced microprocessor processes the digital signals. An activity indicator indicates activity in the system. The controller has an input for receiving the activity indications. A clock generator normally generates the clock pulse string through the output for sequencing the microprocessor. The clock generator normally forms the clock pulse string with first clock pulse characteristics, and also includes a switching circuit responsive to an activity indication through the input for momentarily switching the clock pulse string to one having a second clock pulse characteristic and then switching back to the first characteristic. A programmable controller selects any of a plurality of clock pulse characteristics for at least one of the first and second clock pulse characteristics for the clock pulse string.

A number of advantages may be achieved from an embodiment of the present invention. By allowing the clock generator to be programmed, the system designer, or possibly the user, can select the optimum characteristic of the clock pulse string to minimize power consumption and to optimize system performance. The characteristic is, by way of example, clock frequency and, in addition or alternatively, clock duty cycle. The first clock pulse characteristic may be high speed or frequency of clock, and the second characteristic may be low speed or frequency of clock.

Thus, the user has flexibility and may select a high speed clock that has a higher frequency in one system and a lower frequency in another. The user can also independently select a low speed clock that has one frequency in one system and another frequency in another. The frequency of either or both high and low speed clocks can be selected considering the speed with which it is desired for the CPU to operate and the amount of power it is desired for the CPU to consume. Thus, the user can optimize the frequency of the CPU clock, frequency of the CPU clock during high speed and low speed conditions in the system, and duty cycle of the CPU clock for a given clock frequency.

An embodiment of the invention is a system controller and a keyboard controller for use in a computer system. The keyboard controller provides clock pulse characteristic selection values received from a keyboard to the system controller. The computer system includes input/output devices, including the keyboard controller, for communication of digital signals in the system. A clock pulse string sequence microprocessor processes the digital signals. Activity indicators indicate activity in the system. The system controller includes the following: an input receives the activity indication; a data value input receives data values from the system; an output provides clock pulses to the microprocessor; a clock generator applies the clock pulse string through the output for sequencing the microprocessor. The clock generator normally generates the clock pulse string with a first clock pulse characteristic, and is operative after an activity indication is received at the activity indication input for switching the clock pulse string to one having a second clock pulse characteristic momentarily and then switching back to the first characteristic. A programmable controller is responsive to a clock pulse characteristic selection value received at the data value input from the keyboard controller for selecting any of a plurality of clock pulse characteristics for at least one of the first and second clock pulse characteristics for the clock pulse string. The keyboard controller includes an output for providing a clock pulse characteristic selection value to the data value input of the system controller.

Briefly, an embodiment of the present invention is for minimizing power consumption in laptop computer systems. One embodiment is a system controller for managing communication of digital data over a bus structure between a microprocessor, a memory and input/output controllers in the computer system. The computer system has at least one power supply for powering the microprocessor and the input/output controllers. A first switch enables and disables power from the power supply to the microprocessor. A separate switch enables and disables power individually or separately to the input/output controllers independent of power to the microprocessor. The system is arranged for providing indications of inactivity by the microprocessor, and indications of requested activity for the microprocessor which is required by the input/output controllers. The system controller has at least one input for receiving indications of inactivity and of activity requests, and at least one output. A power management controller is operative upon occurrence of the microprocessor inactivity indications for enabling the first switching circuit, through the at least one output, to disable power to the microprocessor without disabling power to the input/output controllers. The power management controller is responsive to the activity request indications for enabling, through the at least one output, the first switching circuit to reenable power to the microprocessor. With such an arrangement, the system controller is able to remove power from the microprocessor and thereby reduce power consumption by the microprocessor when it is in an inactive condition without disrupting operation in the rest of the system.

Preferably, a signal driver is coupled to each of a plurality of system controller outputs for inhibiting any power from the system controller to the microprocessor between the time power to microprocessor is disabled and the time power is reenabled. Also preferably, the system controller includes a timing and control means for enabling each of the drivers to commence inhibiting at a time at least as early as the time that power to the microprocessor is disabled, and preferably prior to that time. With such an arrangement, power-protect diodes, which are normally connected to the inputs of the processor during the manufacturing operation, will not be forced to a saturated condition and therefor will not latch up due to signals from the system controller when power is being removed from the CPU.

The system controller has a plurality of system controller inputs through which signals from the microprocessor are received and responded to by the system controller. Preferably, an individual signal buffer is provided for each of the inputs which is adapted for inhibiting signals into the system controller from the microprocessor between the time that power to the microprocessor is disabled and the time that power is reenabled. In a preferred embodiment, each signal buffer includes a buffer input coupled to the corresponding system controller input for receiving signals from the microprocessor, an output providing a signal input to signal sensing circuits in the system controller, and a logic and control circuit for forcing a signal at the signal input to any one of a plurality of predetermined logic levels between the time that power to the processor is disabled and the time that power is reenabled. Such a signal buffer prevents the system controller from recognizing spurious signals which will be erroneously interpreted by the system controller.

The present invention also provides a system controller for managing power consumption in a battery operated computer. The computer includes a microprocessor, a plurality of units including input/output controllers, a keyboard controller and a memory. A main data bus is for direct communication of data signals with the system controller, the microprocessor and the units and a local data bus for communication of data signals by at least one of the units to the system controller. A power management controller has a sequencer that is operative, responsive to data signals, for controlling a sequence of operations of the power management controller for management of power consumption in the computer. A plurality of programmable registers control the sequencer during the management of power consumption. A first plurality of data inputs receive signals representing the data signals from the main data bus for the programmable registers. A second plurality of inputs receive signals representing the data signals from the local data bus for the programmable registers. A circuit loads data signals represented by the signals provided on either the main data bus or the local data bus into at least one of the programmable registers.

Preferably, the system controller is an integrated circuit chip and each input and output of the system controller is a pin on the chip.

BRIEF DESCRIPTION OF THE DRAWINGS

FIG. 2 depicts an integrated circuit chip package containing the system controller for use in the system of FIG. 1;

FIGS. 2A through 2H, 2K, 2L, 2M and 2O are schematic and block diagrams of the system controller in the system of FIG. 1 and embodying the present invention. FIGS. 2K, 2L, 2M and 2O primarily disclose how power down and resume features are implemented. For convenience some of these FIGS. also depict busses external to the system controller used in the system of FIG. 1;

FIG. 2I is a state diagram illustrating the sequence of operation of the local control state machine in local control 200;

FIG. 2J is a timing diagram illustrating the sequence with which certain handshaking and timing signals occur during the operation of the local control state machine;

FIG. 2N is a power management state diagram depicting the operation of the power management state machine in the system controller of FIGS. 2K;

FIG. 3 depicts the RAD bus, the disk controller, the keyboard controller, the PMCOUT latches, the multiplexer 66 and the turbo switch and relevant input and output circuits used in connection with loading of a data value into the controller register located in the system controller;

FIG. 5 is a schematic diagram of the multiplexer located in the serial/parallel interface controller of FIG. 1 depicting the way in which interrupt lines are multiplexed to a smaller number of inputs to the system controller;

FIG. 6 is a high level flow chart illustrating the sequence of events in loading the control register in the system controller under program control by the CPU;

FIG. 7 is a high level flow chart illustrating the sequence of events in loading the control register from the keyboard;

DETAILED DESCRIPTION

Figure 1:
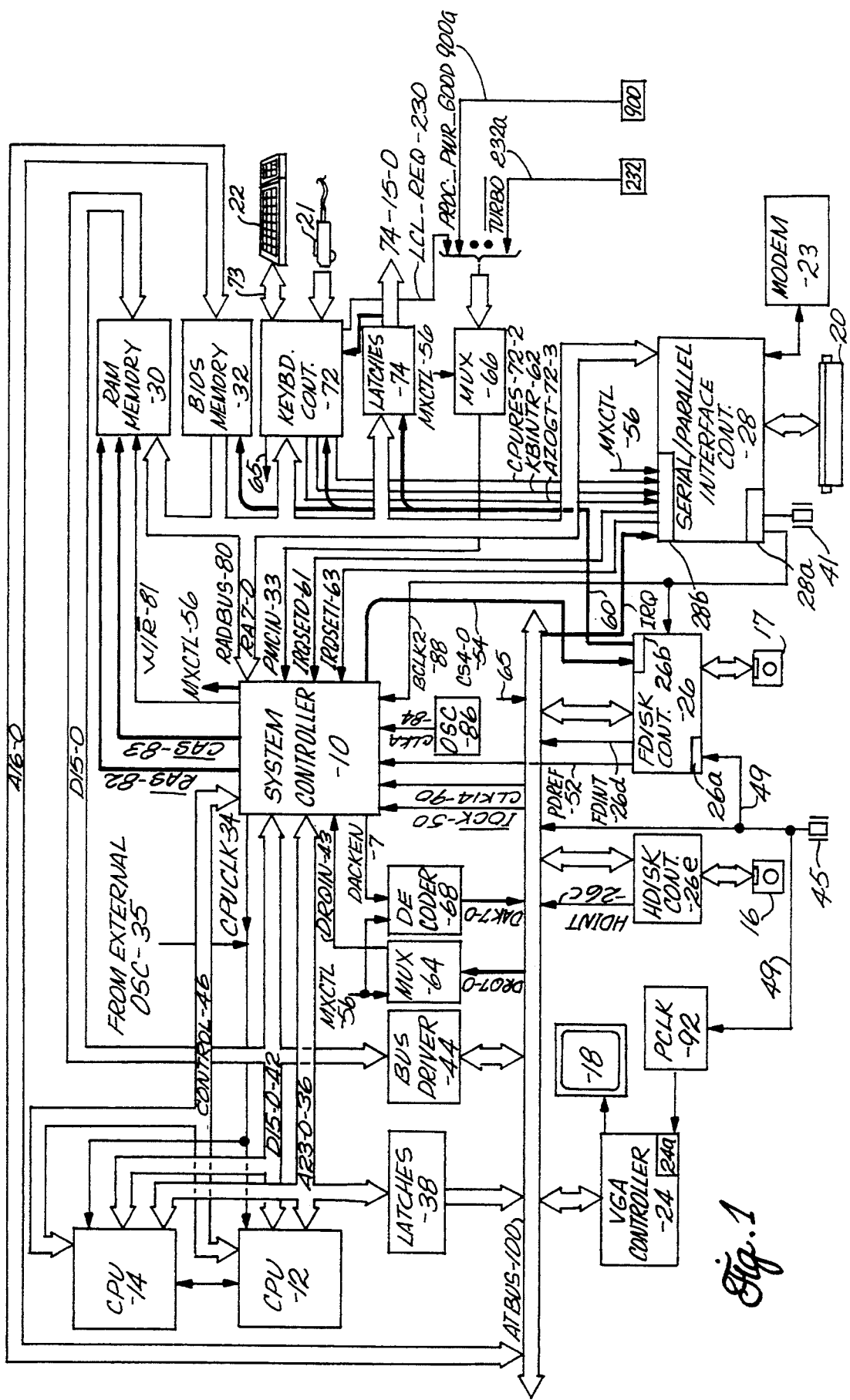
FIG. 1 is a schematic and block diagram of an integrated circuit core logic chip system controller in a laptop computer system and embodying the present invention.

FIG. 1 depicts a microprocessor system in a laptop or notebook-type computer incorporating power-saving and clock frequency and clock duty cycle optimizing features and embodying the present invention.

The drawings depict a group of signal lines by a thick line in the drawing, and a single signal line by a thin line in the drawing. Some parts are repeated from one drawing to another. The same reference numeral is used to identify the same part from drawing to drawing.

The system, by way of example, includes a conventional 16-bit AT bus 100, coupled to a CPU 12 and, if required, a math co-processor 14. Address bus 36, data bus 42 and control bus 46 have lines which are coupled to lines on the AT Bus 100 and pass signals back and forth between the AT Bus 100. The AT bus structure and the protocol, electrical characteristics and timing of signals applied to and received from the AT bus are, unless otherwise indicated, essentially the same as the industry standard architecture (ISA), or alternatively may be the extended industry standard architecture (E-ISA) disclosed in the book entitled AT Bus Design by Edward Solari, published by Annabooks, 1990, the disclosure of which is incorporated herein by reference (hereinafter AT Reference). Other bus systems may be employed within the scope of the present invention. Although other microprocessors may be used, the CPU 12 and math co-processor 14 are preferably the 80286 and 80287 integrated circuit microprocessors, or, respectively, the 80386SX and the 80387SX microprocessors, manufactured by Intel Corporation. Unless otherwise specified, reference hereinafter to CPU is intended to refer to either or both CPU 12 and CPU 14.

Conventional hard disk drive 16, floppy disk drive 17, video display 18, a printer 20, mouse data entry device (mouse) 21, and a telephone communication terminal or modem 23 communicate with the CPU over the AT bus 100 through controllers (to be described).

The principal management control functions for the system of FIG. 1 are performed by four integrated circuit chips. These integrated circuit chips are the system controller 10, videographic adapter (VGA) controller 24, a disk controller 26, and a serial/parallel interface controller 28. Each of these chips are implemented in well-known CMOS integrated circuitry for minimizing power consumption.

The system controller 10 provides the main interface with the CPU, performing many of the management and input and output functions of the system traditionally handled by the CPU. The system controller 10 is preferably the system controller chip manufactured by Western Digital under Part No. WD76C10LP disclosed in the technical manual WD75C10, WD76C10, WD76C10LP System Controller For 80386LX and 30286 Desk Top and Portable Compatibles, published in 1991 by Western Digital Corporation, the disclosure of which is incorporated herein by reference.

The system controller has main processor control timing and logic which handles the timing and control interface with the CPU 12. Numeric processor control and timing logic also handles the interface with the CPU 14. Power management control timing and logic interfaces with external multiplexers and latches, and has the ability to power down the main processor or the main processor and the input/output devices and controllers, conserving power essential to portable laptop computers. When in a power-down state, the system controller tristates certain output signals to the CPU so as to prevent unnecessary power from being drawn by the CPU when in a power-down condition, and to prevent latching of the CPU circuits which would prevent the processor from quickly resuming operation.

The system controller also includes memory and an extended memory management system (EMS) control timing and logic which controls access to 16 Mbytes of real memory or 32 Mbytes of expanded memory in RAM 30. The system controller supports non-page mode two-way interleaved memory and provides independent two-way or four-way interleaved page mode access to the RAM. The system controller includes a register file that provides software control of interface signals. In most cases, the registers are addressed by all 16 address bits in the address bus 36. Certain cases exist where the address is expressed by 3 or 4 digit addresses. The system controller also includes interrupt direct memory access (DMA) timer and asynchronous bus control timing and logic enabling transfer of information between each of the input/output controllers depicted in FIG. 1 and the RAM 30, and between the RAM 30 and the CPU and the BIOS memory. Some of the timing and logic referred to in this paragraph are not specifically disclosed herein and can be obtained from the above referenced technical manual, but are not needed for a complete understanding of the present invention.

Significant to the present invention, the system controller 10 provides many power saving management functions employed in the overall system of FIG. 1. One of these power management functions is the ability to select characteristics of the clock pulses applied to the CPU. To this end, the system controller 10 is a programmable controller that can be programmed to select one of several input clocks as a reference for the clock generated to the CPU, to select any of several frequencies for the clock (clock speed) to the CPU, to select any of several duty cycles for the same clock speed to the CPU, and to permit or inhibit automatic switching of the frequency of the clock to the CPU from a normal low frequency (low speed) to high frequency (high speed). Other features of the system controller 10 are to allow direct programming of the system controller 10 from the keyboard 22 and the keyboard controller 72, and permanent speedup of the clock to high speed using turbo switch 232 exposed, by way of example, to the user on the keyboard or a cabinet (not shown) for the computer of FIG. 1.

Normally the CPU is clocked at low speed or frequency so as to minimize CPU power consumption. The speed is increased during periods of high activity such as data transfer between RAM memory 30 and such I/O devices as hard disk 16, floppy disk 17, printer 20, mouse 21, modem 23, keyboard 22 and VGA controller 24.

The system controller 10 provides the main clock pulse string to the CPU 12 over line CPUCLK 34. The system controller can be programmed to provide the clock pulse string to the CPU at a low speed and, automatically and in response to interrupts, temporarily change the clock pulses to high speed during periods of high processing activity in the system.

Twenty-four address lines A23 through A0 (A23-0) in the address bus 36 are coupled between the system controller 10, each CPU, RAM 30 and BIOS memory 32 for providing address information between the CPU and the system controller 10, RAM 30 and BIOS 32. In addition, address bus 36 is coupled through latches 38 to the AT Bus 100. Latches 38 are conventional latches well-known for holding the address signal applied on each line of the address bus 36 by either a CPU or the system controller 10, and for providing sufficient signal drive capability to enable the address signal to be read by one of the devices connected to the AT bus 100.

16-bit data bus 42, having lines D15 through D0 (D15-0), is coupled between the system controller 10, each CPU, RAM 30, and AT Bus 100. Conventional two-way bus driver 44 applies data signals from data bus 42 to AT Bus 100 and vice versa. Additionally, control lines 46 are coupled between the system controller 10 and the CPU for controlling the transfer of address and data information over the AT Bus 100 and for synchronization and sequencing of events as disclosed in the AT Reference. System controller 10 controls the READ-WRITE cycles to RAM 30 with signals applied to output lines W/$\overline{R}$ 81, $\overline{RAS}$ 82 and $\overline{CAS}$ 83.

Referring to FIG. 2, system controller 10 is an integrated circuit chip housed in a 132-pin JEDEC-type plastic QUAD flat package 10a with 34 pins 10b on a side. Preferably, the system controller 10 in package 10a is a low-power 1.25 micron CMOS integrated circuit. Table 6 depicts input and output pins, pin names, and the reference numerals used to identify the corresponding signal lines relevant to the present invention which are connected to each pin/ob.

FIGS. 2A-2F are each surrounded by dashed lines to indicate the circuits of the system controller 10 that are in the package 10a. The pins for each line in and out of the package are illustrated by a circle on a line crossing the dashed lines, except for the busses 36, 42, 46 and 80 for which the circles have been omitted for simplicity. However, it should be understood that there is a line to a pin on the chip in the package for each line in each of these busses. The column "Ref. No." in Table 6 gives the Ref. No. used in FIGS. 2A-2F to identify the input and output pins of the system controller 10. Numerals 36-23 through 36-0 in Table 6 designate lines A23 through A0 of the address line 36, numerals 80-7 through 80-0 designate line RA7 through RA0 of the RAD bus 80, numerals 56-2, 56-1 and 56-0 designate MXCTL lines 2, 1 and 0, and reference numerals 42-15 through 42-0 designate data line D15 through D0 of data bus 42, although the dash number following reference numerals 36, 80, 56, and 42 are not specifically used in FIGS. 2A-2F. The lines $\overline{CAS}$ 83 include lines $\overline{CASH3}$, $\overline{CASH2}$, $\overline{CASH1}$, $\overline{CASH0}$, $\overline{CASL3}$, $\overline{CASL2}$, $\overline{CASL1}$ and $\overline{CASL0}$ and lines $\overline{RAS}$-82 include lines $\overline{RAS3}$, $\overline{RAS2}$, $\overline{RAS1}$ and $\overline{RAS0}$ are each connected to a separate pin to the chip in the system controller 10 as indicated in Table 6. Most of the pins depicted in Table 6 which do not have a number in the Ref. No. column are connected to lines in the control bus 46 for control and timing in the system controller and other portions of the system, but need not be described for a complete understanding of the invention. As indicated in Table 6, power supplies and groundings (not shown) are connected to pins 2, 5, 31, 33, 67, 98, 99, 101, 129 and 132 of the chip in the system controller for providing power to the chip, but a disclosure of the power supplies and their connection on the chip are not disclosed or needed for a complete understanding of the invention.

Even though limited to 132 input and output pins, system controller 10 retains a large number of memory and I/O management functions by multiplexing many of the pin functions. To this end, a multiplexer 64 multiplexes eight direct memory access (DMA) request lines DRQ7 through DRQ0 (DRQ7-0) from AT Bus 100 down to one input line DRQIN 43 and pin on package 10a. Sixteen I/O interrupt requests lines IRQ 15 through IRQ0 (IRQ15-0) 58 from AT Bus 100 and output line KBINTR 62 from keyboard controller 72 are multiplexed by multiplexer 28b of serial/parallel interface controller 28 to an individual interrupt signal on either line IRQSET0 61 or line IRQSET1 63, each connected to a different pin on package 10a. Four lines, MUX control lines 2,1,0 and line DACKEN 7, are each connected to a separate pin in package 10a, and are decoded by decoder 68 to form signals on one out of eight output lines DACK7 through DACK0 (DACK-7-0) to AT Bus 100 as described in more detail in connection with Table 1, Table 1A and FIGS. 5 and 2D.

Consider now the interface between system controller 10 and RAM30, BIOS memory 32, keyboard controller 72, and latches 74. The RAM 30 is a dynamic RAM memory having up to 16 megabytes of memory or, if configured as expanded memory, 32 megabytes of memory. RAM 30 is preferably a conventional CMOS-type integrated circuit type memory, the disclosure of which is incorporated herein by reference, requiring constant refresh to avoid loss of stored information. The refresh circuitry (not shown) is located in the system controller 10.

Writing of data to RAM 30 is enabled by system controller 10 applying a 1 signal, whereas a read of data from RAM 30 is enabled by applying a 0 signal on W/$\overline{R}$ line 81 to RAM 30. The row and column address in RAM 30 is specified by signals on four lines $\overline{RAS}$-82 and signals on eight $\overline{CAS}$ lines 83 generated by the system controller 10 in conjunction with the address signals on lines RA7 through RA0 (RAD7-0, FIG. 1) of RAD bus 80. When the four lines $\overline{RAS}$-82 go from 1 to 0, the row address appearing on RAD bus 80 is clocked into RAM 30, and when the eight $\overline{CAS}$ lines 83 go from 1 to 0, the column address appearing on RAD bus 80 is clocked into RAD bus 30. The data to be written to or read from the RAM 30 is applied over data bus 42, such as by a CPU.

BIOS memory 32 is an electronic programmable read only memory having an access characteristic compatible with the memory-read bus cycle. Address bus reading from BIOS memory 32 is specified by a CPU by applying signals A16 through A0 of address bus 36. BIOS memory 32 is preferably accessed only during start-up when its content is read and copied into a reserved location in the RAM 30. The BIOS memory 32 is selected for reading by a discrete chip-select signal on $\overline{CS}$ line 60 which is formed by chip-select logic 26b in disk controller 26. Memory address is selected by address information over the line A16-0 of AT Bus 100. Eight-bit data read from the BIOS memory 32 is transferred over RAD bus 80 to RAM 30 or to system controller 10.

Keyboard 22 is a conventional keyboard used with IBM-compatible PCs. The keyboard controller 72 transfers digital signals representing data entered on the keyboard 22 and mouse 21 to system controller 10, and transfers information from system controller 10 to the keyboard 22 in a manner well known in the computer art. Keyboard controller 72 allows the user to slow down the frequency of the clock pulse string on line CPUCLK 34 to the CPU upon actuation of a predetermined key or combination of keys on keyboard 22, and also to program the system controller for clock frequency control.

Latches 74 receive control signals from the system controller 10, and provide power management control signals on power management output lines composed of eight lines 74-0 through 74-7 (74-0-7), only one of which receives a signal at any one time depending on the state of the coded signal stored in the latches 74. Lines 74-0 through 74-7 are used in the system of FIG. 1 for power management control and status indication.

MUX 66 is an eight-bit multiplexer for receiving and multiplexing control and or status signals from I/O devices into a single signal on line PMCIN 33 for applying to the system controller 10. By way of example, MUX 66 receives a signal on line $\overline{\text{TURBO}}$ 232a from a turbo switch 232, a signal on line PROC_PWR_GOOD from a processor power detection circuit 900 which is not important for an understanding of the present invention, and a signal on line LCL_REQ 230 from the keyboard controller 72.

RAD bus 80 transfers data between the pins of system controller 10 and the RAM 30, the BIOS memory 32, the keyboard controller 72, the power management latches 74, and the serial/parallel interface controller 28.

The system controller 10 receives reference clock pulse strings on line CLKA 84 from oscillator 86, and on line BCLK2 88 from oscillator 28a in serial/parallel interface controller 28. The system controller 10, under program control, selects one of these two clock pulse strings as the reference source for generating the clock pulse string on line CPUCLK 34 for the CPUs. The system controller 10 also receives and makes use of two additional clock pulse strings on line PDREF 52 from disk controller 26 and on line CLK14 90 from external crystal 45 over the AT Bus 100. Oscillator 86 provides a clock pulse string or line CLKA 84 having a frequency of 32, 40, or 50 MHz to provide the system operating frequency, including one of two clocks used to generate the clock on line CPUCLK 34.

Oscillator 28a receives, by way of example, a 48 Mhz reference clock pulse string from an external crystal 41, and provides, preferably, a 16 Mhz clock signal on line BCLK2 88 to the system controller 10.

External crystal 45 provides, by way of example, a 14.3 Mhz clock pulse string on line CLK14 49 to the oscillator 26a, to clock pulse generator (PCLK) 92, and over the AT Bus 100 and line CLK14 90 to a pin of the system controller. Disk controller 26 also provides a clock on power-down refresh line PDREF 52 to the system controller 10 via AT Bus 100. To be described, clock on line PDREF 52 is used to time the period during which the momentary high speed clock occurs.

The serial/parallel interface controller 28, in a manner well known in the art, controls the transfer serial or parallel data between an I/O device, such as printer 20 or modem 23 and the AT Bus 100. Serial/parallel interface controller 28 may be any one of a number of devices well-known in the art, but is preferably the 84-pin serial/parallel interface made and sold by Western Digital under part No. WD76C30 and disclosed in WD76C30 Peripheral Controller Interrupt Multiplexer, and Clock Generator Device, published by Western Digital on Nov. 5, 1990, the disclosure of which is incorporated herein by reference. Modem 23 is a conventional device used for modulating and demodulating digital signals to and from an I/O device for communication over telephone lines.

Disk controller 26 controls the READ and WRITE operation in floppy disk drive 17 under control of the system controller 10, and transfers address and data information between AT Bus 100 and floppy disk drive 17 in a conventional manner well known in the art. The disk controller 26 is preferably an integrated chip manufactured and sold by Western Digital under part No. WD76C20 and disclosed in WD76C20 Floppy Disk Controller Real Time Clocks IDE Interface and Support Logic Device, published by Western Digital on Oct. 22, 1990, the disclosure of which is incorporated herein by reference.

The disk controller 26 has a decoder 26b which receives chip-select signals on four lined CS4 through CS0 (CS4-0) 54 from four pins on the system controller, and decodes them into signals on 32 discrete chip-select lines 60 for individually selecting I/O devices such as the BIOS memory 32, the keyboard controller 72 and latches 74. Although not shown, during an I/O cycle, lines RA10-8 of RAD bus 80 become line CS2-0, and lines from pins 16 and 15 of chip 10a (DPL and DPH) become lines CS3 and CS4, respectively.

A hard disk controller 26e controls the READ and WRITE operation in hard disk drive 16 under control of the system controller 10, and transfers address and data information between AT Bus 100 and hard disk drive 16 in a conventional manner well known in the art.

PCLK 92 is a Western Digital integrated chip manufactured and sold under part No. WD90C61 and disclosed in WD90CG1 Video Graphics Array Clocks, published by Western Digital on Nov. 20, 1990, the disclosure of which is incorporated herein by reference. PCLK 92 receives the clock pulse string CLK14 from disk controller 26 and provides a number of different clocks for operation of the VGA controller 24.

VGA controller 24 may be any of a number of different VGA controllers well-known in the art, such as the VGA controller manufactured and sold by Western Digital under part No. WD90C20 and disclosed in WD90C20/WD90C22 VGA Flat Panel Display Controller, published by Western Digital on Oct. 31, 1990, the disclosure of which is incorporated herein by reference. The VGA controller 24 takes digital color and graphic information and control signals from AT Bus 100 and converts these signals into pixel information for controlling the operation of the video display 18 in a conventional manner well known in the art.

Power Saving Features of System Controller 10
CPUCLK Register Programming

Refer to FIGS. 2A, 2B, 2E and 3. Control over the clock on line CPUCLK to both CPUs is determined by data values loaded in a programmable CPU clock (CPUCLK) control register 242. CPUCLK control register 242 is shown down to the flip-flop level in FIG. 2B and in block form in FIG. 2E. Register 242 has 16 D-type latches 242-15 through 242-0, only latches 242-15, 242-8, 242-9 and 242-0 being shown by way of example in FIG. 2B.

The CPUCLK control register 242 determines whether the system controller 10 provides automatic switching between low speed and high speed clock pulses line CPUCLK line 34 (FIG. 1), selects the source of clock pulses (from line CLKA 84 or line BCLK2 88) for use in generating the CPUCLK clock signals, and selects the frequency of the high speed, the frequency of the low speed, and the duty cycle for the high speed and low speed CPUCLK clock pulses.

Loading of CPUCLK Control Register Under Program Control

General Description

The data value in the CPUCLK control register 242 can be loaded and modified by a number of methods. Consider initially the way in which the CPUCLK control register 242 is loaded from a CPU under program control with reference to FIGS. 1, 2A and 2B. The CPU obtains a data value to be stored in and the register address of the CPUCLK control register 242 from the program loaded in RAM 30. The CPU applies the data value to be loaded over data bus 42 to pins of system controller 10, and the register address for CPUCLK control register 242 over address bus 36 to pins of system controller 10. The CPUCLK control register 242 is selected in the system controller 10 by a signal on line PT1072 210-1 generated by decoder 210 (FIG. 2A) based on the register address.

On start-up, preferably a basic input/output system (BIOS) program is read from BIOS memory 32, and any required operating system programs, such as MS-DOS, and application programs are read from disk, either from the floppy disk drive 17 or the hard disk drive 16, and stored in RAM 30 under control of the CPU. To be explained, this may include a data value to be loaded into the CPUCLK control register 242. The CPU is preferably programmed so that it accesses and obtains the data value and the register address from the BIOS program, the operating system or the application program in the RAM 30.

Figure 2B:
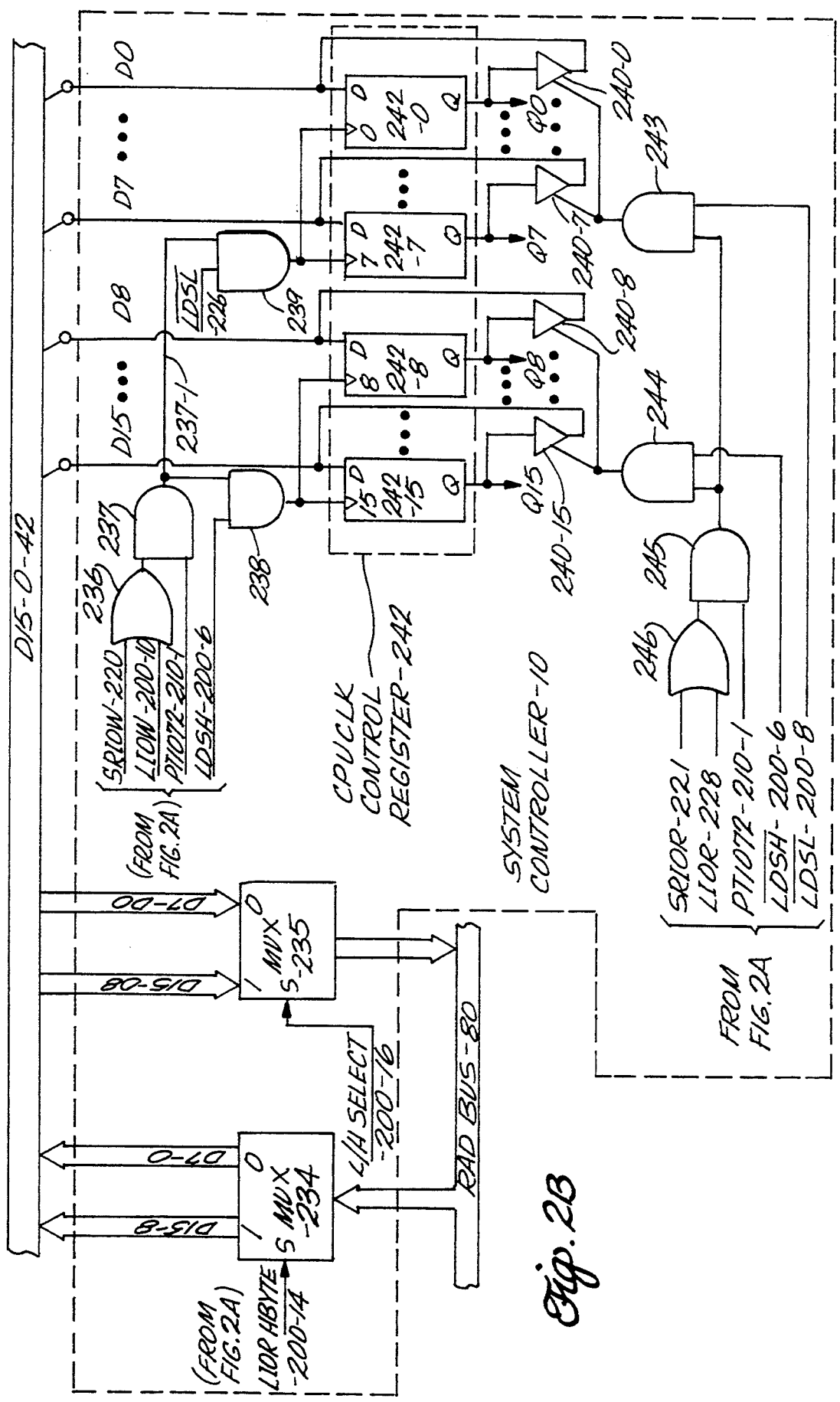

The register address applied on address bus 36 by a CPU is routed to decoder 210 by multiplexers 202 and 204, responsive to a 0 signal on line LOCAL 200-4 (FIG. 2A). The decoder 210 then generates a CPUCLK control register select signal on line PT1072 210-1. The CPU also applies write control signals over control lines 46 to pins of system controller 10, to processor interface 218 logic and control unit (processor interface 218), causing processor interface 218 to generate a signal on AT_REQ line 217, which in turn causes AT Bus controller 10 to form a write signal on line SRIOW 220. Signals on lines PT1072 210-1 and SRIOW 220 together cause OR-gate 236 and AND-gate 237 to apply a 1 on line 237-1 to one input of AND-gates 238 and 239, which in turn causes the CPUCLK control register 242 to read in the data value from lines D15-0 of data bus 42 (FIG. 2B).

As an alternative to or in addition to the above programs, one or more interrupt service programs could be stored in RAM 30, with one or more register addresses and corresponding data values for the CPUCLK control register 242. In response to an interrupt (other than a keyboard interrupt), by way of example, a user-actuated front panel frequency switch, the CPU executes the program or programs contained in RAM 30, applies the data value on data bus 42, applies the corresponding register address on address bus 36, thus causing the system controller 10 to address and store the data value into the CPUCLK control register 242 in the same manner as previously described.

Loading of CPUCLK Control Register from Keyboard
General Description

The content of the CPUCLK control register 242 is modified by activating a predefined function key on the keyboard. The keyboard controller 72 (FIG. 3) contains a clock frequency program which contains the register address of the CPUCLK control register 242 and a data value to be loaded into the CPUCLK control register 242. When the keyboard controller 72 senses the activation of the predefined function key, it initiates a communication protocol with the system controller 10 under control of the clock frequency program, and transfers the register address of and the data value from the clock frequency program to the system controller 10. Once the system controller receives the register address and the data value, the content of the CPUCLK control register 242 is updated, as will now be described.

Referring to FIGS. 1, 2A, 2B and 3, keyboard controller 72 (FIGS. 1 and 3) preferably includes an Intel 8042 self-contained microcontroller chip with an eight-bit CPU 72a, 2K ROM 72b, and 128 byte RAM 72c. Other similar controller chips may be employed. The eight-bit CPU 72a has over 90 instructions and can be custom programmed for a variety of tasks. Local mini operating system program 72d, in local RAM 72b, runs in a loop to continuously monitor the keyboard and mouse for inputs. A data value and register address for CPUCLK control register 242, together with an operation code (opcode), are stored as consecutive bytes in a predetermined location in the local RAM 72c. The opcode tells local control 200 (FIG. 2A) that the CPUCLK register 242 is to be modified or loaded.

When the predefined function key on keyboard 22 is depressed, keyboard 22 sends a signal corresponding to the predefined function key to the keyboard controller 72 over local control/data bus 73. The keyboard controller 72 generates a communication handshake signal on line LCL_REQ 230 in bus 39 (FIGS. 1 and 3) which is coupled through MUX 66 to line PMCIN 33 to a pin of system controller 10, through latch 824 (FIG. 2H) to line LCL_REQ 209 to local control 200 (FIG. 2A) of the system controller 10.

As depicted in Table 1, MUX 66 multiplexes a number of signals, including the signal on line LCL_REQ 230, into one signal on line PMCIN 33 to a pin of system controller 10.

Three MXCTL lines 56, individually referred to as 2,1,0, from counter 701 (FIG. 2D) of the system controller 10 determine which of eight inputs numbered 7 through 0 of MUX 66 (FIG. 3) are connected to output PMCIN 33. By way of example, when MXCTL lines 2,1,0 are 0,0,0, line $\overline{\text{TURBO}}$ 232a is coupled to line PMCIN 33 of MUX 66, and when MXCTL lines 2,1,0 are 0,1,0, input LCL_REQ 230 is coupled to the line PMCIN 33 (Table 1). The other indicated inputs of MUX 66 are reserved for user-defined interrupt or other signals to be determined by system designers or users for control over the system, such as for power management.

Referring to FIG. 2A, the signal LCL_REQ on line PMCIN 33 is latched in latch 824 under control of line LE2 700-2 from decoder 700 (FIG. 2G). As depicted in Table 1A, MXCTL 2,1,0 from counter 701 determine which of eight outputs 700-0 through 700-7 of decoder 700 receive a 1 signal. By way of example, when the MXCTL 2,1,0 is 0,0,0, output LE0 700-0 is a 1, and when the MXCTL is 0,1,0, output LE2 700-2 is a 1. Therefore, when MXCTL is 0,1,0 and MUX 66 (FIG. 3) is coupling a communication hand shake signal on line LCL_REQ 230 to line PMCIN 33 to a pin on system controller 10, a signal is formed on line LE2 700-2 causing latch 284 (FIG. 2H) to apply the signal on line PMCIN 33 to line LCL_REQ 209 to the local control 200 (FIG. 2A). To be explained in more detail later, latch 284 consists of two flip-flops 284-1 and 284-2, respectively, to ensure a clean signal is applied to the local control 200.

Local control 200 responds to the signal on line LCL_REQ 209 by applying a 1 on bit 3 of an eight-bit byte signal over RAD bus 80 to PMCOUT latches 74 (FIG.3). A 1 chip-select signal on line 26b-1 from chip select logic 26b of disk controller 26 and a 1 signal on $\overline{\text{IOW}}$ line 223 from AT Bus controller 216 (FIG. 2A) causes latches 74 to latch in the byte and form a signal on line LOCAL_ACK 74-3 to keyboard controller 72, signalling that local control 200 is ready to read the content of holding register 72-1 of keyboard controller 72. To be explained, local control has a state machine which provides the timing and control signal depicted coming out of local control 200 in FIG. 2A.

The local control 200 (FIG. 2A) has timing in conformance with AT Bus requirements as disclosed in the AT Reference which generates a number of local read/write and multiplexer routing control signals. Local control 200, responsive to the signal on line LCL_REQ 209, generates a 1 signal on line LOCAL 200-4 which causes MUX 204 to apply a register address value to decoder 210 that has been derived by local control 200 from RAD bus 80 and applied on register address bus 211. When line LOCAL 200-4 is 0, an I/O address or a register address on lines A15-0 of address bus 36 is selected by MUXs 202 and 204 and applied to decoders 203 and 210. I/O addresses are also derived from RAD bus 80 and applied on I/O address bus 212 by local control 200. Addresses received by decoder 203 and encoder 205 are decoded to generate chip-select signals on lines CS4 54-4 through CS0 54-0 to pins out of system controller 10. The signals on lines CS4 54-4 through CS0 54-0 are inputs to and are decoded by the chip-select logic 26b of the disk controller 26 (FIG. 3) to generate a discrete signal on one of 32 lines 26b-1 through 26b-32. The chip select signals on line 26b-1 selects PMCOUT latches 74 (FIG. 3), and on line 26b-2 selects the keyboard controller 72 to receive addresses from RAD bus 80.

Decoder 210 generates the CPUCLK control register select signal on line PT1072 210-1 and a select signal on any of multiple I/O select lines 207 based on the address received from MUX 204. The other I/O select lines 207 select other registers (for input and output of data) located in system controller 10 and other chips in the systems of FIG. 1, the details of which are not disclosed or needed for a complete understanding of the invention.

Summarizing, the chip-select lines CS4 54-4 through CS0 54-0 select one of the chips in the system of FIG. 1, and the output lines 210-1 through 210-4 select the register within the selected chip for input and output of addresses or data values.

Referring to FIGS. 2A and 2B, consider how data values are stored into the CPUCLK control register 242. The CPUCLK control register 242 includes 16 D-type latches 242-0 through 242-15, identified as 15-00 in FIG. 2B. A D-type latch is characterized in that whenever a signal is applied at its D input, that same signal is applied at its Q output until a transition from a 1 to a 0 signal occurs at its c (clock) input, at which time the Q output is held at its last value. Processor interface 218 and AT Bus controller 216 together arbitrate the AT Bus 100 cycle and generate the required register read/write signals on lines 220 through 223 at the appropriate bus time (FIG. 2A). A register write signal formed on line SRIOW 220 by AT Bus controller 216 and local I/O write signal formed on line LIOW 200-10 by local control 200 are applied to the inputs of OR-gate 236, the output of which is applied as one input to AND-gate 237. The other input of AND-gate 237 is connected to the register-select line PT1072 210-1 from decoder 210. The output of AND-gate 237 is applied to one input of AND-gates 238 and 239 which control the loading of the high-order byte and low-order byte, respectively, of the data value into the CPUCLK control register 242. Line $\overline{\text{LDSH}}$ 200-6 from local control 200 is the other input of AND-gate 238 and enables or disables writing to the high-order D-type latches 242-15 through 242-8 of the CPUCLK control register 242. Similarly, line $\overline{\text{LDSL}}$ 200-8 from local control 220 is the remaining input of AND-gate 239 and enables or disables writing to the low-order D-type latches 242-7 through 242-0.

Register read signal on line SRIOR 221 from the AT Bus controller 216 and local I/O read signal on line LIOR 200-12 from the local control 200 are applied to the inputs of OR-gate 246. The output of OR-gate 246 is connected to one input of AND-gate 245, the other input of which is connected to the register-select line PT1072 210-1 from decoder 210. The output of AND-gate 245 is connected to one of the inputs of AND-gates 244 and 243 which control the reading to data bus 42 of the high-order latches 242-15 through 242-8 and the low-order latches 242-7 through and 242-0, respectively. Line $\overline{\text{LDSH}}$ 200-6 from local control 200 is connected to the remaining input of AND-gate 244 and enables or disables the signal from gate 244 from causing tristate drivers 240-15 through 240-8 from coupling the Q output of high-order latches 242-15 through 242-8 to data bus 42. Line $\overline{\text{LDSL}}$ 200-6 from local control 200 is connected to the remaining input of AND-gate 243 and enables or disables the signals from gate 243 from causing tristate drivers 240-7 through 240-0 from coupling the Q output of latches 242-7 through 242-0 to data bus 42.

MUX 234 converts two consecutive 8-bit bytes on the RAD bus 80 into 16-bit format for transmission over the D15-D0 data bus 42. A 1 signal on line LIOR_HBYTE 200-14 applied to the channel select input of MUX 234 causes data on RA7-0 of RAD bus 80 to be applied to lines D15 through D8 of the data bus 42. Likewise, a 0 signal on line LIOR_HBYTE 200-14 causes data on RAD bus 80 to be applied to lines D7 through D0 of data bus 42.

A 1 signal on L/H_SELECT 200-16 from local control 200, when applied to the channel select input of MUX 235, causes the high-order byte on lines D15-D8 to be applied to the RAD bus 80, and a 0 signal on line L/H_SELECT 200-16 causes the low-order byte on lines D7-D0 to be applied to the RAD bus 80.

CPUCLK Control Register Load Operations By a CPU

Consider now the overall operation of FIGS. 2A, 2B and 3. First, consider the case where the CPUCLK control register 242 is updated with a new data value by a CPU under program control. This happens during system start-up or in response to an interrupt requesting a different setup for the CPUCLK control register 242. In both instances, a CPU under program control fetches a 16-bit data value and register address for the CPUCLK control register 242 from predefined locations in RAM 30. It then applies the data value to the D inputs of the latches in CPUCLK control register 242 over data bus 42, and the register address to the input of MUX 202 over the address bus 36. Local control 200 is applying a 0 on line LOCAL 200-4 causing MUXs 202 and 204 to select the register address from the address bus 36. The register address is decoded by decoder 210 to produce the signal on line PT1072 210-1 which enables AND-gate 237. The CPU next applies control signals to the processor interface 218 over the control lines 46. The processor interface 218 asserts a 1 on line AT REQ 217 to the AT Bus controller 216, which starts a bus cycle as is well known in the art, and sends back a signal on line AT_ACK 219 when the AT Bus is free. Thereupon, the AT Bus controller 216 asserts a 1 on line SRIOW 220 causing the outputs of OR-gate 236 and AND-gate 237 to go to 1. Both $\overline{LDSH}$ and $\overline{LDSL}$ from local control 200 are a 1 and the outputs of AND-gates 238 and 239 both become 1, enabling latches 242-15 through 242-0 to load the high- and low-order bytes, respectively, of the data value from the data bus 42.

To read out the content of the CPUCLK control register 242 back to the data bus 42, the same process is followed, except the AT Bus controller 216 applies a 1 to line SRIOR 221 to OR-gate 246 causing its output to go to 1. A 1 on line SRIOR 221 and a 1 on CPUCLK control register select line PT1072 210-1 cause the output of AND-gate 245 to AND-gates 244 and 243 to go to a 1. A 1 on line $\overline{LDSH}$ 200-6 causes AND-gate 244 and a 1 on line $\overline{LDSL}$ 200-6 causes AND-gate 243 to apply a 1 to enable tristate drivers 240-15 through 240-0 to couple the high and low order bytes in CPUCLK register 242 to the data bus 42.

CPUCLK Control Register Load Operation From Keyboard

Now consider loading of the CPUCLK control register 242 from keyboard 22 with reference to FIGS. 1, 2B and 3. When a predefined function key, or combination of keys, is depressed, the keyboard controller 72 recognizes it as the initiation of the loading of the CPUCLK control register 242 from the keyboard. The format of the data value portion of the program in RAM 72C (FIG. 3) for loading the CPUCLK control register 242 is depicted in Table 7. A byte of data, consisting of an opcode and register address of the CPUCLK control register 242, is fetched from local RAM 72C and loaded into holding register 72-1 in keyboard controller 72 (FIG. 3). The signal on line LCL_REQ 230 is asserted to 1 and applied to the local control 200 of the system controller 10 after being multiplexed by MUX 66, according to Table 1, as a 1 on line PMCIN 33. Latch 824 forms a 1 signal line LCL_REQ 209 from the multiplexed signal PMCIN 33 responsive to a 1 on line LE2 700-2. Upon sensing the 1 at LCL_REQ 209, the local control 200, processor interface 218 and AT Bus controller 216 start a bus arbitration cycle to determine when the AT Bus is free or forces the AT Bus to be free. As soon as the AT Bus 100 is free, local control 200 causes a 1 on line LOCAL_ACK 74-3 to keyboard controller 72 over the RAD bus 80 and latches 74. Upon receiving the signal on line LOCAL_ACK 74-3, keyboard controller 72 fetches from a predetermined location in RAM 72C a byte from program 72d consisting of an opcode and the register address of the CPUCLK control register 242, then stores the byte in holding register 72-1, and then de-asserts to 0 the signal on line LCL_REQ 230. The local control 200, upon sensing the 0 on line LCL_REQ 230, initiates an I/O read operation from the keyboard controller 72 as follows.

The local control 200, causes the AT Bus controller 216 to assert a 0 on line $\overline{IOR}$ 222 to the keyboard controller 72. The local control 200 also generates a 1 on line LOCAL 200-4 causing MUX 202 to select the address on line 212 from the local control 200 and not from the address bus 36. The way in which I/O addresses are applied to I/O address bus 212 and used is not disclosed as it is not essential to an understanding of the invention. Decoder 203 and encoder 205 together encode the address from address bus 36 to signals on lines CS4 54-4 to CS0 54-0 and apply it to the chip-select logic 26b of the disk controller 26 causing a 1 on line CS8042 26b-2 to select the keyboard controller 72 for an I/O read operation. The opcode and register address byte in keyboard controller holding register 72-1 is then read into data buffer 200-1 in the local control 200 via RAD bus 80. Next, the high-order byte of the data value (DATA HIGH ORDER BYTE, Table 7) is obtained and stored into holding register 72-1, and a 1 is again asserted on line LCL_REQ 230.

The local control 200 in the meantime has decoded the opcode part of the opcode and register address in data buffer 200-1 and determined that a write operation to the CPUCLK control register 242 is requested. The register address part is applied over register address bus 211 through MUX 204, and is decoded by decoder 210 to generate a 1 on CPUCLK control register select line PT1072 210-1. A 1 is again asserted on line LOCAL_ACK 74-3 when the AT Bus 100 becomes free, and another I/O read from the holding register 72-1 to the CPUCLK control register is initiated. To this end, the content of the keyboard controller holding register 72-1 is put onto the RAD bus 80. Local control 200 applies a 1 on line LIOR_HBYTE 200-14 to MUX 234 which routes the high-order byte of the data value on RAD bus 80 onto lines D15 to D8 of the data bus 42. The local control 200, in cooperation with the AT Bus controller 216, asserts a 1 on line SRIOW 220 and a 1 on line $\overline{LDSH}$ 200-6. The application of a 1 on lines SRIOW 220, PT1072 210-1 and $\overline{LDSH}$ 200-6 to logic gates 236, 237 and 238, respectively, causes the high order latches 242-15 through 242-8 of CPUCLK control register 242 to latch in the high-order byte of the data value on lines D15 through D8.

Next, the low-order byte of the data value (DATA LOW ORDER BYTE, Table 7) of the program 72D in RAM 72C is fetched and stored into holding register 72-1. Keyboard controller 72 again asserts a 1 on line LCL_REQ 230. Local control 200 again causes a 1 on LOCAL_ACK 74-3 when the AT Bus is free, and another I/O read from the keyboard controller holding register 72-1 to data buffer 200-1 is initiated as discussed above. This time, a 0 on line LIOR_HBYTE 200-14 enables MUX 234 to route the low-order byte of the data value from data buffer 200 over RAD bus 80 to lines D7 through D0 of the data bus 42. A 1 is also on line $\overline{LDSL}$ 200-6 so that the combined application of a 1 on lines SRIOW 220, PT1072 210-1, and $\overline{LDSL}$ 200-6 to logic gates 236, 237 and 239, respectively, causes the low-order byte of the data value to be latched into latches of the low order latches 242-7 through 242-0 of CPUCLK register 242.

Frequency Switching

Figure 2C:
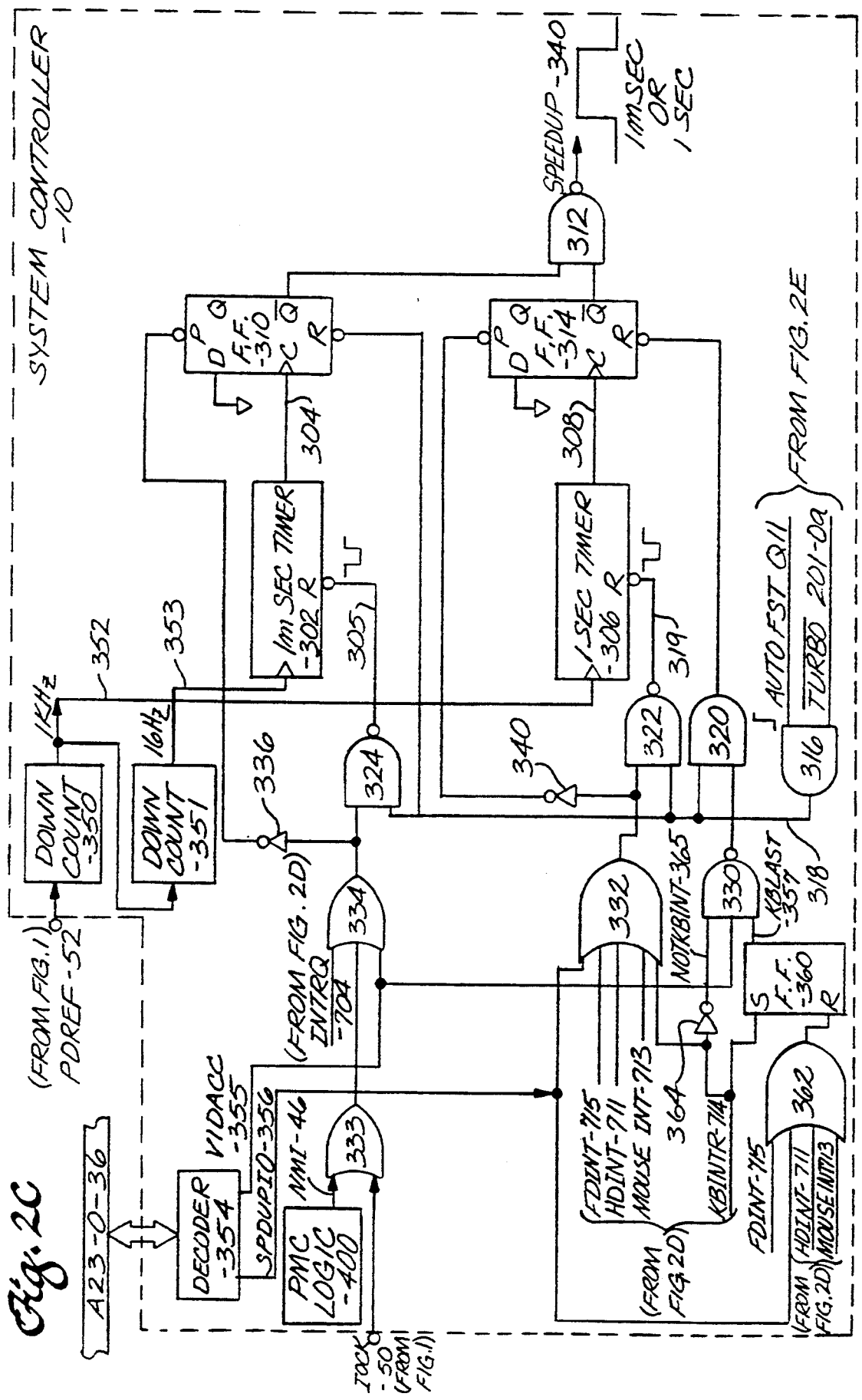

The circuit of FIG. 2E is a switching circuit or means which normally applies a clock pulse string through the output of the system controller to the CPUCLK line 34 with a first characteristic, momentarily switches clock pulse string to one having a second characteristic, and then switches back to one having the first characteristic. As previously mentioned, the clock pulse characteristics may be frequency of the clock pulse string or duty cycle of the clock pulse string. The switching is caused by activity indications in the system, such as interrupts, selection addresses applied on the AT Bus of particular I/O devices, internal conditions in the system such as parity error, overflow conditions or calculation errors in the CPU or one of the I/O devices. By way of specific example, activity indications which cause switching from the first to the second characteristic include a floppy disk interrupt signal on line FDINT 26D from the floppy disk controller 26, a hard disk interrupt signal on line HDINT 26C from the hard disk controller 26E, a mouse interrupt signal on line MOUSEINT 65, or a keyboard interrupt signal on line KNINTR 62 from keyboard controller 72. Other interrupt activity indications include any one of a number of user defined interrupts or other interrupt signals that are multiplexed by MUX 28B of controller 28, and which are demultiplexed by latching circuits 706 and 707 and which are recognized as interrupt signals on line INTRQ 704 by interrupt controller 703 (FIG. 2D). Other activity indications causing switching from the first to the second characteristic include non-maskable interrupts causing a signal on line NMI 46 by PMC logic 400 (FIG. 2C). Non-maskable interrupt signals on line NMI 46 by PMC logic 400 include such conditions as parity errors, overflow conditions and calculation errors in the CPU or other parts of the system. Other non-interrupt activity indications include an address applied on the address lines 36 for selecting VGA controller 24 which causes a signal on line VIDACC 355 from decoder 354 (FIG. 2C).

Refer now to FIG. 2E, and consider the way in which the CPUCLK programmable control register 242 is used to control momentary switching of the CPUCLK clock string from low speed frequency to high speed frequency for selection of the frequencies of the low speed and high speed clocks and for selection of duty cycle of the high and low speed clocks.

Consider first the bits or latches in CPUCLK control register 242 and their function. SRC bit 15 selects one of the sources of clock pulses CLKA 84 and BCLK2 88, a 0 selecting CLKA and a 1 selecting BCLK2.

CLK-SPD bits 14 through 12 select the frequency and duty cycle of the high speed clock as indicated in Table 2. AUT-FST bit 11 permits or inhibits automatic momentary switching of CPUCLK from low speed to high speed clock signals. When AUT-FST bit 11 is 0, it inhibits system control 10 from automatic momentary switching of clock speed at CPUCLK, and when AUT-FST is 1, it permits the system controller 10 to automatically momentarily switch CPUCLK from low speed to high speed for a one-millisecond or a one-second interval whenever an interruption occurs demanding a high speed condition, as will be explained in more detail.

ALT-CLK-SP bits 10, 9, and 8 select the frequency and duty cycle of the low speed clock, as indicated in Table 3.

Bits 06 through 00 are used for other purposes by the system controller 10 which are not of interest to the present invention.

Referring to FIGS. 2C and 2E, the circuits connected to the output of CPUCLK control register 242 form a clock generator for forming the CPUCLK clock pulse string and for selecting the frequencies of the high speed and low speed CPUCLK clock pulse string and its duty cycle. Included in the clock generator is a circuit for normally providing the CPUCLK clock pulse string with a first characteristic and for momentarily switching to the second characteristic and then switching back to the first characteristic. The switching circuit, to be explained, includes gate 290, MUX 286, synchronizer 288, MUX 282 and the timing circuits of FIG. 2C.

The portion of the system controller 10 in FIG. 2C provides a signal on line SPEEDUP 340 to the circuit of FIG. 2E, indicating when the CPUCLK clock speed is to be momentarily switched from low speed to high speed and then returned to low speed.

Multiplexer 258 is a standard multiplexing circuit which responds to 0 and 1 SRC 15 clock source selection values for coupling one of clocks CLKA and BCLK2, respectively, to the line CLKB 260. Thus, the value of the SRC bit determines which of the two clock pulse strings, CLKA and BCLK2, are utilized for generating CPUCLK for the CPUs. Divide-by-two circuit 262, divide-by-four circuit 264, and divide-by-eight circuit 266 are conventional circuits for dividing the frequency of the clock CLKB 260 down by two, four, and eight, respectively, forming the resultant frequency in the clock pulse strings at outputs 268, 270, and 272, respectively.

Figure 4:
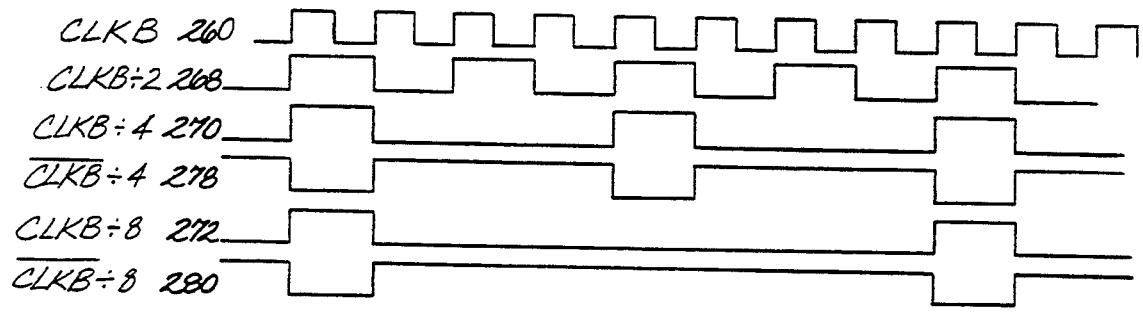
FIG. 4 is a pulse diagram illustrating how the clock pulse strings of different frequencies and duty cycles are derived from a single clock pulse string source.
Figure 26:
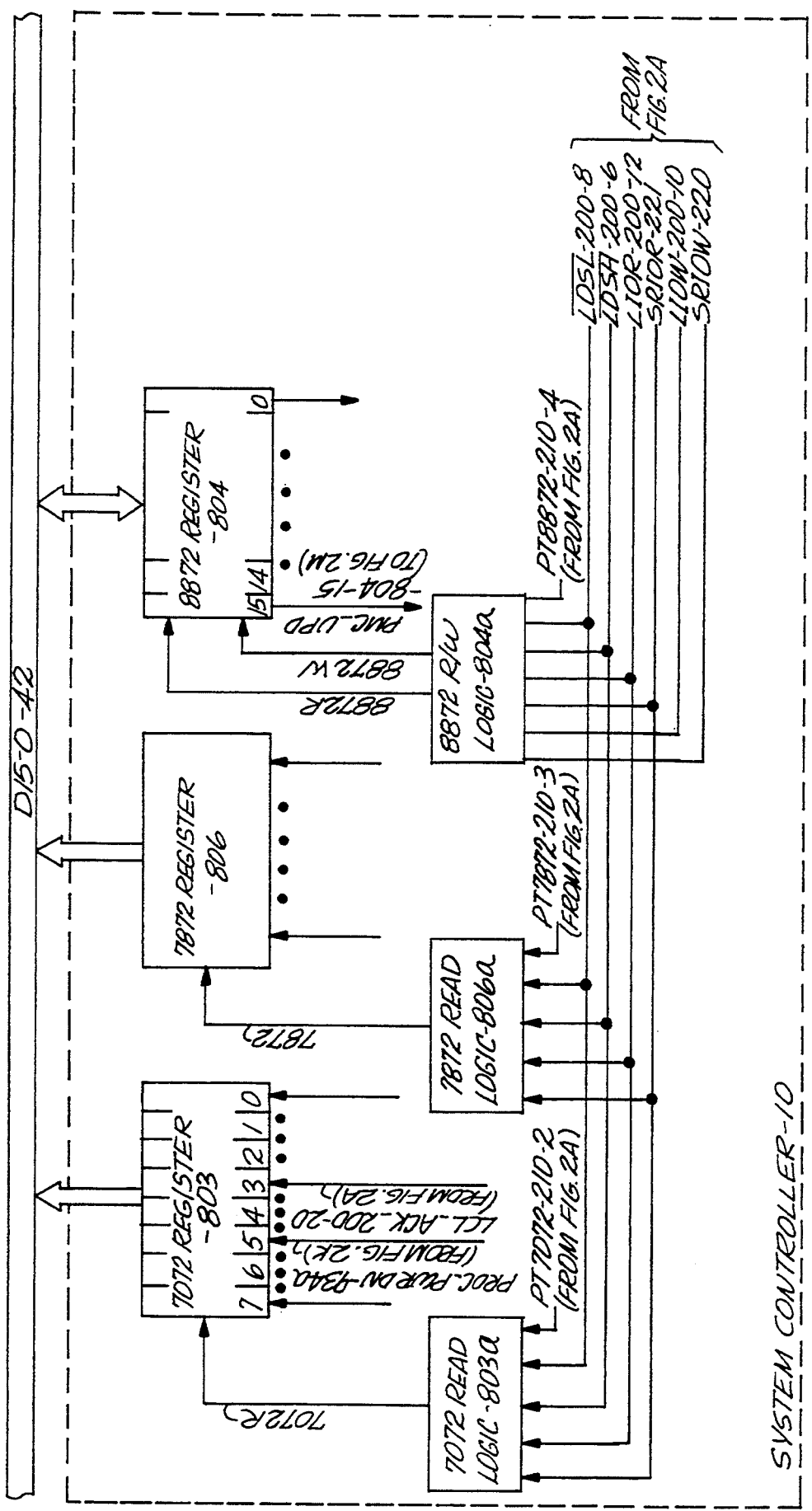

The typical waveform of clock CLKB 260 is depicted at the top of FIG. 4. The CLKB%2, CLKB%4 and CLKB%8 at outputs 268, 270, and 272 are depicted below. The duty cycle or percentage of time that the clock pulse is a 1 is 25% for CLBK/4 at line 270 and 12% for CLK/8 at line 272. Conventional signal inverter circuits 274 and 276 invert the signals at lines 270 and 272 and generate signals at line 278 and line 280, respectively. Thus, the clock pulse strings at lines 278 and 280 have the same frequencies as those at lines 270 and 272, but have duty cycles that are more, i.e., 75% and 88% respectively. Multiplexer 282 is a conventional multiplexer which couples one of the clock pulse strings at lines 260, 268, 270, 278, 272 and 280 to tristate driver 294.

Synchronizer 288 of system controller 10 ensures that the clock pulses are switched synchronously from one frequency to another to avoid undesirable glitches. The synchronizer 288 (FIG. 2F) is a logic circuit consisting of three sets 288-1a and 288-1b, 288-2a and 288-2b, and 288-3a and 288-3b of columns of cascaded D-type flip-flops 288, where the numerals 1, 2 and 3 indicate the column and the letters a and b indicate the upper and lower flip-flops, respectively, in each column. Each set consists of two flip-flops connected in series in such a way that the Q output of the upper "a" flip-flop is connected to the D input of the lower "b" flip-flop. Common clock line CLKB 260 drives both flip-flops in each set simultaneously. Output lines 286a, 286b and 286c from MUX 286 (FIG. 2E) are connected to the D inputs of flip-flops 288-1a, 288-2a and 288-3a, respectively. The Q outputs 288a, 288b and 288c from flip-flops 288-1b, 288-2b and 288-3b, respectively, are connected to the inputs of MUX 282.

Multiplexer 286 is connected to the Q outputs of ALT-CLK-SP bits 10, 9, and 8, and the CLK-SPD bits 14, 13, and 12. Multiplexer 286 has a select S input connected to the output of NOR-gate 290, which in turn has its inputs connected to line SPEEDUP 340 (FIG. 2C), line $\overline{\text{TURBO}}$ 201-0a through an inverter 291 (FIGS. 1, 3), and the output of NOR-gate 292. As depicted in Table 3, when the ALT-CLK-SP bits are all zero, the clock pulse string to be used is selected solely by the value in the CLK-SPD bits, and therefore the system does not momentarily switch from low speed to high speed clock. The condition where the ALT-CLK-SP bits are all zeros is detected by NOR-gate 292, which in turn applies a 1 to NOR-gate 290, which in turn applies a 0 signal to the S input of multiplexer 286 causing it to apply only the high speed CLK-SPD bits through the synchronizer 288 to multiplexer 282 and thus select the speed and duty cycle of the clock pulses on line CPUCLK 34.

When ALT-CLK-SP does not contain all zeros, NOR-gate 292 applies a 0 to NOR-gate 290. If, in addition, a high speed condition does not exist, a 0 is applied to line SPEEDUP 340 and a 1 to line $\overline{\text{TURBO}}$ 201-0a. This condition causes NOR-gate 290 to apply a 1 to the S input of multiplexer 286, causing it to apply the low speed ALT-CLK-SP bits through synchronizer 286 to multiplexer 282 and thus select the speed and duty cycle of the clock pulses on line CPUCLK 34.

Referring to Table 3, when the ALT-CLK-SP bits are 000 or 001, 010, 011, 100, 101 or 110, respectively, multiplexer 282 couples the clock pulse strings at line CLKB 260, CLKB%2 268, CLKB%4 270, $\overline{\text{CLKB%4}}$ 278, CLKB%8 272 or $\overline{\text{CBLKB%8}}$ 280 to line CPUCLK 34 through tristate driver 294. Thus, the value in the ALT-CLK-SP bits selects both the frequency at which the low speed clock pulses are applied at line CPUCLK 34 to the CPUs and the duty cycle of those pulses.

When a high speed condition is sensed, the circuit of FIG. 2C applies a 1 to line SPEEDUP 340, and when the turbo switch 232 (FIGS. 1 and 3) is actuated on the computer front panel, a 0 is applied on line $\overline{\text{TURBO}}$ 201-0a and is inverted to a 1 by inverter 291 (FIG. 2E) to the input of NOR-gate 290. Assuming that 00 values are in ATL-CLK-SP bits 10,09, NOR-gate 292 forms a 0 input to NOR-gate 290, a 1 formed on either line SPEEDUP 340 or by inverter 290 causes the NOR-gate 290 to apply a 0 to the S input of multiplexer 286, which in turn causes the multiplexer 286 to couple the CLK-SPD bits 14, 13, 12 through synchronizer 288 to multiplexer 282 to select the frequency of the clock-applied on line CPUCLK 34 in accordance with the value in the CLK-SPD bits.

Referring to Table 2, CLK-SPD bits 001, 010, 011, 100, 101, or 110, respectively, cause the clock pulse string at CLKB 260, CLKB%2 266, CLKB%4 270, $\overline{\text{CLKB%4}}$ 278, CLKB%8 272, or $\overline{\text{CLKB%8}}$ 280 to be coupled to line CPUCLK 34 by multiplexer 282. Thus, the value of the CLK-SPD bits determines the speed as well as the duty cycle of the high speed clock at CPUCLK 34.

If the bits in CLK-SPD 14, 13, 12 are all 0s, then as indicated in Table 2, clock signals applied on line 35 (FIG. 1) from an external oscillator are used for the clock on line CPUCLK 34, and the clock selection circuitry of FIG. 3 just described is not used. To this end, OR-gate 293 responds to all 0 bits in CLK-SPD bits 14, 13, 12 for applying a 0 to tristate driver 294 which blocks the signals clock pulse from MUX 282 from propagating over CPUCLK line 34. When at least one of the CLK-SPD bits is a 1, then OR-gate 293 applies a 1 to tristate driver 294, enabling it to couple the clock pulse string from MUX 282 to line CPUCLK 34.

Summarizing, MUX's 282 and 286 and synchronizer 288 form a clock selection circuit for selecting desired frequency of pulses and the desired duty cycle for a given frequency of clock pulses applied on line CPUCLK 34. The selection is determined by the data value contained in the CLK—SPD bits for the fast clock and in the ALT—CLK—SP bits for the slow clock.

Speed-Up Control and Timer Circuit

Refer now to FIG. 2C which depicts the circuitry of the system controller 10 for causing the CPUCLK to automatically switch between low speed and high speed clock signals on line CPUCLK 34, and for disabling the automatic switching.

A speedup in the CPUCLK clock is needed when the VGA controller 24 is being addressed. When the VGA controller 24 is accessed and data is transferred between buffer address space A0000 and BFFFF of VGA display RAM 24a, the CPU speeds up to handle the transfer. Therefore, I/O address decoder 354, responsive to an I/O address on the address bus 36, generates an activity indication or interrupt signal on line VIDACC 355 whenever video buffer address space A0000 to BFFFF of VGA display RAM 24a is accessed. It also generates an interrupt signal on line SPDUPIO 356 whenever certain I/O devices, such as disk controller 26 and math co-processor 14, are accessed. A conventional down counter 350 divides clock PDREF 52 from disk controller 26 (FIG. 1) to a 1 KHz clock on line 352. A second down counter 351 divides the 1 KHz clock to a 16 Hz clock on line 353.

One-millisecond timer 302 receives the 1 KHz clock, and provides a triggering signal at its output 304 at approximately one millisecond after a 0 or reset signal is removed at its reset (R) input. To be explained in more detail, one-millisecond timer 302 is used for momentarily speeding up the clock at CPUCLK 34 responsive to interrupts, such as (a) hard disk, floppy disk, mouse and keyboard interrupts as selected by interrupt controller 703 (FIG. 2D) in accordance with the priority of the interrupts, (b) non-maskable interrupts on line NMI 46 caused by exceptional conditions detected by the power management control circuitry PMC LOGIC 400, and (c) video access interrupts on line VIDACC 355.

One-second timer 306 is responsive to clock signals on the 16 Hz line 353 for momentarily providing a triggering signal at line 308 at approximately one second after a 0 or reset signal is removed at its reset (R) input. The one-second timer 306 is used for speeding up the clock at line CPUCLK 34 responsive to such conditions as access to math co-processor 14 causing an interrupt signal on line SPDUPIO 356, or hard disk, floppy disk, mouse and keyboard interrupts causing interrupt signals on lines HDINT 711, FDINT 716 mouse INT 713 and KBINTR 714, respectively.

The line 304 from one-millisecond timer 302 is connected to the clock (C) input of conventional D-type flip-flop 310 whose $\overline{\text{Q}}$ output is connected to one input of NAND-gate 312. Line 308 from one-second timer 306 is connected to the clock (C) input of another conventional D-type flip-flop 314 whose $\overline{\text{Q}}$ output is connected to a second input of NAND-gate 312. Output of NAND-gate 312 is connected to line SPEEDUP 340, which is connected to the input of NOR-gate 290 in FIG. 2E.

Operation of Speedup Control and Timer Circuit

Referring to FIG. 2C, enabling and disabling of the automatic momentary switching from low speed to high speed clock is under the control of signals from AND-gate 316 having one input connected to line TURBO 201-0a (to be described), and another input connected to the AUTOFST Q11 output of the CPUCLK control register 242 (FIG. 2E). If either the AUTOFST Q11 output is 0 (automatic switching is disabled) or the $\overline{\text{TURBO}}$ 201-0a is 0 output ($\overline{\text{TURBO}}$ switch 232 is actuated), the output of AND-gate 316 will be 0 which disables automatic momentary switching between high and low clock speeds. However, if line $\overline{\text{TURBO}}$ 232a is 0 ($\overline{\text{TURBO}}$ switch 232 is actuated), then regardless of the signal at AUTOFST Q11, the output of NOR-gate 290 (FIG. 2E) will be a 0, causing MUX 286 to select the CLK-SPD 14, 13, 12 lists and permanently speed up the clocks to high speed mode, thereby continuously applying a high frequency or clock speed signal on line CPUCLK 34.

Assume that line $\overline{\text{TURBO}}$ 201-0a is 1 ($\overline{\text{TURBO}}$ switch 232 is not actuated) and the AUTOFST Q11 output is also 1 (automatic switching is enabled), causing a 1 output at line 318 from AND-gate 316. The 1 output at line 318 is applied to enable one input of each of AND-gates 320, 322, and 324. Initially, prior to any interrupt conditions, the outputs of NAND-gate 330, OR-gate 332 and OR-gate 334 are all 0 since each of their inputs are 0. As a result, a 0 is applied to the R inputs of D flip-flops 314 and 310, and a 1 is applied to the R input of one-second timer 306 and one-millisecond timer 302. The D flip-flops 314 and 310 are initially reset to 0 at system start-up (by means not shown), so that their outputs $\overline{Q}$ are at 1 causing both inputs of AND-gate 312 to receive a 1, and therefore causing a 0 at line SPEEDUP 340, a condition under which the low speed clock is selected.

Assume now that an interrupt signal, a 1 signal, is received at one of the inputs to OR-gate 334. The 1 interrupt signal causes the output of OR-gate 334 to be a 1, which in turn is inverted through inverter 336 applying a 0 signal to the preset (P) input of D flip-flop 310. The signal to the P input causes D flip-flop 310 to be set to 1, and therefore form a 0 at its $\overline{Q}$ output to NAND-gate 312, which in turn applies a 1 output at line SPEEDUP 340, commencing the beginning of a one-millisecond speedup of the clock at CPUCLK 34. AND-gate 324 now has a 1 at both of its inputs, and therefore forms a 0 at line 305 to the R input of one-millisecond timer 302, resetting the counter. Next, the interrupt signal to any input to OR-gate 334 is reset by the CPU, removing the 1 signal at the input of OR-gate 334, causing the output of OR-gate 334 to go to 0. A 0 input to NAND-gate 324 causes a 1 to be applied to the R input of one-millisecond timer 302 enabling the timer, thereby commencing the one-millisecond countdown. When one millisecond has elapsed, the one-millisecond timer 302 applies a 1 pulse at its output 304 to the C input of D flip-flop 310. The D input of flip-flop 310 is connected to ground, and therefore the pulse at the C input causes flip-flop 310 to be set to 0 and form a 1 at the $\overline{Q}$ output to gate 312, which in turn causes the line SPEEDUP 340 to return to a 0, a 0 terminating the one-millisecond pulse at SPEEDUP line 340. Once the $\overline{Q}$ output of the D flip-flop 310 has returned to a 1, further pulse on line 304 has no effect on its $\overline{Q}$ output. The operation of the one-second timer 306 is similar to that described above for the one-millisecond timer 302. Assuming that a 1 signal is still being formed on line 318 from AND-gate 316 and that an interrupt signal has formed at one of the inputs of the OR-gate 332 causing a 1 to be applied to the input of AND-gate 322 hence to inverter 340, which forms a 0 to the preset (P) input of D flip-flop 314, thereby causing a 0 to be formed at the $\overline{Q}$ output to NAND-gate 312. This in turn causes NAND-gate 312 to form a 1 at line SPEEDUP 346, commencing a one-second timing pulse. Since both inputs to AND-gate 322 are 1, the R input to the one-second timer 306 is now 1, causing the counter to reset. Next, the interrupt signal to the input of OR-gate 322 is reset to 0 by the CPU, thereby causing the output of OR-gate 332 to return to 0, which in turn causes the output of NAND-gate 322 to become 1 enabling the one-second timer 306, thereby commencing counting of the one-second timer 306. After one second has elapsed, the one-second timer 306 will form a pulse at the 308 output to the C input of D flip-flop 314. Since the D input of flip-flop 314 is connected to ground, the flip-flop 314 is set to 1 so that a 1 is again formed at the $\overline{Q}$ output, causing NAND-gate 312 to drop the output signal at SPEEDUP 340 back to 0, thereby terminating the one-second pulse at line SPEEDUP 340.

Certain conditions and corresponding activity indications occur where it is necessary to terminate the one-second timing pulse formed by the one-second timer 306 early. This occurs when the current interrupt has been serviced, (i.e., NOTKBINT 365 is 0), the last interrupt was a keyboard interrupt, (i.e., KBLAST 357 is 1), and then a video access interrupt occurs, (i.e., VIDACC 355 is 1). When these conditions are met, all inputs to NAND-gate 330 are 1, causing a 0 input to AND-gate 320, which in combination with a 1 from AND-gate 316 causes AND-gate 320 to apply a 0 to the R input of D flip-flop 314, resetting the flip-flop so that a 1 is formed at the $\overline{Q}$ output, which in turn causes NAND-gate 312 to terminate the one-second pulse at line SPEEDUP 340 early. Table 5 summarizes the different modes based on the two signals $\overline{\text{TURBO}}$ and AUTOFST as follows. When AUTOFST is a 0, auto speedup is disabled regardless of the signal on $\overline{\text{TURBO}}$. When $\overline{\text{TURBO}}$ is a 0, then the circuit is in the permanent speedup mode. When both $\overline{\text{TURBO}}$ and AUTOFST are 0's, then the circuit is in the automatic speedup mode.

A discussion of how the interrupt signals are formed will be provided hereinafter.

Interrupt Handling

Consider how I/O interrupts, especially those relating to the automatic frequency switching feature, are handled with reference to FIGS. 1, 3 and 5. Keyboard controller 72 generates interrupt signals indicating when the keyboard controller 72 requires access to the system of FIG. 1 for the keyboard 22 and the mouse 21. To this end, the keyboard controller 72 polls the keyboard and mouse for a user entered data and generates an interrupt signal on line KBINTR 62 (FIG. 1) for a keyboard data entry, and on line MOUSEINT 65 for a mouse data entry. Referring to FIGS. 1 and 5, line MOUSEINT 65 is connected over the AT Bus to line IRQ12 (MOUSEINT) 65 to multiplexing circuit 28b. Line KBINTR 62, (also line IRQ1) is connected directly to multiplexing circuit 28b line HDINT 26c (also line IRQ 14) is connected on the AT Bus to line input 6 of MUX 28b-1, and line FDINT 26d (also line IRQ 6) is connected on the AT Bus to line INPUT 6 of MUX 28b-2. The rest of AT Bus 100 interrupt lines IRQ0 through IRQ15 are connected to the inputs of two individual multiplexers MUX 28b-1 and 28b-2 of multiplexer 28b.

Other than line IRQ1 (KBINTR) 62, IRQ12 (MOUSEINT) 65 and IRQ 14 (HDINT 26c) and IRQ 6 (FDINT 26d), the interrupt lines and their use are not described in detail and are not needed for a complete understanding of the invention.

Referring to FIGS. 1, 2D and 5, all I/O interrupts, with the exception of the keyboard interrupt IRQ1 (KBINTR) 62, are routed as individual signal lines from the generating device to the interrupt multiplexing circuit 28b. The interrupt multiplexing circuit 28b consists of two eight to one (8:1) MUXs 28b-1 and 28b-2, respectively. The interrupt signals are applied to each input of the MUXs. The inputs are continuously time-multiplexed to output lines IRQSET0 61 and IRQSET1 63 according to the value of the output MXCTL 2,1,1 56 from counter 701. Table 1 shows the multiplexing scheme for MUX 28b-1 and MUX 28b-2. By way of example, when MXCTL outputs 2,1,0 56 have the values 001, then IRQ9 and IRQ1 (KBINTR 62) appear over outputs IRQSET0 61 and IRQSET1 63, respectively.

Referring to FIG. 2D, signal lines MXCTL 2,1,0 56 are generated by a continuous counting counter 701 inside the system controller 10. A 3:8 decoder 700 decodes the three outputs MXCTL 2,1,0 56 into 8 individual latch-enable signals on lines LE0 through LE7 (LE 7-0) for use in reconstituting the multiplexed interrupts. By way of example, the two multiplexed interrupt lines IRQSET0-61 and IRQSET1-63 are applied to each data input of two sets of seven latches 706 and 707, respectively. The interrupt signal on line IRQSET0-61 is applied to latches 706-0 through 706-7, and the interrupt on line IRQSET1-63 is applied to latches 707-0 through 707-7. Since the latches are clocked by individual latch-enable signals (LE 7-0) from decoder 700 which are synchronous with and derived from the outputs MXCTL 2,1,0 56, each latch samples and captures a corresponding interrupt signal. In this way, the multiplexed interrupt signals are reconstituted inside the system controller 10 and applied to the various logic gates in FIG. 2C.

Operationally, as counter 701 counts through its various states forming signals at its MXCTL outputs 2,1,0 56, output pulses are formed sequentially at the outputs LE0 700-0 through LE7 700-7 of decoder 700, as illustrated in Table 1A. The sequential signals formed at outputs LE0 700-0 through LE7 700-7 sequentially enable latches 706-0 through 706-7 and latches 707-0 through 707-7 of the two sets of latches 706 and 707, respectively. The multiplexed two interrupt lines IRQSET0 61 and IRQSET1 63 from multiplexer 28b are demultiplexed by the latches back to signals on sixteen individual interrupt lines 710, 711, 712, 713, 714 and 715 (only exemplary lines are shown) for processing by interrupt controller 703. Line HDINT 711 receives the hard disk interrupt signal, Line FDINT 716 receives the floppy disk interrupt signal, MOUSEINT 713 receives the mouse interrupt signal, and KBINTR 714 receives the keyboard interrupt.

Refer to FIGS. 3 and 2A and consider the formation of the $\overline{TURBO}$ signal on line 201-0a. A $\overline{TURBO}$ signal is formed on line 232a by connecting the movable contact of switch 232 from ground to the fixed contact to line 232a, which in turn is serially connected through the cathode to the anode of diode 240 and resistor 241 to a +V source of potential. Thus, when switch 232 is open, a 1 signal is formed on line $\overline{TURBO}$ 232a, and when closed, a 0 signal is formed on line $\overline{TURBO}$ 232a. The signal on line 232a, together with the signals applied to the inputs of MUX 66, is time multiplexed by MUX 66 to a single output on line PMCIN 33. MUX 66 is controlled by signals MXCTL 2,1,0 in the same manner as described previously for MUX 28b-1 and MUX 28b-2. By way of example, referring to Table 1, when MXCTL 2,1,0 is 0,0,0, the signal on $\overline{TURBO}$ 232a is applied on line PMCIN 33. When MXCTL 2,1,0 is 0,1,0, a signal on line LCL_REQ 230 is applied on line PMCIN 33. The signal on line PMCIN 33 is applied to latch 820 (FIG. 2H) and the signal on line $\overline{TURBO}$ 201-0a is reconstituted inside the system controller 10 by clocking the latch 820 by latch enable signal LE0 in the same manner described for the interrupt signals.

Table 1 and 1A summarizes the multiplexing and demultiplexing of interrupt signals. By way of example, when MXCTL 2,1,0 are 0,0,0, signal IRQ8 is applied to the output of MUX 28b-1 as signal IRQSET0-61, signal MOUSEINT is applied to the output of MUX 28b-2 as IRQSET1-63 and signal $\overline{TURBO}$ is applied to the output of MUX 66 as PMCIN 33.

Also latch enable signal LE0 becomes a 1 and latches in the signals on line IRQ8 into latch 706-0, on line MOUSEINT into latch 0 707-D and on line $\overline{TURBO}$ into latch 820.

Refer back to FIG. 2C and consider the formation of the signals on lines NOTKBINT 365 and KBLAST 357. The 1 signal on NOTKBINT 365 is formed by inverter 364, responsive to the interrupt signal on the KBINTR line 714. Whenever a keyboard interrupt is formed on line KBINTR 714, flip-flop 360 is set to 1, causing a 1 signal on line KBLAST 357 to OR-gate 330. Whenever any other interrupt exists, such as a hard disk interrupt on line HDINT 711, a floppy disk interrupt on line FDINT 716 or a mouse interrupt on line MOUSEINT 713 or a speed-up signal on line SPDUPIO 356, OR-gate 362 resets flip-flop 360 causing a 0 signal on line KBLAST 357. Therefore a 1 on signal KBLAST indicates that the keyboard was the I/O device which asserted the last interrupt.

The reconstituted interrupt signals are prioritized and managed by logic circuit interrupt controller 703 which is functionally the same as the industry standard 8259 interrupt handler as disclosed at pages 2–120 to 2–137 of the books entitled Microsystems Components Handbook Volume 1 published by Intel in 1984. Thus, controller 703 asserts an interrupt signal on output line INTRQ 704 to OR-gate 334 in accordance with a priority allocated by interrupt controller 703 to the interrupt on lines 710-715. The signal on line INTRQ 704 is also applied to the CPU 12 on one of the lines of the control bus 46.

FIG. 6 is a high level flow chart summarizing the sequence of events in loading the CPUCLK control register under program control. During block 800-1, under program control, the CPU 12 initiates the execution of a "load CPUCLK Control Register Routine" in RAM 30, the steps of which are carried out in blocks 800-2 through 800-5. This event normally occurs at system start-up time but can also occur as a result of interrupt conditions. During block 800-2 the CPU fetches the 16 bit data value to be loaded into CPUCLK control register and the address of the register from RAM 30 and the 16 bit data value is placed into the data bus 42 and the address into the address bus. During block 800-3, the CPU establishes proper communication protocol with the system controller 10 and during block 800-4 sets up MUX 202 and MUX 204 to route the address to decoder 210 which forms the signal on line PT1072 210-1 and AT Bus controller 216 generates a write signal on line SRIOW 220. Signals SRIOW 220 and PT1072 210-1 enables the CPUCLK control register 242 to read in the data value on the data bus 42.

FIG. 7 is a high level flow chart summarizing the sequence of events in loading the CPUCLK control register 242 in response to a special function key from the keyboard. During blocks 900-1 a function key on the keyboard is depressed. During block 900-2 the keyboard controller 72 checks to see whether it is the pre-programmed special function key. If it is not then during block 900-3 the keyboard controller processes the input as a regular keyboard input otherwise, block 900-4 is entered where the keyboard controller fetches an eight bit byte consisting of an opcode and an address of the CPUCLK control register 242 from program 72d in local RAM 72C and stores the byte into holding register 72-1. During block 900-5 the keyboard controller initiates a data transfer request from the keyboard controller 72 to the system controller 10 and upon establishing the proper communication protocol, then during block 900-6 the local control 200 of the system controller reads the content of the holding register into its own data buffer 200-1 on the RAD Bus 80. During block 900-7 the local control examines the opcode to determine the nature of the operation requested. If it is not a "write to CPUCLK Control Register" operation, then during block 900-8 local control processes the operation accordingly. Otherwise, block 900-9 is entered where two additional bytes are read form the keyboard controller. To this end the keyboard controller fetches a second byte, the high order data byte, from the local RAM 72C and places it in holding register 72-1. During block 900-10 the keyboard controller again establishes communication protocol with the local control 200 of the system controller. Upon establishing proper communication protocol, during block 900-11 the local control reads in the 8 bit data from the holding register onto bits D15-8 of the data bus 42 via MUX 234 and RAD Bus 80. The high order byte data is clocked into the high order bits 242-15 to 242-8 of the CPUCLK control register 242. During blocks 900-12, 13 and 14 the process is repeated one more time to read in the low order byte from the keyboard register holding register to the low order byte 242-7 to 242-0 of the CPUCLK control register.

It will be understood to those skilled in the art that other control lines (not shown) are connected between various devices, such as BIOS memory 32, keyboard controller 72, latches 74, and the AT Bus 100 to sequence the operation of the system of FIG. 1, however, a disclosure thereof is not needed for a complete understanding of the present invention.

Activity indicating signals appearing on line PMCIN 33 are asynchronous and serial. Therefore, the signal appearing on line PMCIN 33 need to be reliably converted to static signals for reading by synchronized circuits in the system controller circuits of FIG. 2H. The circuit of FIG. 2H includes latching circuits 820, 822 and 824 which are timed with latch enable signals LE0 through LE6 from decoder 700 (FIG. 2D) so as to latch in and store a corresponding signal into the latching circuits.

Latching circuit 820 includes flip-flops 820-1 and 820-2. A 1 signal appears on line PMCIN 33 due to actuation of turbo switch 232 during the 1 signals at line LE0 700-0 and is latched into flip-flop 820-1 responsive to a 1 on line LE0 700-0 and is subsequently latched from flip-flop 820-1 into flip-flop 820-2 responsive to a 1 on line LE1 700-1. The output of flip-flop 820-1 will stabilize within one clock pulse and, accordingly, the following signal at LE1 700-1 causes the signal from flip-flop 820-1 to be latched into flip-flop 820-2 and provide a stable signal at line $\overline{\text{TURBO}}$ 201-0a.

After the processor power has been applied and brought up to the proper level, a processor power good 1 signal from line PROC_PWR_GOOD to MUX 66 (FIG. 1) appears on line PMCIN-33 during the signal at lines LE1 700-1. Similar to latching circuit 820, the signal at LE1 700-1 latches the power good signal into flip-flop 822-1 and the subsequent signal at LE3 700-3 latches the signal from flip-flop 822-1 into flip-flop 822-2, providing a stable signal at the output line PROC_PWR_GOOD 823.

The local request signal applied on line LCL_REQ 230 from keyboard controller 72 (FIG. 1) is applied on line PMCIN-33 during the signals on line LE2 700-2 and is latched into flip-flops 824-1 and 824-2 similar to that described above with respect to latching circuits 820 and 824 and thus produces a stable signal on line LCL_REQ 209.

FIG. 2G depicts additional registers in the system controller 10 which, similar to the CPUCLK register 242, receive data values from data bus 42 and from which data values are applied to data bus 42. These registers include registers 803, 804 and 806 and corresponding logic circuits 803a, 804a and 806a which enable read and write operations in the corresponding registers. The registers 803 through 806 have latches, input gates and tristate drivers similar to those depicted in FIG. 2B for the CPUCLK control register 242 for enabling the data values to be loaded into the registers and read out of the registers.

Selection signals PT7072 210-2, PT8872 210-4, and PT7872 210-3 from decoder 210 (FIG. 2A) each select one of logic circuit 803a, 804a and 806a, a corresponding one of registers 803, 804 and 806 respectively under control of the remaining control lines to the gates. Thus, a signal provided by the CPU over control bus 46 which causes AT Bus controller 216 to apply a write signal on line SRIOW 220, causes the selected register to store a data value from data bus 42; a signal from the CPU on control bus 46 that causes a read signal from AT Bus controller 216 on line SRIOR-221, causes the selected register to read a value out to the data bus 42; a write signal on line LIOW 200-10 and a read signal on line LIOR 200-12 by local control 200 cause the selected register to write a data value from data bus 42 and read a data value to data bus 42, respectively; when local control 200 forms a 0 on line $\overline{\text{LDSH}}$ 200-6, the high order byte of two bytes in the selected register is inhibited from being read or written; when local control 200 forms a 0 on line $\overline{\text{LDSL}}$ 200-8, the low order of the two bytes in the selected register is inhibited from being read or written.

The 7072 register 803 is special in that the signal from line LCL_ACK 200-20 and PROC_PWR_DN 200-22 (FIG. 2A) are connected to the input of the latches 3 and 5 of register 803 and are coupled through to data bus 42 when register 803 is read.

The outputs of registers 804 and 806 are used in connection with power management functions.

State Machine in Local Control 200

Referring to FIG. 2I, local control 200 contains a state machine 200-2 which generates the sequence of control signals depicted at the output of local control 200 in FIG. 2A. The state machine operation depicted in FIG. 2I and will now be described.

Initially, the state machine is in state S1 where it is idling waiting for receipt of a control signal on either line LCL_REQ 209 or PMC_UPDATE from a power management control circuit which is not shown as it is not needed for an understanding of the present invention. A signal on line LCL_REQ 209 indicates that a request for local access is being made by the keyboard controller 72 and causes the state machine to enter state S2.

During state S2 the state machine first asserts a 1 on line HLDREQ 200-18 to processor interface 218 (FIG. 2A) and then waits for a 1 on line HLDACK 297 back from the processor interface 218. When a 1 is received on line HLDACK 297, the state machine enters state S3 where a 1 is applied on line LCL_ACK 200-20 by local control 200 which, in turn, is applied to register 803 (FIG. 2G) which, in turn, applies the 1 signal over data bus 46 to PMCOUT latches 74 (FIG. 3) which then supplies the signal to LOCAL_ACK 74-3 to keyboard controller 72.

The state machine then enters state S4 where control signals are formed on lines PT 7872 210-3 and LIOR 200-12 or SR10R 221 to logic gate 806a, causing 7872 register 806 to read out its content over data bus 42 to the PMCOUT latches 74 (FIG. 3). The value read out of the 782 register 806 may be user defined, however, it is not important to an understanding of the present invention. A 1 signal will have been formed at LIOR 200-12 if it is a read initiative by local control 200 and a 1 signal will have been formed at SR10R 221 if it is a read initiated by the processor, as described in more detail with respect to FIG. 2B.

The state machine now enters state S5 where it awaits for the signal on line LCL_REQ 209 to go to 0. When a 0 appears on line LCL_REQ 209, an opcode and address (Table 7) has been loaded into the holding register 72-1 from RAM 72C under control of program 72d (FIG. 3). At this time if the state machine was previously triggered by a 1 appearing on line PMC_UPDATE (of no interest to the present invention), the state machine goes to state S10 where the state machines removes 1 signal lines HLDREQ 200-12 and PMC_UPDATE and returns to the idle state S1.

Returning to state S5, assume that the state machine was previously triggered by a 1 on line LCL_REQ 209, the state machine enters state S6 where the opcode and address in holding register 72-1 is coupled through the RAD bus 80 to the data buffer 200-1 in local control 200 (FIG. 2A) where they are stored.

A decision is made by the state machine during state S6 as to whether the opcode specifies a write or a read. If a write is specified, states S7a and S8a are entered, whereas if a read is specified states S7b and S8b are entered.

Assume a write and state S7a is entered. During state S7a, program 72d causes the high byte of the 2 byte data value to be read out of RAM 72c and stored into holding register 72-1 and the state machine then generates the required control signals for causing the high byte to be read out of holding register 72-1 applied through MUX 234 to data bus 42 and stored in the high order bits 15-8 of the CPUCLK control register 242 as specified by the address. During state S8a, program 72d causes the low order byte of the data value to be read from RAM 72c into holding register 72-1 and then be transferred over RAD bus 80 to MUX 234 and then be stored into to the low order bits 7-0 of CPUCLK control register 242.

State S9 is then entered where the 1 on line LCL_ACK 200-20 is changed to 0, indicating the transfer has completed, causing the 7072 register 803 (FIG. 2G) to read out the 0 on line LCL_ACK 200-20 over data bus 42 into PMCOUT latches 74. This, in turn, causes a 0 on line LCL ACK_74-3 signaling keyboard controller 72 that the write operation is complete.

Assume now that during state S6 it is determined that the opcode specifies that a read operation is to take place causing states S7b and S8b to be entered. The high and low order bytes in the CPUCLK control register 242 are sequentially transferred over data bus 42 to the holding register 72-1 (FIG. 3) for display or other purposes as required by the user. Following state S8b, states S9 and S10 are entered where the above discussed operations are repeated, signaling the keyboard controller that the operation is complete. The state machine returns to the idle state S1.

FIG. 2J is a timing diagram depicting the main handshake signals involved in a data transfer cycle between the keyboard controller 72 and the system controller 10. The origins of the signals have been described in detail in connection with FIG. 2I. The purpose of FIG. 2J is to show their relations graphically.

The various points in time are indicated by the symbols T1 through T9B. The action taken at each of these times is briefly as follows:

T1: Keyboard controller request local data transfer by setting a 1 signal on line LCL_REQ.

T2: Local control 200–209 sends a 1 on line HLDREQ 200-18 to processor interface 218 to request the CPU to suspend activities on the AT Bus.

T3: CPU suspends AT Bus activities and return a 1 on line HLDACK 297 to local control 200.

T4: Local control 200 returns a 1 on line LOCAL_ACK 200-18 to keyboard controller indicating AT Bus ready.

T5: Keyboard controller 72 loads address and opcode into holding register 72-1 and sends a 0 on line LCL_REQ 200-18.

T6: Local control 200 reads address and opcode.

T7: Keyboard controller 72 reloads data high byte into holding register 72-1 and sends a 1 on LCL_REQ 200-18.

If opcode specifies a data transfer from keyboard controller 72 to system controller 10. Then, T8A: Local control 200 reads data value high byte from holding register 72-1 and writes to the register specified by the address. Keyboard controller 72 reloads data low byte into holding register 72-1.

T9A: Local control 200 reads data value low byte from holding register 72-1 and write to register specified by the address.

If opcode specifies a data transfer from system controller 10 to keyboard controller 72. Then, T8B: Local control reads data high byte from specified register to keyboard controller holding register 72-1.

T9B: Local control reads data low byte from specified register to keyboard controller holding register 72-1.

CPU Power Down

General Description

Figure 8:
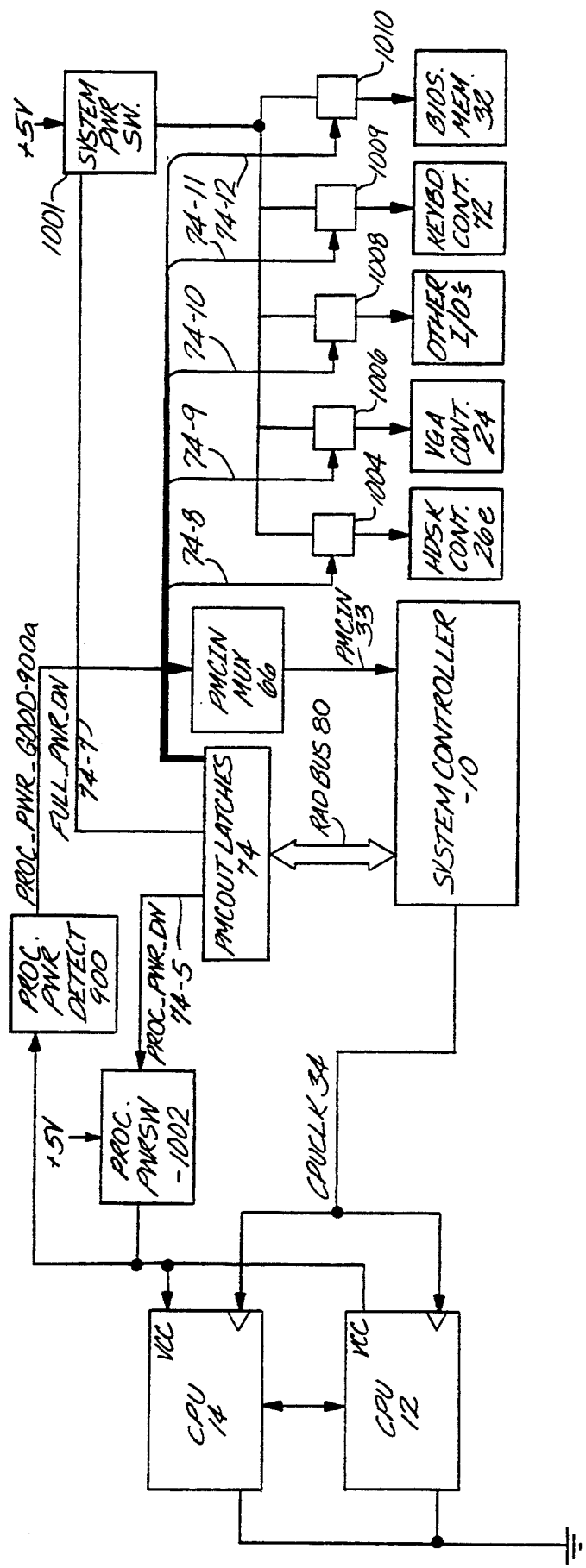
FIG. 8 is a schematic and block diagram depicting the CPUs, the system controller, the PMCOUT latches, PMCIN MUX 66, the processor power-detect circuit 900, the controllers 26e, 24 and 71, and the BIOS 32 depicted in FIG. 1, together with other I/O devices and the switches for enabling and disabling operating power to the CPU, controllers and other I/O devices.

Refer now to FIG. 8 and consider the circuits and operation of the system during CPU power down (sleep) and resume (wake-up). The CPUs 12 and 14, system controller 10, VGA controller 24, hard disk controller 26e, keyboard controller 72, BIOS memory 32, PMCOUT latches 74, MUX 66 and the line CPUCLK 34 shown in FIG. 1 are depicted in FIG. 8 along with the additional circuitry employed in the system of FIG. 1 for the power-down and resume operations. The system depicted in FIG. 8 applies and removes power to the CPUs 12 and 14 separately from the application and removal of power to the controllers. To this end, the signal at output line PROC_PWR_DN 74-5 from PMCOUT latches 74 enables and disables a processor power switch 1002. When enabled, processor power switch 1002 couples power from a +5 V power supply of the power input VCC of the CPU's 12 and 14. The VCC input of CPUs 12 and 14 are the main power supply inputs to the CPUs.

Output FULL_PWR_DN 74-7 from PMCOUT latches 74 enables and disables a system power switch 1001. When enabled, system power switch 1001 applies or enables power from the +5 V power supply to the power input of individual power switches 1004, 1006, 1008, 1009 and 1010. When disabled, system power switch 1001 disconnects or disables power from the +5 V power supply to the power supply switches 1004 through 1010. Four outputs 74-8 through 74-12 from PMCOUT latches 74 are individually connected to power switches 1004 through 1010 and similarly to switches 1001 and 1002, when enabled connect power from system power switch 1001 to a corresponding one of controllers 24, 26E, other I/Os, keyboard controller 72 and BIOS memory 32, and when disabled disconnect power from the system power switch 1001.

To be explained in more detail, the PMCIN MUX 66 receives a status indication on line PROC_PWR_GOOD 900a when the voltage from processor power switch 1002 to the CPUs 12 and 14 has reached the full +5 V level from the +5 V power supply. Processor power-detect circuit 900 detects and indicates when the full voltage is reached, and applies a 1 on line PROC_PWR_GOOD 900a. As explained in connection with FIG. 3, the signal on line 900a is multiplexed and applied to line PMCIN 33 to system controller 10. When the voltage from the output of the processor power switch 1002 is below full voltage, a 0 is applied on line 900a from the processor power-detect 900.

A monitor program (not shown) runs in the environment of the operating system to detect when an inactive condition exists in the CPU. Although the monitor program is not disclosed in detail herein, it is understood by those skilled in the art that such a program would monitor activity indications from such operating systems as DOS and Windows, and after the CPU has been inactive for a predetermined length of time, would write a special power-down command into 1872 register 912 (FIG. 2K) of the system controller 10 so advising the system controller.

The CPU then executes the register-saving program where the content of all registers and other status indications are saved in a predetermined area of RAM 30 for subsequent retrieval during the resume operation. The CPU then executes a halt instruction causing the CPU to go to a halt mode and set signals 1,0,1,1,0 on system controller inputs M/$\overline{\text{IO}}$ 943a, D/C# 943b, W/R# 943c, $\overline{\text{BHE}}$ 943d, BLE# 943e and ADS# 943f, respectively, and place the value 2 on address bus 36 (see FIG. 2L). Upon sensing these conditions, the system controller 10, to be explained, initiates the power-down sequence.

During the power-down sequence, the system controller first tristates the outputs of the system controller to the CPU preventing power to be drawn, logically disconnects system controller inputs from the CPU and sets these inputs to predetermined logic levels, and tristates the output driver for the clock at CPUCLK 34 preventing clock pulses to the CPUs.

The system controller 10 then writes a value into the PMCOUT latches 74 causing the processor power switch 1002 to be disabled, thus disabling power from the +5 V power supply to the CPUs while leaving the power switches 1001 through 1010 enabled and supplying power to the respective devices.

The resume or power up is initiated by an activity indication. The activity indications include, by way of example, DMA requests on line DRQIN 43, I/O error signals on line $\overline{\text{IOCK}}$ 50, parity errors detected by parity-detect circuit 950, non-maskable interrupts causing a signal on line NMI 46, and interrupt requests which are indicated by signals on line INTRQ 704 (see FIG. 2L). When any of these activity indications are detected, the system controller initiates a power resume operation.

During the power resume operation, the system controller 10 writes out a value to the PMCOUT latches 74 causing the processor power switch 1002 to again start enabling power from the +5 V power supply to the CPU. When the PROC_PWR_GOOD signal is true, the output signals from the system controller to the CPU are enabled. In particular, the CPU clock starts pulsing and the CPU reset is asserted. After a 1 micro second delay, the system controller inputs connected to the CPU are enabled. When a certain number of clock pulses have been generated, the CPU reset is removed and the CPU will then resume normal operation.

Power Management State Machine Operation

Figure 2F:
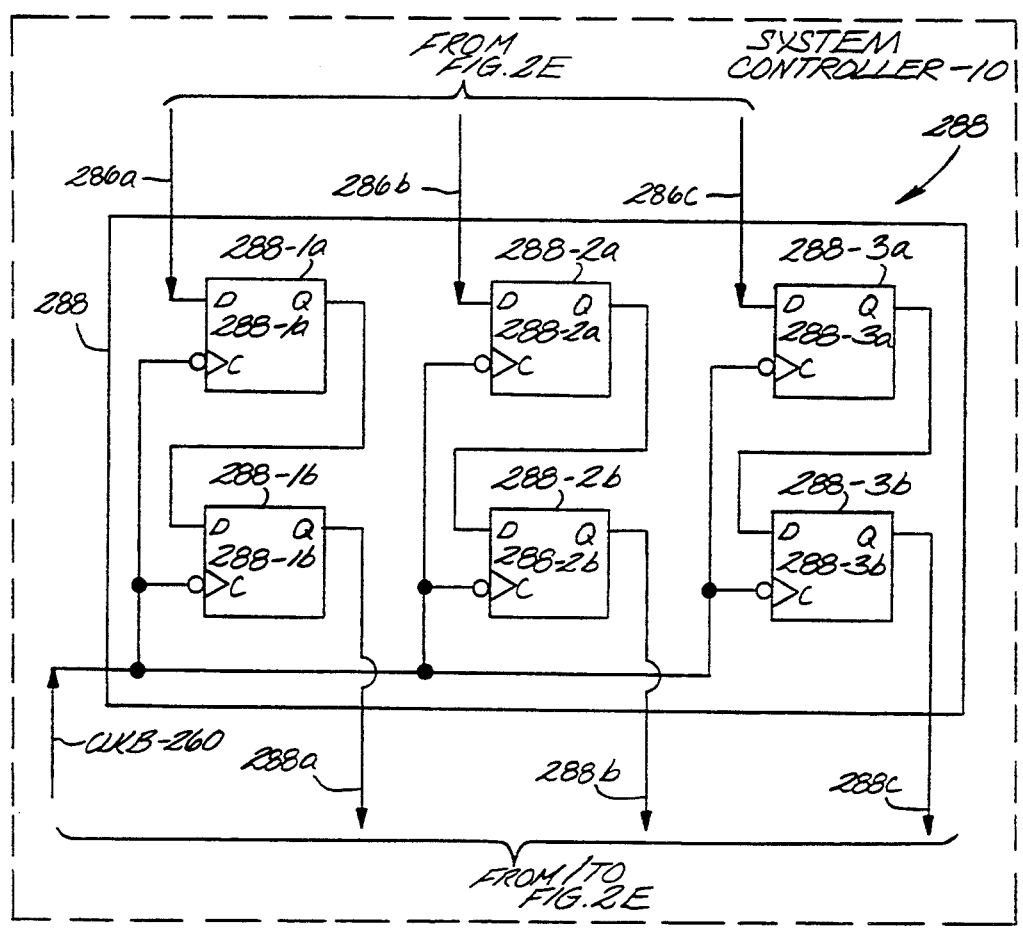
Figure 2K:
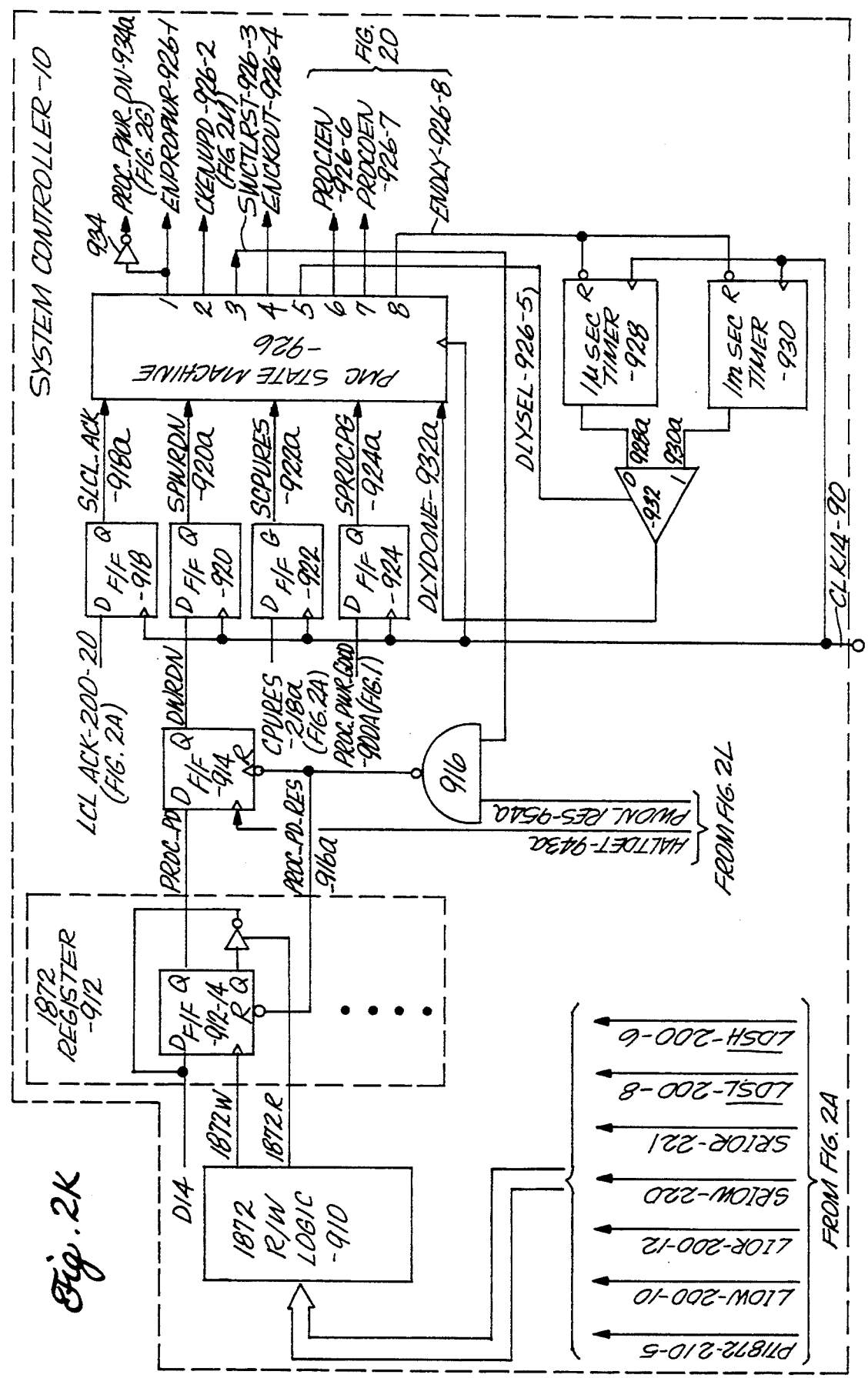
Figure 2L:
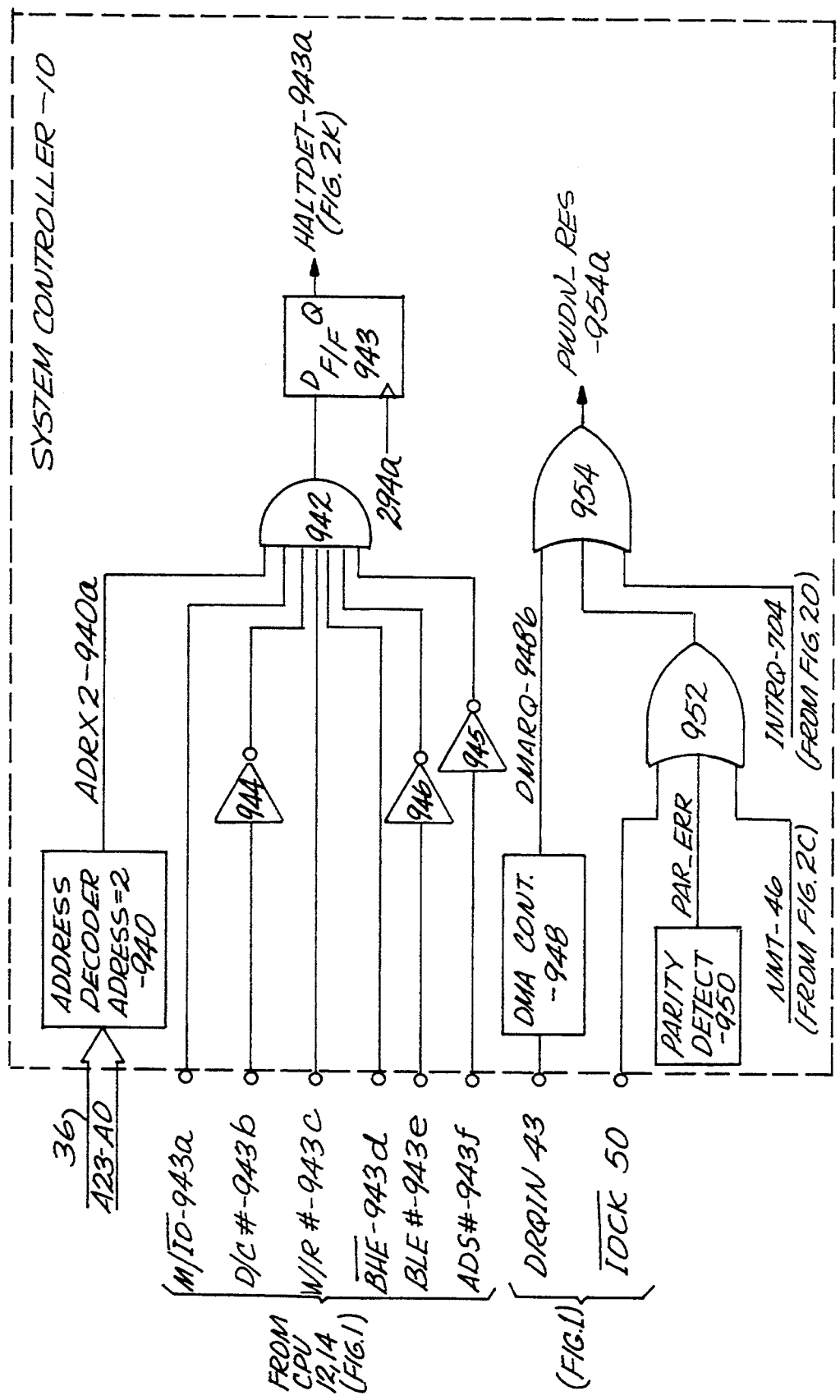

Before considering the state machine, consider the 1872 register 912 and the way in which the control value is loaded. In addition to the registers 803, 804 and 806 depicted in FIG. 2G, a 1872 register 912 is coupled to the data bus 42 for receiving data values from the CPU shown in FIG. 2k in a similar manner to that discussed with reference to registers 803, 804 and 806. When 1872 R/W logic 910 receives a 1 register-select signal at PT1872 210-5 and a 1 on SRIOW 220, logic 910 stores a 1 bit from bit D14 from data bus 42 into flip-flop 912-14 of 1872 register 912. The 1 stored in flip-flop 912-14 is then latched into flip-flop 914 upon receiving a 1 on line HALTDET 943a indicating that a halt in the CPU has been detected. Referring to FIG. 2L, AND gate 942 detects a halt condition when address decoder 940 detects the address 2 from bus 36 and signals 1,0,1,1,0,0 on lines 943a, 943b, 943c, 943d, 943e and 943f from the CPU. The output of AND-gate 942 is applied to the D input of flip-flop 943 which is clocked by the CPU clock on line 294a to generate the Halt signal on line HALTDET 943a. Inverters 944, 946 and 945 invert the signals from lines 943b, 943e and 945f. The 1 on HALTDET 943a strobes the 1 from flip-flop 912-14 to flip-flop 914, which in turn causes a power-down signal to the input of a flip-flop 920. The next clock pulse that occurs on line CLK 14 90 (FIG. 1) strobes the 1 from flip-flop 914 into flip-flop 920, causing a synchronized signal on line SPWRDN 920a to be applied to a PMC state machine 926. If no local access operations are taking place, a 0 is formed on line LCL_ACK 200-20 and the pulse on line CLK 14 90 causes flip-flop 918 to be set to 1 thus causing a synchronized 0 to be formed on the synchronized local access line SLCL_ACK 918a to the PMC state machine 926.

Refer now to the state diagram for the PMC state machine 926 shown in FIG. 2N and consider its operation. Normally, the PMC state machine 926 is in an idle state. Upon the occurrence of the 1 on the SPWRDN line 920a and the 0 on line SLCL ACK 918a, the state machine enters a power-down sequence or sleep mode of operation indicated at states PD1, PD2 and PD3.

Processor Power Down (Sleep)

During state PD1, the PMC state machine 926 forms a 0 at ENPROPWR 926-1 and a 1 at CKENUPD 926-2 and SWCTLRST 926-3. Inverter 934 inverts the 0 on ENPROPWR 926-1 forming a 1 at PROC_PWR_DN 934a. The 1 at PROC_$_{PWR}$_DN 934a is applied to latch 5 of the 7072 register 803 which will be read out over data bus 42 to PMCOUT latches 74 during a subsequent local update cycle (to be described). To be described in more detail in connection with FIG. 2M, the 1 at CKENUPD 926-2 causes a 1 at PMC UPDATE 986a, which in turn is applied to the local state machine 200-2 (FIG. 2A) initiating a local update cycle which writes the 1 in latch 5 of the 7072 register 803 to the PMCOUT latches 74. The 1 at SWCTLRST 926-3 is applied to NAND-gate 916, enabling it so that when subsequent power resume or power up conditions are detected, and a 1 is formed at PWDN_RES 954a, NAND-gate 916 will reset flip-flops 912-14 and 914 thereby starting a power up (resume or wake up) operation.

After a predetermined time delay, processor interface 218 (FIG. 2A) forms a 1 at CPURES 218a (FIG. 2A) to control bus 46 to the CPU, forcing it to be reset to an initial condition. This same signal is applied to flip-flop 922, and at the next clock at CLK 14 90, the flip-flop is set to 1 causing a synchronized pulse at SCPURES 922a to the PMC state machine 926 which causes the state machine to enter state PD2. During PD 2, PMC state machine 926 forms a 0 at CKENUPD 926-2, PROCIEN 926-6 and PROCOEN 926-7. The 0 at CKENUPD 926-2 terminates the previous 1 signal or pulse, thereby ending the request for update, which will be described in more detail in connection with the OR-gate 974 of FIG. 2M. The 0 at output PROCIEN 926-6 causes certain input buffers which receive signals from the processor to be logically disconnected and the signal inputs to the system controller and set to predetermined states, as discussed in more detail in connection with FIG. 2O. The 0 at PROCOEN 926-7 tristates the output drivers which send signals from the system controller to the CPUs, as discussed in more detail in connection with FIG. 2O. As discussed in connection with the local state machine 200-2 (FIGS. 2A), a 1 will be formed again at LCL_ACK 200-20 when a local update is underway, which in this particular case is updating the state of the PMCOUT latches 74 with a value from 7072 register 803 (FIG. 2G). The 1 at LCL_ACK 200-20 is subsequently synchronized by flip-flop 918 to form a synchronized signal at SLCL_ACK 918a, causing the PMC state machine 926 to enter state PD3.

During state PD3, PMC state machine 926 forms a 0 at ENCKOUT 926-4 which tristates the output driver for the CPUCLK on line 34, preventing CPUCLK pulses from reaching line 34. The PMC state machine 926 remains in state PD3 until an activity indication occurs requesting action on the part of the CPU. As explained in connection with FIG. 2L, a DMA request at DRQIN 43, an I/O error indication at $\overline{IOCK}$ 50, a parity detect error signal from circuit 950, a non-maskable interrupt (NMI) signal at line 46, or an interrupt request at INTRQ 704 cause a 1 at input of OR-gate 954 which in turn forms a power-down resume signal at PWDN_954a, which in turn is applied to the input of NAND-gate 916. This signal in combination with a 1 being formed at the SWCTLRST 926-3 output of the PMC state machine 926 causes NAND-gate 916 to form a 0 at PROC_PD_RES 916a which, to be explained, causes the resume or power up sequence of operation to take place.

Processor Power UP (Wake-up)

Assume that the power resume signal formed at PROC_PD_RES 916a is a 0 which therefore resets the Q output of both flip-flops 912 and 914 to 0, causing flip-flop 920 to form a synchronized 0 signal at SPWRDN 920a at the following pulse at CLK 14 90. This is turn causes PMC state machine 926 to enter state PU1. During state PU1, PMC state machine 926 forms a 1 at ENPROPWR 926-1 and therefore a 0 at PROC PWR DN 934a, and forms a 1 at CKENUPD 926-2. The 0 at PROC_PWR_DN 934a is applied to the 7072 register 803. The 1 at CKENUPD 926-2, to be explained in detail, causes the local state machine to read out the contents of the 7072 register 803 over data bus 42 to the PMCOUT latches 74, thus reenabling the processor power switch 1002 to enable power from the +5 V power supply to the CPUs 12 and 14. The reenabling of the processor power switch 1002 is complete when a 1 is formed at LCL_ACK 200-20. This in turn causes the PMC state machine 926 to enter state PU3.

During state PU3, the PMC state machine 926 forms a 0 at output DLYSEL 926-5 and ENDLY 926-8. The 0 at ENDLY 926-8 resets one-microsecond timer 928 and holds it at the reset mode until state PU5. The 0 at DLYSEL 926-5 causes MUX 932 to couple the output of one-microsecond timer 928 to line DLYDONE 932a to the PMC state machine 926. PMC state machine 926 remains in state PU3 until a processor-power-good or 1 is received at PROC_PWR_GOOD 900a from processor power-detect circuit 900 indicating that power to the CPUs 12 and 14 has risen to the proper voltage level. The 1 at PROC PWR GOOD 900a causes flip-flop 924 to form a synchronized power-good signal at SPROCPG 924a, and if there is no local access operation taking place in the system controller, a 0 is formed at line SLCL_ACK 918a which in turn enables the PMC state machine 926 to enter state PU5.

During state PU5, the PMC state machine 926 forms a 1 at ENCKOUT 926-4, PROCOEN 926-7 and ENDLY 926-8. To be explained in connection with FIG. 2O, the 1 at ENCKOUT 926-4 enables the output driver to again apply the CPUCLK pulses on line CPUCLK 34 to the CPUs. The 1 at PROCOEN 926-7 enables the output drivers, removing the tristate condition and again allowing the system controller 10 to apply signals to the CPUs, and the 1 at ENDLY 926-8 enables the one-microsecond timer 928 to again start counting. The one-microsecond time interval timed by timer 928 is to allow the CPUs to stabilize after power and the CPUCLK signals have been resumed. After one-microsecond timer 928 has completed its one-microsecond timing cycle, a 1 is applied at DLYDONE 932a to the PMC state machine 926, causing it to enter the END1 state.

Figure 20:
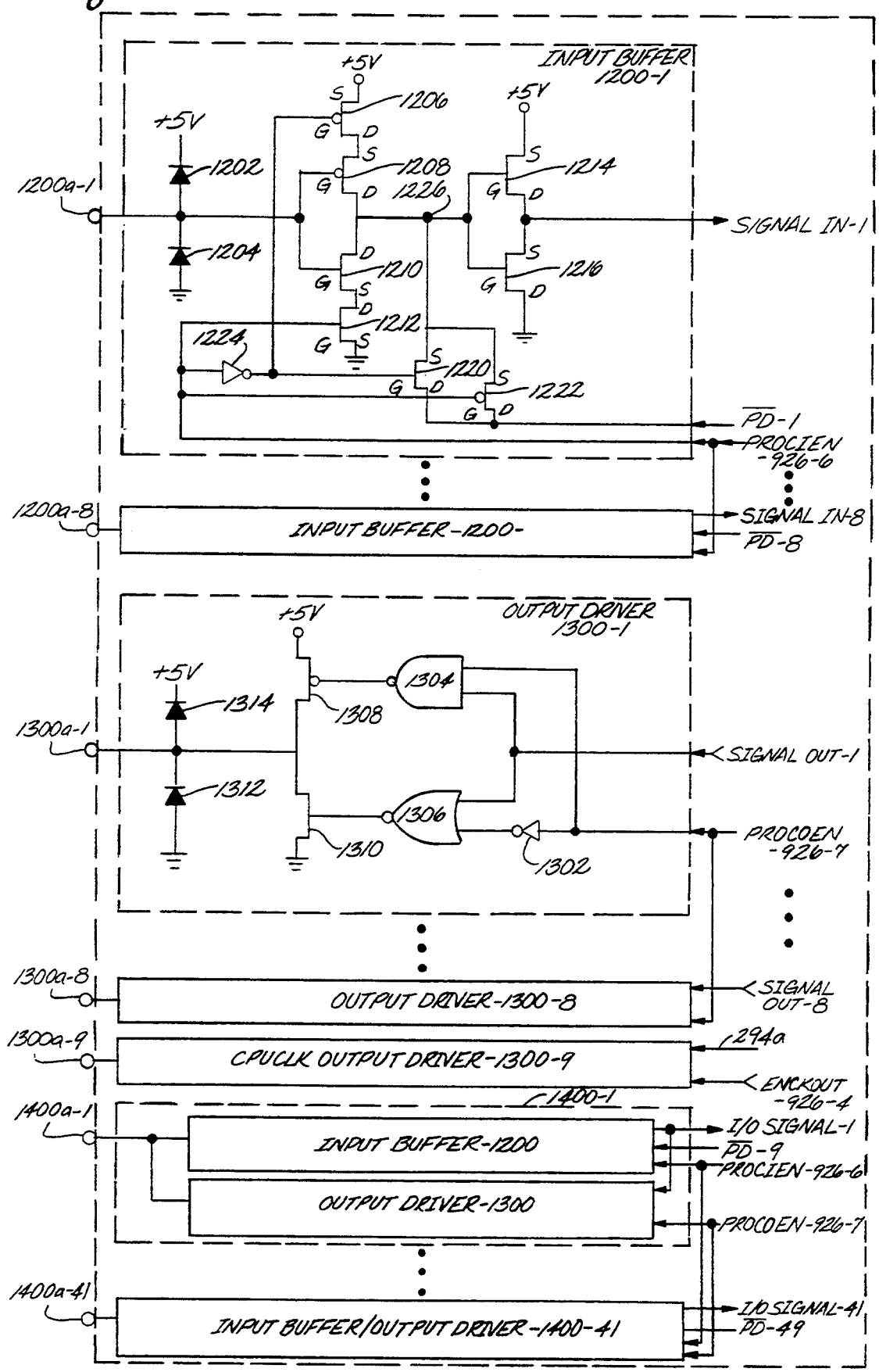

During the END1 state, the PMC state machine forms a 0 at ENDLY 926-8 and a 1 at PROCIEN 926-6. The 0 at ENDLY 926-8 resets and disables the one-microsecond timer 928, and the 1 at PROCIEN 926-6 is applied to the input buffers of the system controller 10, enabling them to receive signals from the CPUs as discussed in connection with FIG. 20.

The PMC state machine 916 now returns to the idle state where it remains until another power-down operation is initiated by an inactivity indication from the CPUs. Also, after approximately 16 clock pulses at CPUCLK 34, processor interface 218 (FIG. 2A) forms a 0 at CPURES 218a output to control bus 46 forcing the CPU to a reset mode and signalling the processor that it can now continue operation from the condition at which it was originally stopped and powered down.

Input and Output Buffers and Their Control

Nature of the Problem

Figure 9:
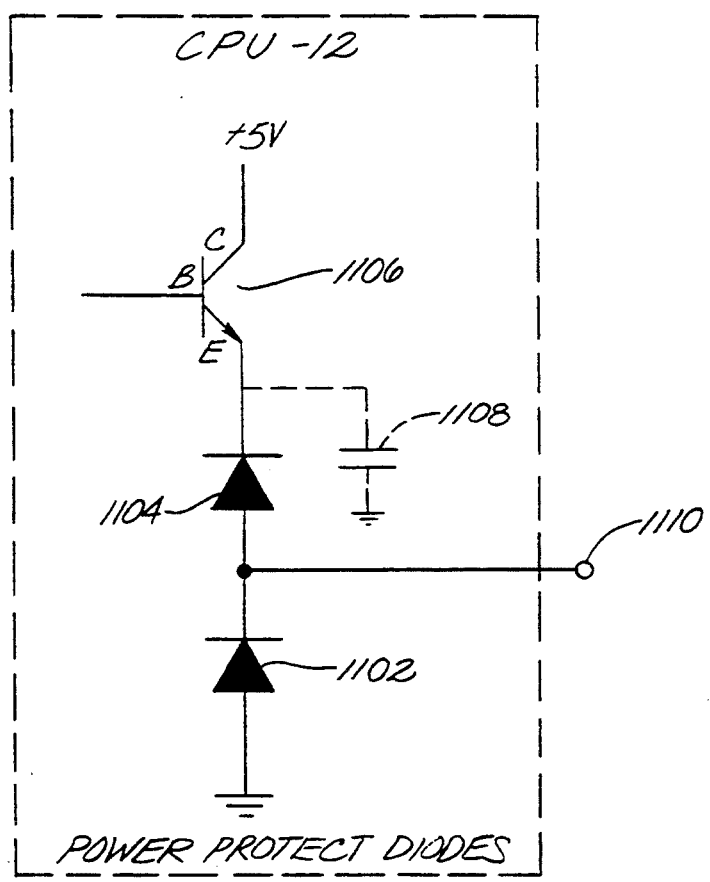
FIG. 9 depicts the diode protection circuit connected to each input/output pins for preventing damage to CMOS integrated circuits during the manufacturing process, according to the prior art.

Before considering the input buffers and output drivers, and their control according to the present invention, consider the nature of the problem with reference to FIG. 9.

As depicted in FIG. 9, each input to CPU 12 includes an input pin connected at the junction between the anode and cathode electrodes of serially connected diodes 1102 and 1104. The diodes 1102 and 1104 are serially connected between ground and a power control transistor 1106 whose collector is connected to the +5 V power supply. In normal operation, the transistor 1106 is on, connecting the cathode of diode 1104 to the +5 V power supply, and a signal at input terminal 1110 is between 0 and 5 volts so that both of diodes 1102 and 1104 are reverse-biased. The diodes are placed in the circuit and connected to the input pins of the CPU 12 so as to protect the rest of the input circuit to the CPU during the manufacturing process. Specifically, the diodes short out any high-voltage condition created by static discharge through the input pin 1110 that may be caused by handling during the manufacturing process.

The problem occurs when the CPU 12 is being powered down and the +5 V power supply is moving toward zero volt. If the system controller 10 is allowed to continue applying signals to pin 1110 while the +5 V power supply is moving toward zero volts, a condition may be encountered where diode 1104 is forward-biased through an intrinsic capacitor circuit 1108 connected to ground. Should this occur, it is possible that the diode 1104 would be latched in a saturated forward-bias condition and would remain forward-biased and conducting during the power-up operation, rendering CPU 12 inoperable. Also, during the power-down condition of the CPU 12, the diode 1104 may continue to draw power through the input pin 1110 from the system controller 10. Additionally, during the process when the system controller 10 input its buffers, the circuit may generate erroneous signals to the system controller 10 causing undesirable results. Output drivers may be employed to drive the CPU which tristate each input pin to the CPU when the processor is powered down so as to prevent power from being drawn by the CPU. However, this arrangement does not prevent diode 1104 from being latched up or the system controller from receiving spurious signals in a system such as that described herein where the CPU is powered down while the rest of the system remains operational.

Disabling Input Buffers to Predetermined State and Tristating Output Drivers

Consider first the output drivers from the system controller 10 which drive the input pins such as 1110 to the CPU 12. Output pins EPEREQ 34, NPRST 35, CUPRES 78, READY 47, HOLD 49, INTRQ 55, NMI 54, BHE 41, BUSYCPU 53 are control lines into the CPU, and each has an output driver. The output drivers for pins 34, 35, 78, 47, 49, 55, 54, 41 and 53 are identified as 1300-1 through 1300-8 in FIG. 20. Pin CPUCLK 52 has a driver 1300-9. The output pins 34, 35, 78, 47, 49, 55, 54, 41, 53 and 52 are identified in FIG. 20 1302a-1 through 1302a-9. Output driver 1300-1 is shown in detail. For simplicity, the other output drivers 1300-2 through 1300-7 are indicated by a dashed line and boxes.

Referring to output driver 1300-1, SIGNAL OUT-1 is a signal from the system controller which is to be driven at the corresponding output pin 1302a-1 which in turn, by way of example, would be connected to an input pin such as 1110 to the CPU (FIG. 9). As previously discussed, the PROCOEN 926-7 output of the PMC state machine 926 (FIG. 2K) enables or disables (tristates) the output drivers. A 1 at PROCOEN 926-7 applies a 1 to NAND-gate 1304 and to inverter 1302, and a 0 to NOR-gate 1306 enabling these gates. Therefore, a 1 on the SIGNAL OUT-1 line causes NAND-gate 1304 to apply a 0 to the gate of transistor 1308 and NOR-gate 1306 to apply a 0 to the gate of transistor 1310, causing transistor 1308 to switch on and connect the +5 V power supply to output pin 1300a-1 and transistor 1310 to switch off disconnecting ground from pin 1300a-1. Similarly a 0 at SIGNAL OUT-1 causes NAND-gate 1304 and NOR-gate 1306 to switch transistors 1308 and 1310 off and on, respectively, which connects output pin 1300a-1 to ground.

As discussed above, the system controller 10 will switch each output driver to its tristate condition wherein the corresponding output pin 1300a-1 is effectively open-circuited. To this end, a 0 is applied at PROCOEN 926-7 by the PMC state machine 926 which in turn causes NAND-gate 1304 and NOR-gate 1306 to apply a 1 to the gate of transistor 1308 and a 0 to the gate of transistor 1310. Regardless of the signal at SIGNAL OUT-1, this causes both transistors 1308 and 1310 to be off, thereby disconnecting both ground and the +5 V power supply from output pin 1300a-1. Also, diodes 1312 and 1314 are both reverse-biased since the signal from the CPU will always be between zero and +5 V at 1300a-1 as the power is being shut down.

Output drivers 1300-2 through 1300-9 are identical to output driver 1300-1, except that the SIGNAL OUT input is connected to different signal sources in the system controller and that output driver 1300-9 is connected to the 294a output of tristate driver 294 as generally depicted in FIG. 2E.

Consider now the input buffers 1200-1 through 1200-8. Input buffers 1200-1 through 1200-8 are connected to input pins 1200a-1 through 1200a-8 of the system controller. The signals from the CPU at input pins 1200a-1 through 1200a-8 cause corresponding signals to be formed at lines SIGNAL IN-1 through SIGNAL IN-8. By way of example, pins 1200a-1 through 1200a-8 are the following pins from the Intel CPU indicated in Table 6: NBUSY 85, NPERR 42, HLDA 48, M/IO 44, PEACK 43, S1 46, S0 45, RDYIN 51. The circuits of input buffers 1200-1 through 1200-8 are each identical, except for their inputs from the system controller. Thus, input buffers 1200-1 through 1200-8 are connected to control lines $\overline{PD}$-1 to $\overline{PD}$-8, respectively, from a hard wire connection (not shown). The lines $\overline{PD}$-1 through $\overline{PD}$-8 are hard wired to either a logic 1 (+5 V) or a logic 0 (ground), depending on the desired state of the SIGNAL IN when the corresponding input buffer is tristated.

Consider the details of the input buffers as depicted, by way of example, for buffer 1200-1. Input pin 1200a-1 is connected to the junction of serially connected diodes 1202 and 1204 which are serially connected between the power supply and ground for the purpose discussed with respect to FIG. 9. Input pin 1200a-1 is also connected to the gates of transistors 1208 and 1210, the sources and drains of which are serially connected in a series circuit with the sources and drains of transistors 1206 and 1212 between the +5 V power supply and ground. The gates, sources and drains are indicated by the symbols G, S and D, respectively. The junctions between the drains of transistors 1208 and 1210 are connected to the gates of transistors 1214 and 1216, the sources and drains of which are serially connected between the +5 V power supply and ground. Line PROCIEN 926-6 from PMC state machine 926 (FIG. 2K) is the one which enables the output drivers 1200-1 through 1200-8 to tristate whenever the signal is a 0. In the condition where signals from the CPU are to be passed through to the SIGNAL IN-1 line, PROCIEN 926-6 will be a 1 which in turn will cause transistor 1212 to be on and, because of the inversion by inverter 1224, will cause transistor 1206 also to be on, thereby connecting the serially connected transistors 1208 and 1210 between the +5 V power supply and ground. The 1 at PROCIEN 926-6 will also be applied to the gate of transistor 1222 turning it off, and will be inverted by inverter 1224 causing transistor 1220 also to be off. Therefore, regardless of the predetermined signal at the $\overline{PD}$-1 input, transistors 1222 and 1220 will have no effect on the signal at line 1226. Therefore, a 1 at input pin 1200a-1 will cause transistor 1210 to be on and transistor 1208 to be off, forming a 0 at line 1226 which in turn will cause transistor 1214 to be on and transistor 1216 to be off, applying a 1 or +5 V signal on line SIGNAL IN-1. Similarly, a 0 at input pin 1200a-1 causes transistor 1208 to be on and transistor 1210 to be off, which in turn causes a 1 on line 1226, thereby causing transistor 1216 to be on and transistor 1214 to be off, thereby causing a 0 or ground on line SIGNAL IN-1.

Assume now that a 0 is formed at PROCIEN 926-6. The 0 signal is applied to transistor 1212 turning it off and, because of the inversion of inverter 1224, also turns transistor 1206 off. With transistors 1206 and 1212 off, the signal on line 1226 will slowly decay from its previous voltage level. As a result, erroneous signals might be applied through transistors 1214 and 1216 to the line SIGNAL IN-1 causing erroneous operations in the system controller. To avoid this problem, the 0 on line PROCIEN 926-6 is applied to transistor 1222, and through inverter 1224 to transistor 1220, turning these transistors on. If the signal on line $\overline{PD}$-1 is a 1 or +5 V, then line 1226 is immediately clamped to 5 volts, whereas if line $\overline{PD}$-1 is a 0 or at ground, line 1226 will immediately be clamped to ground, thereby preventing any erroneous signals from being passed through to line SIGNAL IN-1. As mentioned above, the signal at $\overline{PD}$-1 is predetermined depending on the signal desired during the power-down condition of the processor at line SIGNAL IN-1.

Although input buffer 1200-1 has been described in detail, it is to be understood that buffers 1200-2 through 1200-8 are identical, except that they are connected to their respective pins, SIGNAL IN lines and $\overline{PD}$ lines.

Consider now the input/output buffers 1400-1 through 1400-41. An input/output buffer is connected to each system controller pin which is connected to one of the 42 two-way signal lines. The input/output buffers include an input buffer for signals coming in from the CPU and output drivers for driving signals out to the CPU through the same pin on the system controller 10. For ease of reference, the output drivers are identified by the numerals 1200, and the input buffers are identified by the numerals 1300, identical to the output drivers 1200 and the input buffers 1300 discussed above. Input/output pins 1400a-1 through 1400a-41 are connected to the input/output of buffers 1400-1 through 1400-41. I/O SIGNAL-1 lines are connected to the other input/output side of buffers 1400-1 through 1400-41, respectively. By way of example, pins 400a-1 through 1400a-41 are the following pins from the Intel CPU indicated in Table 6: D15 73 through DO 56, A23 80 through A0 86 and $\overline{BHE}$ 41.

Considering input/output buffer 1400-1, the output driver 1200 has its output connected to pin 1400a-1 and buffer 1300 has its input connected to the same pin 1400a-1. Similarly, the input of output driver 1200 is connected to line I/O SIGNAL-1 and the output of input buffer 1300 is connected to the same line I/O SIGNAL-1. Each output driver 1200 is connected to line PROCOEN 926-7, and each buffer 1300 is connected to line PROCIEN 926-6, as discussed above with respect to the output drivers and input buffers. However, the input buffers in each of input/out buffers 1400-1 through 1400-41 are connected to different $\overline{PD}$ lines. Thus, input/output buffers 1400-1 through 1400-41 are connected to lines $\overline{PD}$-9 through $\overline{PD}$-49 so that each can have a different selected state during the power-down condition. With this arrangement, each system controller pin can be used as an output from a driver or as an input to a buffer in the corresponding input/output buffer.

Update of PMCOUT Latches 74

Figure 2M:
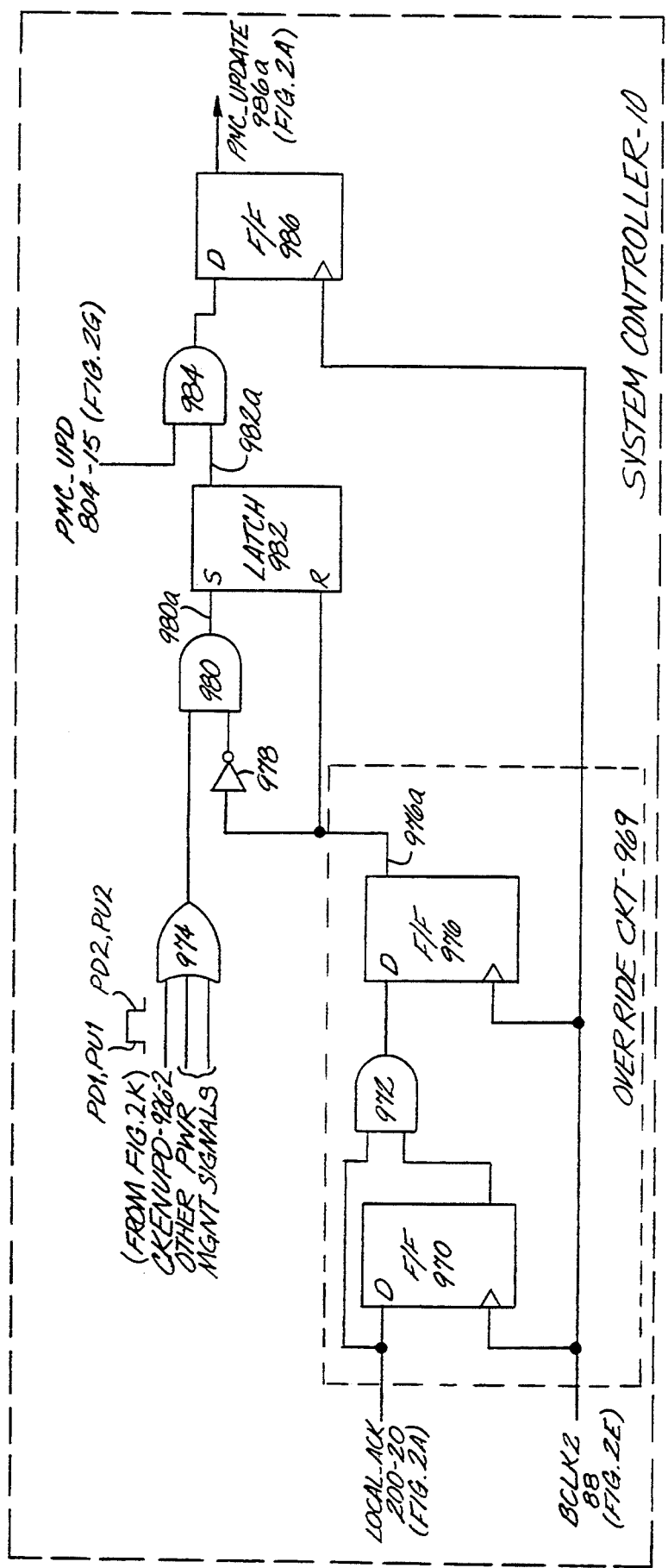

FIG. 2M depicts the program circuit for updating the PMCOUT latches 74 (FIGS. 1 and 8). The signals into OR-gate 974 are the signals which request the update. If the update is to be performed, the circuit of FIG. 2M forms a true signal at the line PMC_UPDATE 986a. The 1 at line PMC_UPDATE 986a, as discussed above, is an input to the local control 200 (FIG. 2A) which finally causes 7072 register 803 (FIG. 2G) to be transferred to the PMCOUT latches 74.

The update request signals to OR-gate 974 include a signal on line CKENUPD 926-2 from the PMC state machine 926 on which a signal is formed when there is a power-down or power-up request. The other inputs to OR-gate 974 are for other power management requests, but are of no interest to the present invention. Control over whether an update is enabled by forming a signal at line PMC_UPDATE 986a is with the user. Specifically, the user can program 8872 register 804 (FIG. 2G) so that an update is either permitted or inhibited by having a 1 or 0 at bit 15. A 1 at line PMC_UPD 804-15 enables AND-gate 984 to permit an update signal, whereas a 0 disables AND-gate 984 preventing an update. To be discussed, an override circuit 969 prevents an update to be initiated when some other local access is initiated simultaneously, in which case the signal on line LOCAL_ACK 200-20 goes from a 0 to 1. Assume that a local request is not being initiated, in which case the output of override circuit 969 normally applies a 0 to the reset (R) input of latch 982 and, through inverter 978, applies a 1 to an input of AND-gate 980 enabling AND-gate 980. A 0 at the reset input of latch 982 has no effect on the latch. Assume now that an update request is indicated by a 1 on one of the inputs to OR-gate 974. The OR-gate 974 then causes AND-gate 980 to form a 1 at the set (S) input of latch 982, setting it to a 1, which in turn causes the output of latch 982 to apply a 1 to AND-gate 984. Assuming the system controller been programmed to have a 1 at bit 15 of 8872 register 804, then a 1 at line PMC_UPD 904-15 will enable AND-gate 984. AND-gate 984 then applies a 1 to the D input of flip-flop 986, setting it to a 1 responsive to a clock pulse at BCLK2 88, thereby forming a 1 or update signal on line PMC_UPDATE 986a.

Consider now the override circuit 969. To prevent latch 982 from setting to a 1, a 1 is desired at the output of flip-flop 976 from the override circuit. This will happen only when the signal at line LOCAL_ACK 200-20 is changing from a 0 to a 1 and a pulse occurs at BCLK2 88. A 1 out of flip-flop 976 resets latch 982 to 0 and causes a 0 at the input of AND-gate 980, thereby disabling AND-gate 980 and preventing any requests to OR-gate 974 from passing through to the line PMC_UPDATE 986a. Assume now that the signal at line LOCAL_ACK 200-20 makes a transition from 0 to 1. Prior to the transition, the 0 at LOCAL_ACK 200-20 causes D-type flip-flop 970 to be set to 0 at each pulse at BCLK2 88. Therefore the D flip-flop is in a 0 state, causing a 1 at the $\overline{Q}$ output to AND-gate 972. When the transition from a 0 to a 1 occurs at LOCAL_ACK 200-20, the 1 signal causes AND-gate 972 to apply a 1 to the input of D flip-flop 976, and the following pulse at BCLK2 88 sets flip-flop 976 to a 1 state, thereby applying the reset signal to latch 982 and the 0 from the output of inverter 978 to AND-gate 980, disabling any update. The next pulse at BCLK2 88 then triggers flip-flop $\overline{Q}$ output of 970 back to 0 causing AND-gate 972 to be disabled and apply a 0 to flip-flop 976. This resets flip-flop 976 to a 0 state at the following pulse at BCLK2 88, applying a 0 to the R input of latch 982 and causing a 1 at the input of AND-gate 980, allowing any future requests to pass through to PMC_UPDATE 986a.

Referring to FIG. 2B and the discussion herein, it will be evident that values can be loaded into the CPUCLK control register 242, or one of the other power management registers 803,804, 806 (FIG. 2G) or 912 (FIG. 2K) under user control either from the CPU or from the keyboard. It is unlikely, however, that sleep or power-down mode values would be loaded under control of the user at the keyboard since this mode is intended to be transparent to the keyboard user. To this end, data signals on RAD bus 80 are applied to data bus 42 through MUX 234 and MUX 235 (FIG. 2B) as discussed above allowing 8-bit data coming out of RAM 30, BIOS 32, keyboard controller 72, latches 74, and serial/parallel interface 28 and applied on RAD bus 80, a local bus, to be applied on the 16-bit data bus 42, and vice versa. As a result, the value on data bus 46, either from the CPU or from RAM 30, can be loaded from the data bus 42 into any of the program registers 242, 803,804, 806 or 912 to control frequency and duty cycle switching, CPU power-down (sleep) and power-up (wake-up) power management operations.

The foregoing description should not be read as pertaining only to the precise structures and techniques described, but rather should be read consistent with, and as support for, the following claims, which are to have their fullest fair scope.

TABLE 1

| MXCTL-56 of Counter 701 | | | IRQSAT0-61 of MUX 28b-1 | IRQSET1-63 of MUX 28b-2 | PMCIN-3 of MUX 66 |
|---|---|---|---|---|---|
| 2 | 1 | 0 | | | |
| 0 | 0 | 0 | $\overline{IRQ8}$ | IRG12 (MOUSEINT) | $\overline{TURBO}$ |
| 0 | 0 | 1 | IRQ9 | IRQ1(KBINTR) | PROC_PWR_GOOD |
| 0 | 1 | 0 | IRQ10 | A20GT | LCL_REQ |
| 0 | 1 | 1 | IRQ11 | IRQ3 | USER DEF |
| 1 | 0 | 0 | ROM8 | IRQ4 | USER DEF |
| 1 | 0 | 1 | CPURES_REQ | IRQ5 | USER DEF |
| 1 | 1 | 0 | IRQ14(HDINT) | IRQ6(FDINT) | USER DEF |
| 1 | 1 | 1 | IRQ15 | IRQ7 | USER DEF |

TABLE 1-A

| MXCTL 56 Outputs of Counter 701 | | | Decoder 700 Outputs |
|---|---|---|---|
| 2 | 1 | 0 | |
| 0 | 0 | 0 | LE0 700-0 |
| 0 | 0 | 1 | LE1 700-1 |
| 0 | 1 | 0 | LE2 700-2 |
| 0 | 1 | 1 | LE3 700-3 |
| 1 | 0 | 0 | LE4 700-4 |
| 1 | 0 | 1 | LE5 700-5 |
| 1 | 1 | 0 | LE6 700-6 |
| 1 | 1 | 1 | LE7 700-7 |

TABLE 2

| CPUCLK REG 242 CLK_SPD BITS | | | |
|---|---|---|---|
| 14 | 13 | 12 | |
| 0 | 0 | 0 | - CPUCLK pin is an input, speed determined by external OSC 35 |
| 0 | 0 | 1 | - CPUCLK pin is an output, source % 1 (260) (Default value) |
| 0 | 1 | 0 | - source % 2 (264) |
| 0 | 1 | 1 | - source % 4, 25% duty cycle (270) |
| 1 | 0 | 0 | - source % 4, 75% duty cycle (278) |
| 1 | 0 | 1 | - source % 8, 12% duty cycle (272) |
| 1 | 1 | 0 | - source % 8, 88% duty cycle (280) |

TABLE 3

| CPUCLK REG 242 ALT_CLK_SPD BITS | | | |
|---|---|---|---|
| 10 | 09 | 08 | |
| 0 | 0 | 0 | - CPUCLK unchanged from CLK_SPD (Default value) |
| 0 | 0 | 1 | - Equals source (260) |
| 0 | 1 | 0 | - source % 2 (264) |
| 0 | 1 | 1 | - source % 4, 25% duty cycle (270) |
| 1 | 0 | 0 | - source % 4, 75% duty cycle (278) |
| 1 | 0 | 1 | - source % 8, 12% duty cycle (272) |
| 1 | 1 | 0 | - source % 8, 88% duty cycle (280) |

TABLE 4

| SPEEDUP ACTIVITY | TIME PERIOD |
|---|---|
| Hard disk interrupt (HDINT), Floppy disk interrupt (FDINT), numeric processor I/O, SCSI, port B I/O | 1 second |
| Keyboard interrupt (KBINTR) | 1 second or until next video access |
| Video access (VIDACC) | 1 millisecond |
| Any NMI or IRQ interrupt, except keyboard or hard disk | 1 millisecond |

TABLE 5

| TURBO 201-0a | AUTOFST Q11 | Output of 316 | |
|---|---|---|---|
| x | 0 | 0 | AUTO SPEEDUP DISABLED |
| 0 | x | 0 | PERMANENT SPEEDUP AND AUTO SPEEDUP DISABLED |
| 1 | 1 | 0 | AUTO SPEEDUP ENABLED |

TABLE 6

SYSTEM CONTROLLER 10 PIN ASSIGNMENTS

| Ref. | PIN-NAME |
|---|---|
| 80-5 | 1-RA5/ED5 |
|  | 2-Vcc |
| 80-4 | 3-RA4/ED4 |
| 80-3 | 4-RA3/ED3 |
|  | 5-Vss |
| 80-2 | 6-RA2/ED2 |
| 80-1 | 7-RA1/ED1 |
| 80-0 | 8-RA0/ED0 |
| 83 | 9-CASH2 |
| 83 | 10-CASL2 |
| 82 | 11-RAS2 |
| 83 | 12-CASH3 |
| 83 | 13-CASL3 |
| 82 | 14-RAS3 |
| 54-4 | 15-DPH[CS4] |
| 54-3 | 16-DPL[CS3] |
|  | 17-RSTIN |
| 43 | 18-DRQIN |

TABLE 6-continued

SYSTEM CONTROLLER 10 PIN ASSIGNMENTS

| Ref. | PIN-NAME |
|---|---|
|  | 19-IOCHRDY |
|  | 20-ZEROWS |
|  | 21-IOCS16 |
|  | 22-MEMCS16 |
|  | 23-SPKR |
|  | 24-SA0 |
|  | 25-LA20 |
|  | 26-MASTER |
|  | 27-ALE |
|  | 28-AEN |
|  | 29-SDEN |
|  | 30-SDT/R |
|  | 31-Vcc |
|  | 32-REFRESH |
|  | 33-Vss |
|  | 34-EPEREQ |
|  | 35-NPRST |
|  | 36-LOMEG |
|  | 37-MEMW |
|  | 38-MEMR |
| 223 | 39-IOW |
| 222 | 40-IOR |
|  | 41-BHE |
|  | 42-NPERR |
|  | 43-PEACK[D/C#] |
|  | 43-WD75C10 NOT USED |
|  | 44-M/IO |
|  | 45-S0[ADS#] |
|  | 46-S1[W/R#] |
|  | 47-READY |
|  | 48-HLDA |
|  | 49-HOLD |
| 88 | 50-BCLK2 |
| 84 | 51-RDYIN[CKA] [PE] |
| 34 | 52-CPUCLK |
|  | 53-BUSYCPU |
| 46 | 54-NMI |
| 704 | 55-INTRQ |
| 42-0 | 56-D0 |
| 42-1 | 57-D1 |
| 42-2 | 58-D2 |
| 42-3 | 59-D3 |
| 42-4 | 60-D4 |
| 42-5 | 61-D5 |
| 42-6 | 62-D6 |
| 42-7 | 63-D7 |
| 42-8 | 64-D8 |
| 42-9 | 65-D9 |

TABLE 6-continued

SYSTEM CONTROLLER 10 PIN ASSIGNMENTS

| Ref. | PIN-NAME |
|---|---|
| 42-10 | 66-D10 |
|  | 67-Vss |
| 42-11 | 68-D11 |
|  | 69-Vcc |
| 42-12 | 70-D12 |
| 42-13 | 71-D13 |
| 42-14 | 72-D14 |
| 42-15 | 73-D15 |
|  | 74-DT/R |
|  | 75-DEN1 |
|  | 76-DEN0 |
|  | 77-SUSCLK |
|  | 78-CPURES |
|  | 79-BALE |
| 36-23 | 80-A23 |
| 36-22 | 81-A22 |
| 36-21 | 82-A21 |
| 50 | >83-IOCK |
| 90 | 84-CLK14 |
|  | 85-NPBUSY |
| 36-0 | 86-A0[BLE#] |
| 36-1 | 87-A1 |
| 36-20 | 88-A20 |
| 36-19 | 89-A19 |
| 36-18 | 90-A18 |
| 36-17 | 91-A17 |
| 36-16 | 92-A16 |
| 36-15 | 93-A15 |
| 36-14 | 94-A14 |
| 36-13 | 95-A13 |
| 36-12 | 96-A12 |
| 36-11 | 97-A11 |
|  | 98-Vss |
|  | 99-Vss |
| 36 | 100-A10 |
|  | 101-Vcc |
| 36-9 | 102-A9 |
| 36-8 | 103-A8 |
| 36-7 | 104-A7 |
| 36-6 | 105-A6 |
| 36-5 | 106-A5 |
| 36-4 | 107-A4 |
| 36-3 | 108-A3 |
| 36-2 | 109-A2 |
| 63 | 110-IRQSET1 |
| 61 | 111-IRQSET0 |
| 56-0 | 112-MXCTL0 |
| 56-1 | 113-MXCTL1 |
| 56-2 | 114-MXCTL2 |
|  | 115-CSEN |
| 17 | 116-DACKEN |
|  | 117-RESERVED-WD75C10 |
| 52 | 117-PDREF-WD76C10LP |
| 33 | 118-PMCIN |
| 81 | 119-W/R |
| 83 | 120-CASH0 |
| 83 | 121-CASL0 |
| 82 | 122-RAS0 |
| 83 | 123-CASH1 |
| 83 | 124-CASL1 |
| 82 | 125-RAS1 |
| 54-2 | 126-RA10[CS2] |
| 54-1 | 127-RA9[CS1] |
| 54-0 | 128-RAB[CS0] |
|  | 129-Vss |
| 80-7 | 130-RA7/ED7 |
| 80-6 | 131-RA6/ED6 |
|  | 132-Vss |

TABLE 7

DATA FORMAT OF PROGRAM IN RAM 72C

OP CODE & REGISTER ADDRESS
DATA HIGH ORDER BYTE OF DATA VALUE
DATA LOW ORDER BYTE OF DATA VALUE

What is claimed is:

1. A system controller for managing communication of digital data over a bus structure between a microprocessor, a memory and input/output controllers in a battery operated computer, the computer having a first switching circuit for enabling and disabling power from the battery to the microprocessor independent of power to the input/output controllers, at least one second switching circuit for enabling and disabling power from the battery to the input/output controllers, the computer providing indications of inactivity by the microprocessor and indications of requested activity for the microprocessor, which activity is required by the input/output controllers, the system controller comprising:

at least one input for receiving the indications of inactivity and indications of requested activity;

at least one output;

a power management controller operative upon occurrence of the inactivity indications received at said at least one input for enabling the first switching circuit through the at least one output to disable power to the microprocessor without disabling power to the input/output controllers, and means operative upon occurrence of the indications of requested activity provided by the computer and received at said at least one input for enabling, through the at least one output, the first switching circuit to reenable power to the microprocessor;

a plurality of first system controller outputs coupled to the microprocessor for communication of signals therebetween; and an individual signal driver coupled to each of the first system controller outputs and adapted for substantially inhibiting any power from the system controller to the microprocessor through the corresponding first system controller output between the time power to the microprocessor is disabled and the time power is reenabled.

2. The system controller of claim 1 wherein the system controller comprises a timing and control circuit operative upon the occurrence of said indications of requested activity for enabling each of the signal drivers to commence such inhibiting of power starting at a time at least as early as the time that power to the microprocessor is disabled.

3. The system controller of claim 2 wherein the timing and control means enables each of the drivers to commence inhibiting of power at a time prior to the time that the first switching circuit starts inhibiting power to the microprocessor.

4. The system controller of claim 2 or 3 wherein each of the drivers comprises a power inhibiting switching circuit, each power inhibiting switching circuit comprising a first input for receiving a signal from the system controller for output to the microprocessor through the corresponding system controller output and a control input, each power inhibiting switching circuit being responsive to a control signal at the control input for forming substantially an open circuit between the signal for output and the corresponding system controller output.

5. The system controller of claim 1 wherein the microprocessor comprises inputs from the system controller, each such input being coupled through voltage protection diodes to a source of power to the microprocessor, and wherein the system controller comprises a signal output for each said microprocessor input and a signal driver connected to each said signal output, each said driver comprising a power protection circuit for preventing the voltage protection diodes at the corresponding input of the microprocessor from going into a saturated condition as power to the microprocessor is being disabled.

6. The system controller of claim 1 comprising
a clock output;
a controllable source of a clock pulse string for providing a clock pulse string through the clock output for sequencing the operation of the microprocessor;
timing and control means for disabling the controllable source from supplying the clock pulse string to the microprocessor while power to the microprocessor is disabled and operative for reenabling the controllable source to supply the clock pulse string to the microprocessor after power to the microprocessor has been reenabled.

7. The system controller of claim 6 comprising means for receiving through the at least one input an indication that the power is fully reenabled to the correct level to the microprocessor, the timing and control means comprising means for delaying the reenabling of the controllable source until after the indication that power has been fully reenabled.

8. The system controller of claim 1, further comprising an interface for preventing a signal received from the microprocessor from effecting the computer when power to the microprocessor is disabled by the power management controller.

9. The system controller of claim 8 wherein the interface comprises an individual signal buffer corresponding to each input of the system controller and comprising a signal input to the system controller, each said signal buffer further comprising a first switching circuit for switching the signal at the corresponding signal input between plural signal levels responsive to signals at the corresponding system controller input, a second switching circuit for forcing the corresponding signal input to a predetermined one of a plurality of logic levels, and a third switching circuit for disabling the switching of the signal at the corresponding signal input.

10. The system controller of claim 9 wherein the interface comprises timing and control means for enabling the third switching circuit of each said buffer to disable the switching of signals to the corresponding signal input, and for enabling the second switching circuit of each buffer to force the corresponding signal input to a predetermined logic level at least by the time that the third switching circuits disable switching.

11. The system controller of claim 10 wherein each said second switching circuit comprises a first control input responsive to any one of a plurality of logic signals for enabling the corresponding signal at the corresponding signal input and a second control input for enabling and disabling the forcing by the corresponding second switching circuit.

12. The system controller of claim 1 wherein the computer further comprises a plurality of registers outside the microprocessor and a plurality of registers inside the microprocessor, wherein upon occurrence of the inactivity indications received at the at least one input, the microprocessor saves in the memory of the computer the contents of the plurality of registers inside the microprocessor.

13. A system controller for managing communication of digital data over a bus structure between a microprocessor, a memory and input/output controllers in a battery operated computer, the computer comprising a first switching circuit for enabling and disabling power from the battery to the microprocessor independent of power to the input/output controllers, at least one second switching circuit for enabling and disabling power from the battery to the input/output controllers, the computer providing indications of inactivity by the microprocessor and indications of requested activity for the microprocessor, which activity is required by the input/output controllers, the system controller comprising:
at least one input for receiving the indications of inactivity and of requested activity;
at least one output;
a power management controller operative upon occurrence of the inactivity indications received at said at least one input for enabling the first switching circuit through the at least one output to disable power to the microprocessor without disabling power to the input/output controllers, and means operative upon occurrence of the indications of requested activity provided by the computer and received at said at least one input for enabling, through the at least one output, the first switching circuit to reenable power to the microprocessor; and
a plurality of system controller inputs through which signals from the microprocessor are received and responded to by the system controller, and comprising an individual signal buffer for each system controller input adapted for inhibiting signals into the system controller between the time that power to the microprocessor is disabled and the time power is reenabled to the microprocessor.

14. The system controller of claim 13 wherein each buffer comprises an input coupled to the corresponding system controller input for receiving signals from the microprocessor, an output for providing microprocessor signals to the system controller when not inhibiting signals from the microprocessor, and a logic control circuit for forcing a signal at the buffer output to the system controller at any of a plurality of predetermined logic levels between the time that power to the microprocessor is disabled and the time power is reenabled to the microprocessor.

15. The system controller of claim 1 or 6 wherein the system controller is an integrated circuit chip and each said input and output comprises at least one pin connected to the chip.

16. A system controller for managing communication of digital data over a bus structure between a microprocessor, a memory and input/output controllers in a battery operated computer, the computer comprising a first switching circuit for enabling and disabling power from the battery to the microprocessor independent of power to the input/output controllers, at least one second switching circuit for enabling and disabling power from the battery to the input/output controllers, the computer providing indications of inactivity by the microprocessor and indications of requested activity for the microprocessor, which activity is required by the input/output controllers, the system controller comprising:

at least one input for receiving the indications of inactivity and of activity;

at least one output;

a power management controller operative upon occurrence of the inactivity indications received at said at least one input for enabling the first switching circuit through the at least one output to disable power to the microprocessor without disabling power to the input/output controllers, and means operative upon occurrence of the indications of requested activity provided by the computer and received at said at least one input for enabling, through the at least one output, the first switching circuit to reenable power to the microprocessor; and an individual signal buffer corresponding to each said system controller input and comprising a signal input to the system controller, each said signal buffer further comprising a first switching circuit for switching the signal at the corresponding signal input between plural signal levels responsive to signals at the corresponding system controller input, a second switching circuit for forcing the corresponding signal input to a predetermined one of a plurality of logic levels, and a third switching circuit for disabling the switching of the signal at the corresponding signal input.

17. The system controller of claim 16 wherein the system controller comprises timing and control means for enabling the third switching circuit of each said buffer to disable the switching of signals to the corresponding signal input, and for enabling the second switching circuit of each buffer to force the corresponding signal input to a predetermined logic level at least by the time that the third switching circuits disable switching.

18. The system controller of claim 17 wherein each said second switching circuit comprises a first control input responsive to any one of a plurality of logic signals for enabling the corresponding signal at the corresponding signal input and a second control input for enabling and disabling the forcing by the corresponding second switching circuit.

19. The system controller of claim 18 wherein said first switching circuit in each said signal buffer comprises first and second transistors serially coupled together in a series circuit between first and second sides of a source of power, said first and second transistors comprising control electrodes coupled to the corresponding system controller input and third and fourth transistors serially coupled together in a series circuit between first and second sides of a source of power, the third and fourth transistors comprising control electrodes coupled to the series circuit formed by the first and second transistors, the second switching circuit in each said signal buffer comprising a transistor switch for enabling only one or the other of the corresponding said third and fourth transistors to couple the source of power to the corresponding signal input, and the third switching circuit in each said signal buffer comprising fifth and sixth transistors coupled between the first and second transistors and the corresponding source of power for enabling and disabling the power to the corresponding first and second transistors.

20. The system controller of claim 18 wherein the first switching circuit in each said signal buffer comprises first and second transistors serially coupled together in a series circuit between first and second sides of a source of power, said first and second transistors comprising control electrodes coupled to the corresponding system controller input and third and fourth transistors serially coupled together in a series circuit between first and second sides of a source of power, the third and fourth transistors comprising control electrodes coupled to the series circuit formed by the first and second transistors, the second switching circuit in each said signal buffer comprising a transistor switch for enabling only one or the other of the corresponding said third and fourth transistors to couple the source of power to the corresponding signal input, and the third switching circuit in each said signal buffer comprising fifth and sixth transistors coupled between the first and second transistors and the corresponding source of power for enabling and disabling the power to the corresponding first and second transistors.

21. A system controller for managing power consumption in a battery operated computer, the computer comprising a microprocessor timed by a clock provided by the system controller and powered by power supplied and removed under control of the system controller, the computer also comprising a plurality of units comprising input/output controllers, a keyboard controller and a memory, the computer having a main data bus for direct communication of data signals with the system controller, the microprocessor and the units, and a local data bus being adapted for communication of data signals by at least one of the units to the system controller, the system controller comprising:

a power management controller for controlling a sequence of operations for selecting at least one of a characteristic of the clock provided by the system controller to the microprocessor and the time for supply and removal of power to the microprocessor, for the management of power consumption in the computer;

a plurality of programmable registers for storing data signals for controlling the sequence of operations during the management of power consumption in the computer;

a first plurality of data inputs for receiving a plurality of signals representing the data signals from the main data bus for the plurality of programmable registers;

a second plurality of data inputs for receiving a plurality of signals representing the data signals from the local data bus for the plurality of programmable registers; and means for loading the data signals represented by the signals provided on either the main data bus or the local data bus into selected ones of said programmable registers.

22. The system controller of claim 21 comprising a means for transferring the data signals from the local data bus through the system controller to the main data bus prior to storage in one of said programming registers.

23. The system controller of claim 21 wherein the system controller comprises a clock pulse output for providing a clock pulse string to said microprocessor for sequencing the operation thereof, and a programmable clock controller responsive to the data contained in at least one of said programmable registers for selectively providing a clock pulse string through the clock pulse output to the microprocessor.

24. The system controller of claim 23 wherein each clock pulse string provided by the clock pulse output has a unique clock pulse frequency.

25. The system controller of claim 21 wherein the local controller comprises means responsive to the data in at least one of said programmable registers for switching the string of clock pulses from one having a first clock pulse characteristic to one having a second clock pulse characteristic momentarily, and for then switching back to one having the first clock pulse characteristic.

26. The system controller of claim 21, 23 or 25 wherein the system comprises a first switch for enabling or disabling power from a power supply to the microprocessor and at least one second switch for enabling or disabling power from the power supply to at least one of said input/output controllers, the system controller comprising:
   an output for providing a signal for enabling the first switch to disable power to the microprocessor; and
   a power-down controller operable under program control of said programmable registers for enabling the first switch to disable power to the microprocessor without enabling the at least one second switch to disable power to the input/output controllers.

27. The system of claim 21 wherein the system comprises an address bus for communication of addresses between the units and the microprocessor, and wherein the system controller comprises:
   a plurality of inputs for receiving address signals from the address bus for selecting one of said programmable registers for storage of data signals from one of said data busses.

28. The system controller of claim 21 or 27 wherein the system controller is an integrated circuit chip of each said input and output of the system controller comprises at least one pin connected to the chip.

29. The system controller of claim 21 comprising
   a first address input for receiving address signals designating any of said programmable registers;
   a second data input for receiving data signals for storage in said programmable registers; and
   the system controller comprising means for storing signals representing the received data signals into the programmable register designated by the received address signals.

30. The system controller of claim 29 comprising a further data input for receiving data signals; and means for applying data values to the data input storage in said programmable registers.

31. The system controller of claim 29 or 30 wherein each said address data input to the system controller comprises a plurality of inputs to the system controller each for receiving signals.

32. The system controller of claim 31 wherein the system controller is an integrated circuit chip and each said input and output of the system controller comprises at least one pin connected to the chip.

33. A battery operated computer comprising a switching circuit and a system controller, the system controller being adapted for managing communication of digital data over a bus structure between a microprocessor and input/output controllers in the computer, the computer providing indications of inactivity by the microprocessor and indications of requested activity for the microprocessor,
   the switching circuit being coupled for providing power from the battery to the microprocessor and to the output/input controllers and adapted for disabling power to the microprocessor independent of disabling of power to the input/output controllers,
   the system controller comprising:
      at least one input for receiving the indications of inactivity and the indications of requested activity from the computer;
      at least one output coupled to the switching circuit;
      a power management controller operative upon occurrence of the indications of requested activity and indications of inactivity received at the at least one input for, respectively, causing the switching circuit, through the at least one output, to provide power from the battery to the microprocessor while power is provided to the input/output controllers and to cause the switching circuit to disable power to the microprocessor while power is already being applied to the input/output controllers;
      a plurality of first system controller outputs coupled to the microprocessor for communication of signals therebetween; and
      an individual signal driver coupled to each of the first system controller outputs adapted for substantially inhibiting any power from the system controller to the microprocessor through the corresponding first system controller output when power to the microprocessor is disabled.

* * * * *

UNITED STATES PATENT AND TRADEMARK OFFICE
CERTIFICATE OF CORRECTION

PATENT NO. : 5,390,350
DATED : February 14, 1995
INVENTOR(S) : Randall M. Chung; Shaun Astarabadi It is certified that error appears in the above-indentified patent and that said Letters Patent is hereby corrected as shown below:

```
Column 1, line 34, change "effects" to -- affects --.
Column 5, line 24, after "power to" insert -- the --.
Column 5, line 34, change "therefor" to -- therefore --.
Column 6, line 24, change "20" to -- 20 --.
Column 6, line 27, change "20" to -- 20 --.
Column 11, lines 46,48,51, change "Mhz" to
          -- MHz -- (all occurrences).
Column 14, line 63, change "1signal" to -- 1 signal --.
Column 14, line 67, change "hand shake" to
          -- handshake --.
Column 19, line 8, before "frequency" insert -- the --.
Column 19, line 51, change "CLK-SPD" to -- CLK_SPD --.
Column 19, lines 53,55,57,58, change "AUT-FST" to
          -- AUT_FST -- (all occurrences).
Column 19, line 63, change "ALT-CLK-SP" to
          -- ALT_CLK_SP --.
Column 20, line 35, change "CLBK" to -- CLKB --.
Column 20, line 36, change "CLK/8" to -- CLKB/8 --.
Column 20, line 66, change "ALT-CLK-SP" to
          -- ALT_CLK_SP --; and change "CLK-SPD"
          to -- CLK_SPD --.
Column 21, lines 4,8,9,16,22,25,31,41, change
          "ALT-CLK-SP" to -- ALT_CLK_SP --
          (all occurrences).
Column 21, lines 6,46,47,51,59,64,68, change "CLK-SPD"
          to -- CLK_SPD -- (all occurrences).
Column 22, lines 30,31,33, change "KHz" to
          -- kHz -- (all occurrences).
Column 23, line 20, change "TURBO" (second occurrence)
          to -- TURBO --.
Column 26, line 17, change "summarizes" to
          -- summarize --.
```

UNITED STATES PATENT AND TRADEMARK OFFICE
CERTIFICATE OF CORRECTION

PATENT NO. : 5,390,350
DATED : February 14, 1995
INVENTOR(S) : Randall M. Chung; Shaun Astarabadi It is certified that error appears in the above-indentified patent and that said Letters Patent is hereby corrected as shown below:

```
Column 26, line 24, change "LEO" to -- LE0 --.
Column 26, line 48, change "book Volume 1" to
          -- book, Volume 1, --.
Column 27, line 33, change "form" to -- from --.
Column 29, line 5, before "will now" delete "and".
Column 30, line 4, after "stored into" delete "to".
Column 33, line 12, change "SLCL ACK"
          to -- SLCL_ACK --.
Column 33, line 20, change "PROC_PWR_DN" to
          -- PROC_PWR_DN --.
Column 33, line 25, change "PMC UPDATE" to
          -- PMC_UPDATE --.
Column 34, line 8, change "at in" to -- at an --.
Column 34, line 10, change "PWDN_954a" to
          -- PWDN_RES 954a --.
Column 34, lines 25,26, change "PROC PWR DN" to
          -- PROC_PWR_DN --.
Column 34, line 48, change "PROC PWR GOOD" to
          -- PROC_PWR_GOOD --.
Column 36, lines 10,12, change "20" to -- 2O --
          (both occurrences).
Column 38, line 20, change "400a-1" to -- 1400-1 --.
Column 38, line 34, change "input/out" to
          -- input/output --.
Column 39, line 12, after "controller" insert -- has --.
Column 40, line 21, in TABLE 1, column 4, change
          "PMCIN-3" to -- PMCIN-33 --.
Column 40, line 23, in TABLE 1, column 3, change "IRG12"
          to -- IRQ12 --.
Column 41, line 25, in TABLE 4, move the text "next video
          access" under the words "1 second or until",
          in the column headed "TIME PERIOD".
```

UNITED STATES PATENT AND TRADEMARK OFFICE
CERTIFICATE OF CORRECTION

PATENT NO. : 5,390,350
DATED : February 14, 1995
INVENTOR(S) : Randall M. Chung; Shaun Astarabadi It is certified that error appears in the above-indentified patent and that said Letters Patent is hereby corrected as shown below:

Column 41, line 31, in TABLE 5, Change "TURBO" to
-- $\overline{\text{TURBO}}$ --.

Column 41, lines 50-67, in TABLE 6, delete the underlines under "7-RA1/ED1, 8-RA0/ED0, 9-CASH2, 10-CASL2, 11-RAS2, 12-CASH3, 13-CASL3, and 16-DPL[CS3]"
and insert as overlines over
-- 8-$\overline{\text{RA0/ED0}}$, 9-$\overline{\text{CASH2}}$, 10-$\overline{\text{CASL2}}$, 11-$\overline{\text{RAS2}}$, 12-$\overline{\text{CASH3}}$, 13-$\overline{\text{CASL3}}$, 14-$\overline{\text{RAS3}}$, and 17-$\overline{\text{RSTIN}}$ --.

Column 42, lines 5-59, in TABLE 6, delete the underlines under "19-IOCHRDY, 20-ZEROWS, 21-IOCS16, 25-LA20, 28-AEN, 31-Vcc, 36-LOMEG, 37-MEMW, 38-MEMR, 39-IOW, 40-IOR, 41-BHE, 42-NPERR, 44-M/IO, 45-SO[ADS#], 46-SI[W/R#], 50-BCLK2, and 52-CPUCLK,"
and insert as overlines over
-- 20-$\overline{\text{ZEROWS}}$, 21-$\overline{\text{IOCS16}}$, 22-$\overline{\text{MEMCS16}}$, 26-$\overline{\text{MASTER}}$, 29-$\overline{\text{SDEN}}$, 32-$\overline{\text{REFRESH}}$, 37-$\overline{\text{MEMW}}$, 38-$\overline{\text{MEMR}}$, 39-$\overline{\text{IOW}}$, 40-$\overline{\text{IOR}}$, 41-$\overline{\text{BHE}}$, 42-$\overline{\text{NPERR}}$, 43-$\overline{\text{PEACK[D/C\#]}}$, 44-M/$\overline{\text{IO}}$, 45-$\overline{\text{SO}}$[ADS#], 46-$\overline{\text{SI}}$[W/R#], 47-$\overline{\text{READY}}$, 51-$\overline{\text{RDYIN[CKA]}}$, and 53-$\overline{\text{BUSYCPC}}$ --.

UNITED STATES PATENT AND TRADEMARK OFFICE
CERTIFICATE OF CORRECTION

PATENT NO. : 5,390,350
DATED : February 14, 1995
INVENTOR(S) : Randall M. Chung; Shaun Astarabadi It is certified that error appears in the above-indentified patent and that said Letters Patent is hereby corrected as shown below:

Column 43, lines 12-14, 22-27, 50-52, 58-68 and column 44, line 6, in TABLE 6, delete the underlines under "74-$\underline{DT/R}$, 75-$\underline{DEN1}$, 82-$\underline{A21}$, 84-$\underline{CLK14}$, 114-$\underline{MXCTL2}$, 119-$\underline{W/R}$, 120-$\underline{CASH0}$, 58-68, 121-$\underline{CASL0}$, 122-$\underline{RAS0}$, 123-$\underline{CASH1}$, and 124-$\underline{CASL1}$" and insert as overlines over
-- 74-$\overline{DT/R}$, 75-$\overline{DEN1}$, 83-$\overline{IOCK}$, 85-$\overline{NPBUSY}$, 115-$\overline{CSEN}$, 119-$\overline{W/R}$, 120-$\overline{CASH0}$, 121-$\overline{CASL0}$, 122-$\overline{RAS0}$, 123-$\overline{CASH1}$, 124-$\overline{CASL1}$, and 125-$\overline{RAS1}$ --.

Column 43, line 17, in TABLE 6, change "77-SUSCLK" to -- 77-SYSCLK --.

Column 43, line 24, in TABLE 6, before "83-IOCK" delete ">".

Column 44, line 8, in TABLE 6, change "128-RAB" to --128-RA8 --.

Column 46, line 67, change "claim 1 or 6" to -- claim 1 or 13 --.

UNITED STATES PATENT AND TRADEMARK OFFICE
CERTIFICATE OF CORRECTION

PATENT NO. : 5,390,350
DATED : February 14, 1995
INVENTOR(S) : Randall M. Chung; Shaun Astarabadi It is certified that error appears in the above-indentified patent and that said Letters Patent is hereby corrected as shown below:

Column 49, line 8, change "programming" to
         -- programmable --.
Column 49, line 44, after "system" insert
         -- controller --.

Signed and Sealed this

Twenty-eighth Day of May, 1996

Attest:

BRUCE LEHMAN

Attesting Officer     Commissioner of Patents and Trademarks